(12) United States Patent
Tateishi et al.

(10) Patent No.: US 7,806,109 B2
(45) Date of Patent: Oct. 5, 2010

(54) FUEL SUPPLY APPARATUS

(75) Inventors: Mamoru Tateishi, Kariya (JP); Yasuo Hosokawa, Obu (JP); Tetsuji Inoue, Nagoya (JP); Lei Zhang, Obu (JP); Hiroya Abe, Nagoya (JP)

(73) Assignee: Aisan Kogyo Kabushiki Kaisha, Obu-shi (JP)

( * ) Notice: Subject to any disclaimer, the term of this patent is extended or adjusted under 35 U.S.C. 154(b) by 248 days.

(21) Appl. No.: 12/149,672

(22) Filed: May 6, 2008

(65) Prior Publication Data
US 2008/0295808 A1 Dec. 4, 2008

(30) Foreign Application Priority Data

| Jun. 1, 2007 | (JP) | ............................. 2007-146828 |
| Jul. 26, 2007 | (JP) | ............................. 2007-194359 |
| Oct. 19, 2007 | (JP) | ............................. 2007-272484 |
| Nov. 12, 2007 | (JP) | ............................. 2007-293112 |
| Jan. 10, 2008 | (JP) | ............................. 2008-003142 |

(51) Int. Cl.
*F02M 37/08* (2006.01)
*F02M 37/04* (2006.01)

(52) U.S. Cl. ....................................... 123/509

(58) Field of Classification Search ................. 123/509, 123/497; 417/423.14; 310/89, 85, 256
See application file for complete search history.

(56) References Cited

U.S. PATENT DOCUMENTS

| 4,623,764 A | * | 11/1986 | Petre et al. ................. 200/38 R |
| 4,845,393 A | * | 7/1989 | Burgess et al. ................. 310/51 |
| 6,216,671 B1 | * | 4/2001 | Sawert et al. ............... 123/509 |
| 6,541,883 B2 | * | 4/2003 | Uffelman ...................... 310/71 |
| 2008/0011276 A1 | * | 1/2008 | Satoh et al. ................. 123/509 |

FOREIGN PATENT DOCUMENTS

| JP | A-08-177668 | 7/1996 |
| JP | A-2004-332582 | 11/2004 |

* cited by examiner

*Primary Examiner*—Mahmoud Gimie
(74) *Attorney, Agent, or Firm*—Oliff & Berridge, PLC

(57) ABSTRACT

A fuel pump unit includes a fuel pump which is driven by a motor, a secondary filter case placed to surround the fuel pump and contains a filter, a reserve cup which houses the fuel pump and the secondary filter case, and a pump controller which drivingly controls the fuel pump. A shielding material is provided in the reserve cup to shield electrical noise generated by the fuel pump. The shielding material is grounded. The pump controller includes a pump drive circuit which is provided with an electric filter.

23 Claims, 44 Drawing Sheets

|  | FREQUENCY RANGE A | FREQUENCY RANGE B |
|---|---|---|
| (1) NO SHIELDING MATERIAL AND GROUND CONNECTION | 0 | 0 |
| (2) WITH ONLY SHIELDING MATERIAL | 20~25dB | 0 |
| (3) WITH SHIELDING MATERIAL AND GROUND CONNECTION | 20~25dB | 20dB |

| | FREQUENCY RANGE A | FREQUENCY RANGE B |
|---|---|---|
| (1) NO ELECTRIC FILTER | 0 | 0 |
| (2) WITH ELECTRIC FILTER | 20~25dB | 10dB |

|  | FREQUENCY RANGE A | FREQUENCY RANGE B |
|---|---|---|
| (1) NO SHIELDING MATERIAL AND GROUND CONNECTION | 0 | 0 |
| (2) WITH ONLY SHIELDING MATERIAL | 10dB | 0 |
| (3) WITH SHIELDING MATERIAL AND GROUND CONNECTION | 10dB | 15dB |

|  | FREQUENCY RANGE A | FREQUENCY RANGE B |
|---|---|---|
| (1) NO SHIELDING MATERIAL AND GROUND CONNECTION | 0 | 0 |
| (2) WITH ONLY SHIELDING MATERIAL | 5dB | 5dB |
| (3) WITH SHIELDING MATERIAL AND GROUND CONNECTION | 20dB | 20dB |

FIG. 20
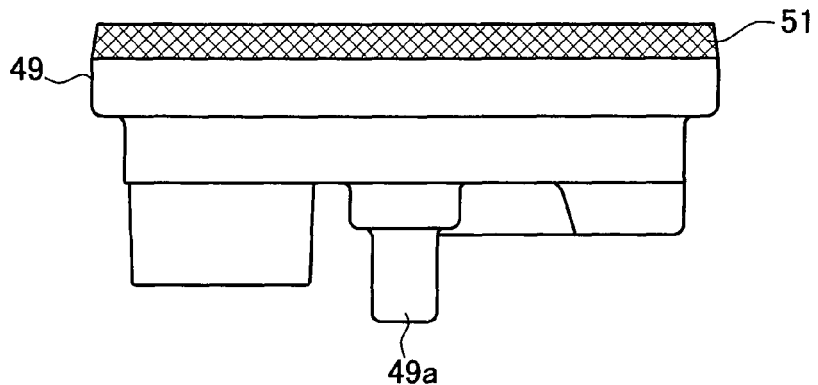
FIG. 21
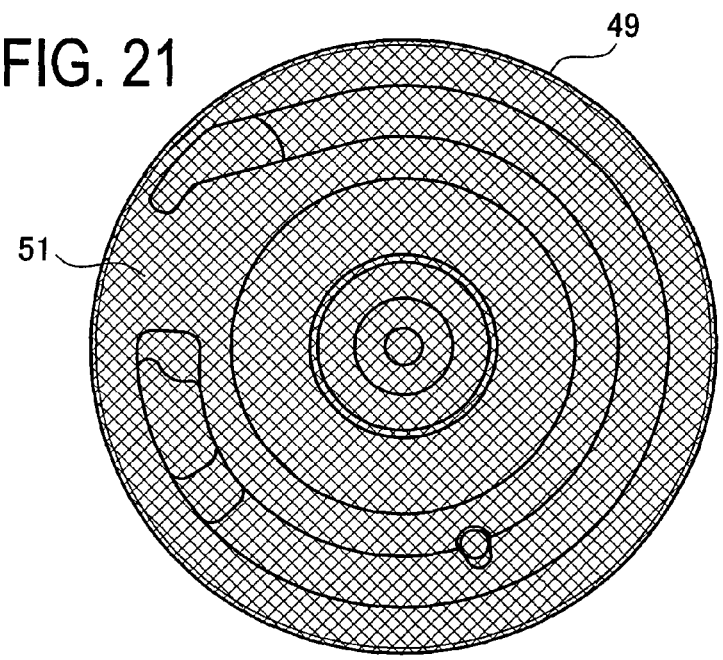
FIG. 22
|  | FREQUENCY RANGE A | FREQUENCY RANGE B |
|---|---|---|
| (1) NO SHIELDING MATERIAL AND GROUND CONNECTION | 0 | 0 |
| (2) WITH ONLY SHIELDING MATERIAL | 5dB | 5dB |
| (3) WITH SHIELDING MATERIAL AND GROUND CONNECTION | 15dB | 20dB |

FUEL SUPPLY APPARATUS

BACKGROUND OF THE INVENTION

1. Field of the Invention

The present invention relates to a fuel supply apparatus for supplying fuel from a fuel tank to an engine and others.

2. Description of Related Art

As a technique of this type, heretofore, for example a fuel apparatus disclosed in JP2004-332582A has been known. This apparatus includes a cover member that covers an opening formed in a fuel tank, a fuel pump placed in the fuel tank and to be driven by a motor, a liquid level meter for detecting the liquid level of fuel in the fuel tank, a liquid level meter control circuit which processes an output signal from the liquid level meter, and a pump control circuit which drivingly controls the fuel pump. The pump controller circuit is mounted in the cover member.

Meanwhile, a recent fuel tank has increasingly been made as a resin molded component in order to reduce vehicle weight and increase freedom in fuel tank shape design. Here, in the case where the fuel supply apparatus disclosed in JP'582A is incorporated in a resin fuel tank or the cover member is made of resin, electrical noise (radio noise) generated by the fuel pump (its motor) in the fuel tank could not be shielded by the fuel tank itself. This electrical noise may affect the pump controller circuit. For instance, the pump controller circuit may cause malfunction of the fuel pump due to the electrical noise and the pump controller circuit may further amplify the electrical noise it receives.

BRIEF SUMMARY OF THE INVENTION

The present invention has been made in view of the above circumstances and has an object to provide a fuel supply apparatus capable of preventing electrical noise caused by a fuel pump from adversely affecting peripheral components or parts.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the purpose of the invention, there is provided a fuel supply apparatus comprising: a fuel pump which is driven by a motor; a case which surrounds an outer periphery of the fuel pump; a cup which houses the fuel pump and the case; and a shielding material for shielding electrical noise which is generated by the fuel pump.

According to another aspect, the invention provides a fuel supply apparatus comprising: a fuel pump which is driven by a motor; a pump drive circuit for drivingly control the fuel pump; an electrically conductive outer surface member provided in an outer surface of the fuel pump; a harness that connects the fuel pump and the pump drive circuit to each other; and a shielding material that is provided to cover an outer periphery of the harness and connects the electrically conductive outer surface member to ground.

According to another aspect, the invention provides a fuel supply apparatus provided with a fuel pump which is driven by a motor, the apparatus comprising an electrically conductive mesh shielding material which covers an outer periphery of the fuel pump.

According to another aspect, furthermore, the invention provides a fuel supply apparatus comprising: a fuel pump which is driven by a motor; a housing made of an electrically conductive material, forming an outer peripheral surface of the fuel pump; a lower body provided on a lower side of the housing; and a lower cover made of an electrically conductive material and placed to cover the lower body to provide electric conductivity between the lower cover and the housing.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 20 is a side view of a lower body in the eleventh embodiment;

FIG. 21 is a plan view of the lower body in the eleventh embodiment;

FIG. 22 is a table showing an electrical noise reduction effect in the eleventh embodiment;

DETAILED DESCRIPTION OF THE PREFERRED EMBODIMENTS

Embodiment 1

A detailed description of a preferred first embodiment of a "fuel pump unit" embodying a fuel supply apparatus of the present invention will now be given referring to the accompanying drawings.

Figure 1:
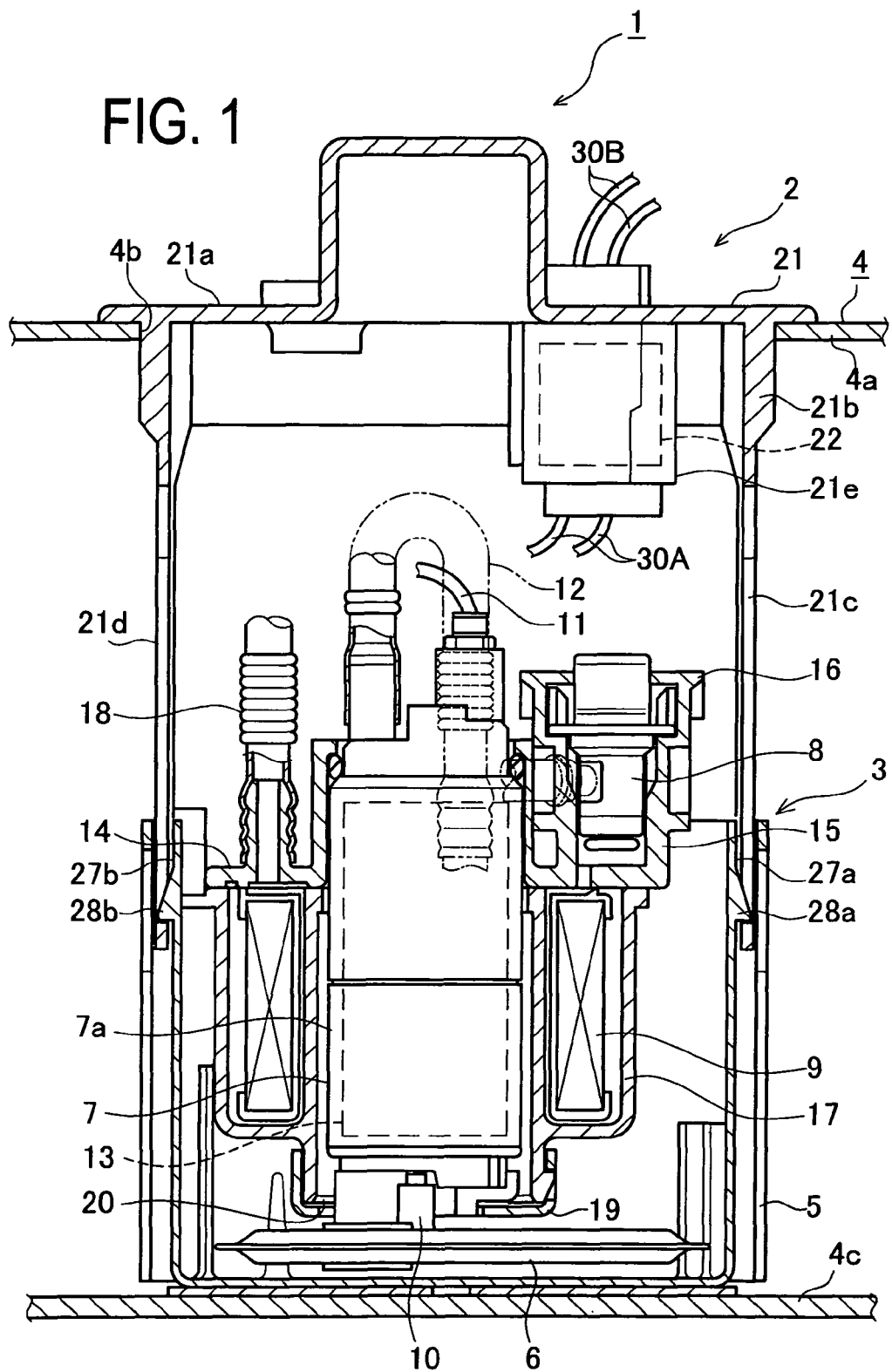
FIG. 1 is a sectional view of a fuel pump unit of a first embodiment.

FIG. 1 is a sectional view of a fuel pump unit 1 in the first embodiment. This fuel pump unit 1 is constituted by a unit upper part 2 and a unit lower part 3. The fuel pump unit 1 is mounted in a resin fuel tank 4 in use. The unit lower part 3 includes a reserve cup 5 having a bottom-closed cylindrical (i.e., nearly a cup) shape, a primary filter 6, a fuel pump 7, a pressure regulator 8, and a secondary filter 9. Those primary filter 6, fuel pump 7, pressure regulator 8, and secondary filter 9 are set in place in the reserve cup 5 as an assembly.

The primary filter 6 is constituted by a bag-shaped nylon filter and a resin skeleton packed therein. The inner space of the bag-shaped filter 6 communicates with an intake port of the fuel pump 7. The primary filter 6 is placed in the reserve cup 5 and along the bottom surface thereof. Foreign matters in fuel are mostly removed by the primary filter 6 and further removed by a secondary filter 9 mentioned later. Thus, the fuel from which the foreign matters have mostly been removed by the primary filter 6 is sucked in the fuel pump 7.

As shown in FIG. 1, the fuel pump 7 is of a nearly vertical columnar shape which is surrounded by a metal pump housing 7a. This housing 7a has a fuel suction pipe (not shown) in the bottom. The fuel suction pipe is connected to the primary filter 6 through a washer 10 formed of an E-ring. On the top of the fuel pump 7, an electric connector 11 and a fuel discharge pipe 12 are provided. The fuel pump 7 contains a motor 13 and can be driven by energization of the motor 13 through the electric connector 11. When driven, the fuel pump 7 sucks fuel from the reserve cup 5 through the primary filter 6, pressurizes the fuel to be discharged through the fuel discharge pipe 12.

The fuel discharge pipe 12 is connected to the pressure regulator 8. The pressure regulator 8 is a relief valve for maintaining fuel pressure in the fuel discharge pipe 12 at a predetermined value. The pressure regulator 8 is arranged to control the pressure of fuel to be supplied to the secondary filter 9 and hence the pressure of fuel to be supplied to an engine, to a predetermined value. The fuel released from the pressure regulator 8 as a result of controlling the fuel pressure is returned to the reserve cup 5 through a return pipe and a jet pump (both not shown). The pressure regulator 8 is held in a holder part 15 formed in a filter cover 14 mentioned later for receiving the pressure regulator 8. A cap 16 is attached to the holder part 15 to prevent the pressure regulator 8 from dropping down.

The fuel pump 7 is located in the center of a secondary filter case 17. The secondary filter 9 is annular. The fuel pump 7 is accommodated in the secondary filter case 17. Accordingly, the fuel pump 7 is circumferentially surrounded by the secondary filter case 17. An upper opening of the secondary filter case 17 is covered by the filter cover 14. The secondary filter case 17 and the filter cover 14 are molded of resin respectively. The secondary filter case 17 is divided into an inner chamber and an outer chamber by the secondary filter 9. The fuel discharge pipe 12 communicates with the outer chamber of the secondary filter case 17. The filter cover 14 is connected to the fuel supply pipe 18. The inner chamber of the secondary filter case 17 communicates with the fuel supply pipe 18. The fuel discharged from the fuel pump 7 flows from the outer chamber of the secondary filter case 17 to the inner chamber of the secondary filter case 17 through the secondary filter 9, and flows in the fuel supply pipe 18. This fuel supply pipe 18 is provided extending through the unit upper part 2 to the outside of the fuel tank 4. In the present embodiment, the fuel supply pipe 18 is connected to an injector (not shown) through a delivery pipe (not shown) provided in an engine (not shown). The fuel that is pressurized by the fuel pump 7, controlled to a constant pressure level by the pressure regulator 8, and allowed to pass through the primary filter 6 and the secondary filter 9 for removing foreign matters is supplied to the injector through those fuel supply pipe 18 and delivery pipe. The fuel pump 7 is inserted and set in a hollow of the secondary filter case 17 through a bottom opening thereof. The bottom of the secondary filter case 17 is attached with a stay 19 whereby the fuel pump 7 is prevented from dropping off the secondary filter case 17. A cushion rubber 20 is interposed between the fuel pump 7 and the stay 9 to elastically support the fuel pump 7.

As shown in FIG. 1, the unit upper part 2 includes a unit cover 21 molded of resin and a pump controller 22 mounted in the unit cover 21. The unit cover 21 is fixed to an upper wall 4a of the fuel tank 4 and includes a disk part 21a which covers a mounting hole 4b of the fuel tank 4, a cylindrical skirt part 21b extending from a lower surface of the disk part 21a, and a pair of guide rails 21c and 21d extending downward from the skirt part 21b. The skirt part 21b is formed to be fitted in the mounting hole 4b of the fuel tank 4. When the unit cover 21 is mounted so as to close the mounting hole 4b of the fuel tank 4, the fuel pump unit 1 is set in place in the fuel tank 4. The periphery edge portion of the disk part 21a of the unit cover 21 is bonded to an edge portion around the mounting hole 4b of the fuel tank 4 and secured with a bolt (not shown) tightened in the edge portion around the mounting hole 4b of the fuel tank 4. Thus, the unit cover 21 is secured to the fuel tank 4. The pump controller 22 is fixedly housed in a compartment 21e formed in the unit cover 21. This pump controller 22 is connected, at a lower surface of the unit cover 21, to a harness 30A (lead wires) extending from the fuel pump 7. Further, the pump controller 22 is connected, at an upper surface of the unit cover 21, to a power supply harness 30B. This harness 30B is connected to a battery or the like serving as a vehicle-mounted power supply.

Figure 2:
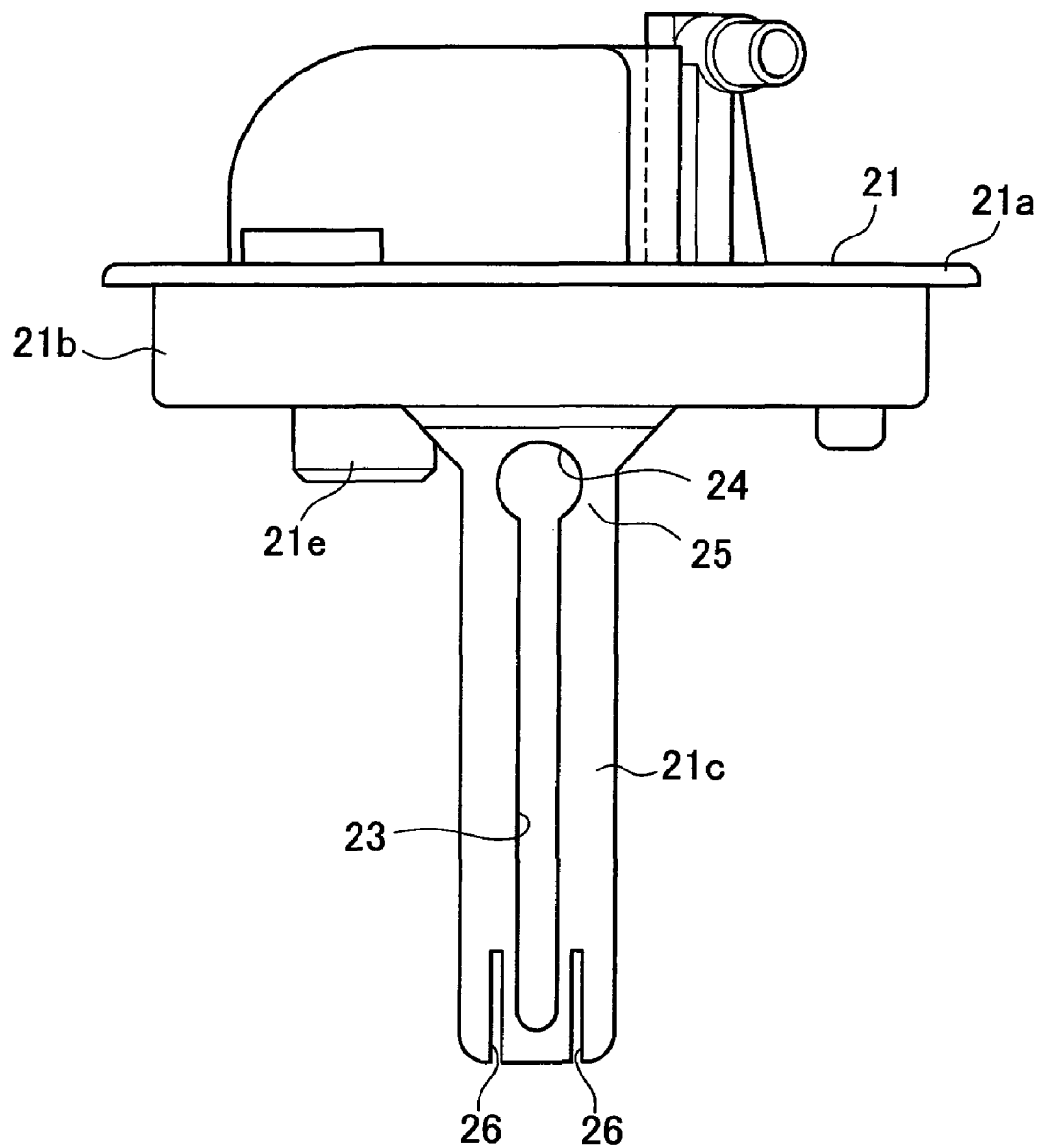
FIG. 2 is a side view of a unit cover in the first embodiment.
Figure 3:
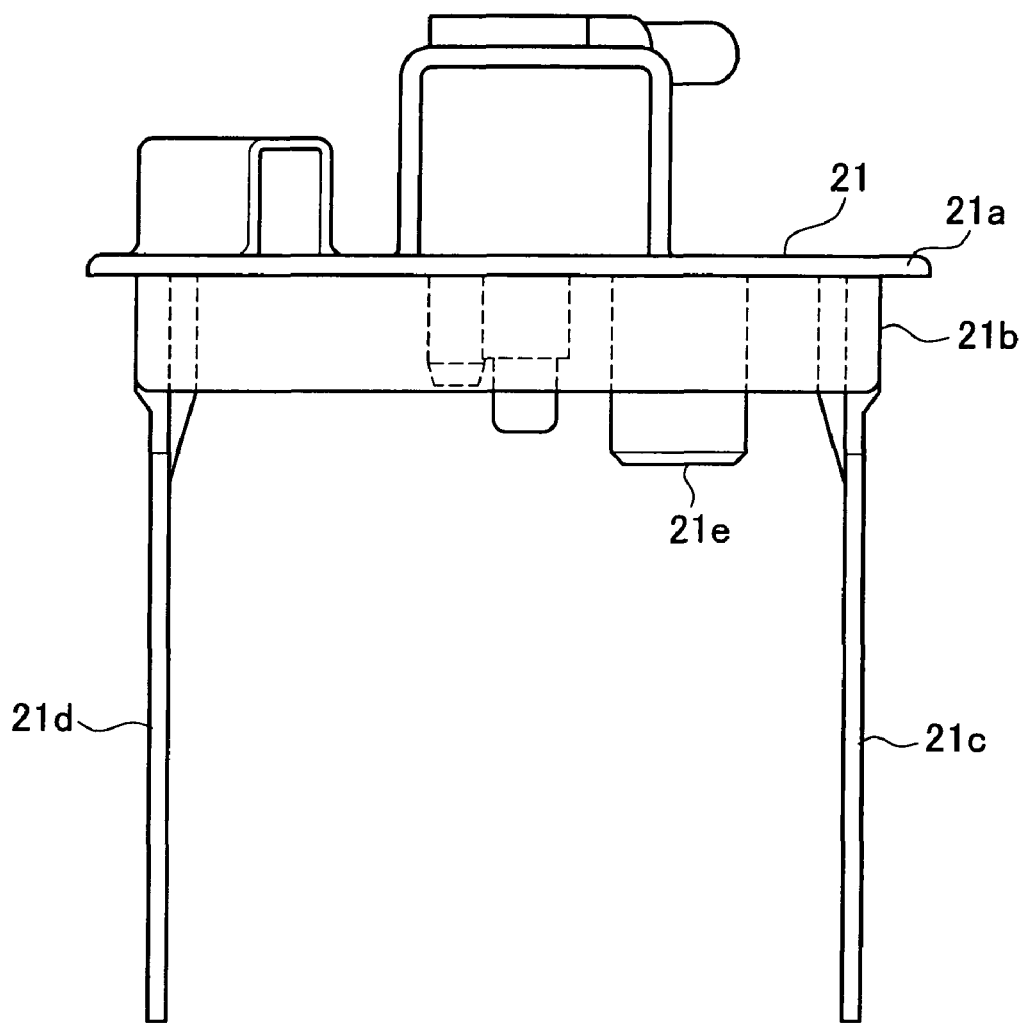
FIG. 3 is a front view of the unit cover in the first embodiment.
Figure 4:
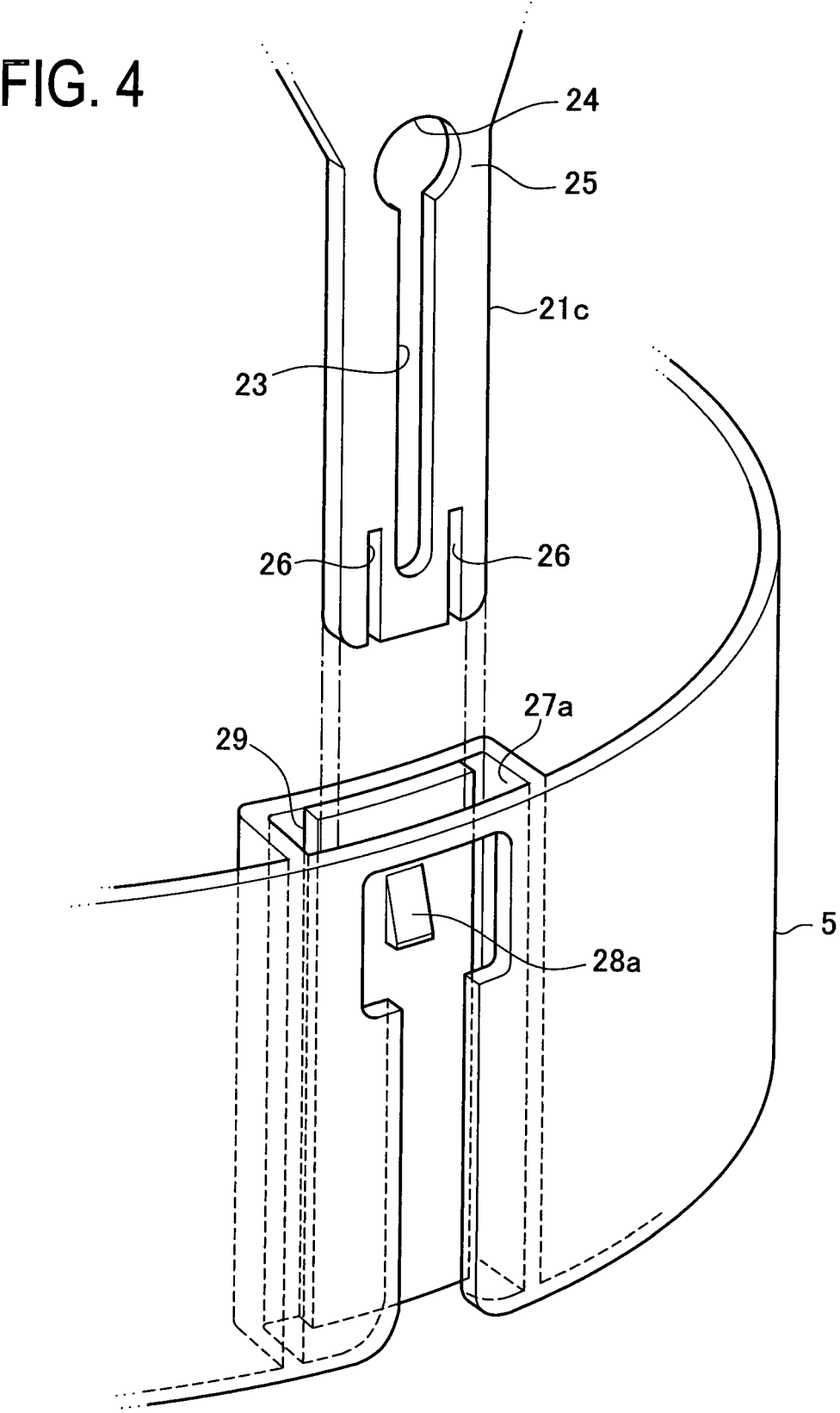
FIG. 4 is a perspective view showing a relationship between a guide rail and a reserve cup in the first embodiment.

FIG. 2 is a side view of the unit cover 21. FIG. 3 is a front view of the unit cover 21. FIG. 4 is a perspective view showing a relationship between one of the guide rails, 21c, and the reserve cup 5. As shown in FIGS. 2 and 3, the skirt part 21b of the unit cover 21 includes the pair of guide rails 21c and 21d each formed in flat plate shape extending downward. Each of the guide rails 21c and 21d is formed with a long hole 23 extending in a longitudinal direction in the center of the width thereof. An upper end of this long hole 23 is formed with a circular hole 24, providing a thin-width portion 25 on both sides of the hole 24. Each of the guide rails 21c and 21d is formed at its lower part with a pair of slits 26 extending upward from a lower end. The slits 26 are arranged on both sides of the long hole 23.

As shown in FIGS. 1 and 4, the reserve cup 5 is formed with a pair of sheath-shaped slots 27a and 27b in correspondence with the guide rails 21c and 21d respectively. In each slot 27a, 27b, the corresponding guide rail 21c or 21d is moveably inserted. When each slot 27a, 27b relatively moves along each guide rail 21c, 21d, the reserve cup 5 is slid along the guide rails 21c and 21d to move close to or away from the unit cover 21. The slots 27a and 27b are internally formed with protrusions 28a and 28b each tapering in section, respectively. Each protrusion 28a, 28b is configured to permit sliding of the corresponding guide rail 21c, 21d in one direction. In the process of assembling the reserve cup 5 with the unit cover 21, the guide rails 21c and 21d are elastically deformed to climb over the protrusions 28a and 28b. In normal use, the protrusions 28a and 28b are engaged in the ends of the long holes 23 of the guide rails 21c and 21d respectively to prevent separation of the unit cover 21 and the reserve cup 5.

In each of the slots 27a and 27b, a metal plate 29 is placed. This metal plate 29 serves to prevent the generation of abnormal noise and the like when the guide rails 21c and 21d slid in contact with the slots 27a and 27b that receive them. The metal plate 29 may be a stainless plate resistant to corrosion.

A compression spring (not shown) is interposed between the unit cover 21 and the reserve cup 5 to urge the reserve cup 5 toward a bottom wall 4c of the fuel tank 4. The fuel tank 4 is made of resin by blow molding and hence it may be deformed slightly depending on a remaining amount of fuel and a change in ambient temperature. The reserve cup 5 is always urged to abut on the bottom wall 4c of the fuel tank 4 against the deformation of the fuel tank 4.

In the present embodiment, meanwhile, the fuel pump unit 1 is installed in the fuel tank 4, but the fuel tank 4 is made of resin, which cannot shield electrical noise (radio noise) generated by the fuel pump 7 (its motor 13). A metal fuel tank conventionally used could provide a shielding function in itself to electrical noise. Therefore, even when the fuel pump is placed in such metal fuel tank, the electrical noise generated by the fuel pump would not cause a problem. On the other hand, the resin fuel tank 4 in the present embodiment having no shielding function in itself has to provide measures against electrical noise generated by the fuel pump 7 placed in the fuel tank 4. In the present embodiment, accordingly, the fuel pump unit 1 is provided with a configuration serving as measures against the electrical noise. This configuration will be explained below.

Figures 5, 6:
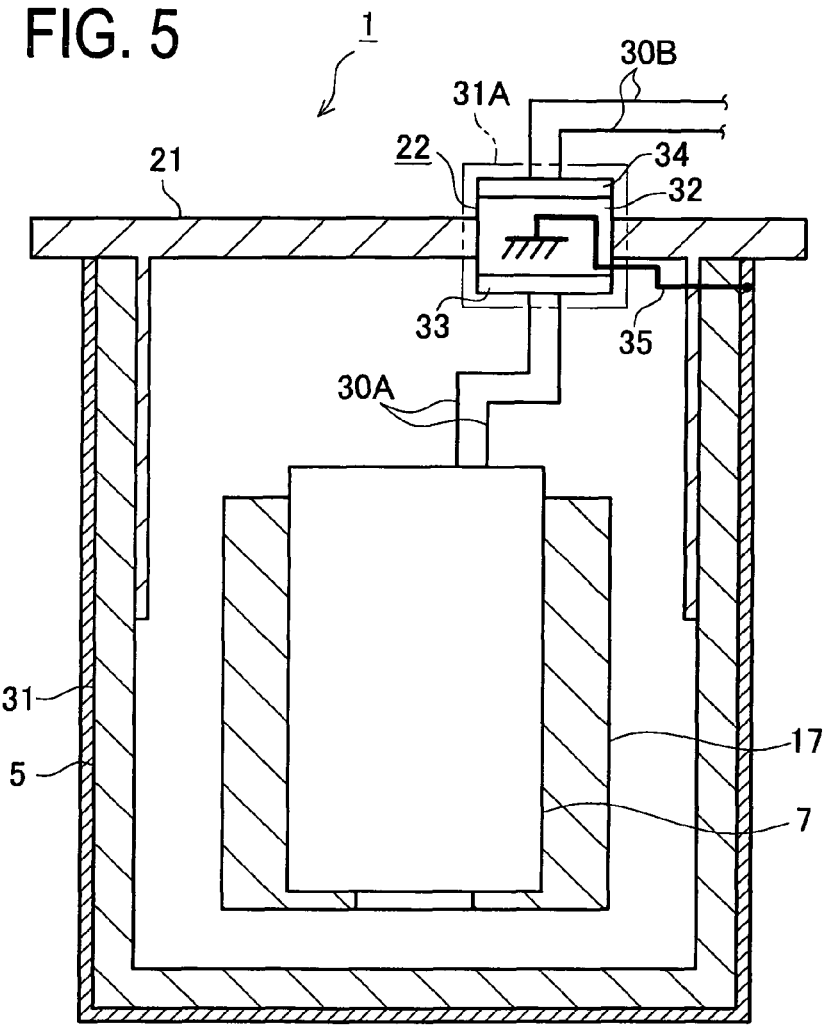
FIG. 5 is a schematic sectional view of the fuel pump unit in the first embodiment.
FIG. 6 is a table showing an electrical noise reduction effect in the first embodiment.

FIG. 5 is a schematic sectional view of the fuel pump unit 1. This fuel pump unit 1 includes as mentioned above the fuel pump 7, the secondary filter case 17 surrounding the outer periphery of the fuel pump 7 and containing the secondary filter 9, the reserve cup 5 holding the fuel pump 7 and the secondary filter case 17 and others, the unit cover 21 placed on the reserve cup 5, and the pump controller 22 mounted in the unit cover 21 to drivingly control the fuel pump 7. The fuel pump unit 1 in the present embodiment is provided with a shielding material 31 for shielding the electrical noise generated by the fuel pump 7. In the present embodiment, the shielding material 31 is provided in the outer peripheral wall and the bottom wall of the reserve cup 5. The shielding material 31 may be provided in such a way that the reserve cup 5 is made of an electrically conductive resin material, a metal mesh or net is inserted in the reserve cup 5 by insert molding, or the surface of the reserve cup 5 is coated with an electrically conductive coating or a single metal thin film. As the electrically conductive resin material, a material made by for example mixing metal into resin such as "SUS filler" may be adopted. The metal mesh or net may be made of metal such as "chromeplated iron and SUS". The single metal thin film may be a film made by for example aluminum evaporation, electroless plating, or the like. The electroless plating may be applied by use of a metal such as "electroless copper, electroless nickel". As one example, the electroless plating may be applied on the surface of PBT resin or PPS resin. Here, the electroless plating may be conducted by applying electroless nickel with a thickness of 0.5 µm on electroless copper with a thickness of 2 µm. The method using such electroless plating technique can form a continuous single metal thin film. This method, different from a technique conducted using an electrically conductive coating and an electrically conductive resin in which metal particles or metal fibers are dispersed in polymer, will not cause catalyst resistance due to the interposition of an insulator and can have an advantage that even a thin film provides a superior electromagnetic shielding effect.

In this embodiment, the pump controller 22 includes a pump drive circuit 32 for drivingly controlling the fuel pump 7. This drive circuit 32 is provided with first and second electric filters 33 and 34. In the present embodiment, the first electric filter 33 is located on a pump connecting side of the pump drive circuit 32, namely, on a side to be connected to the pump 7, between the pump drive circuit 32 and the fuel pump 7. Further, the second electric filter 34 is located on a power-supply connecting side of the pump drive circuit 32, namely, on a side to be connected to a vehicle-mounted battery. In the present embodiment, each of the electric filters 33 and 34 is formed of an LC filter.

In this embodiment, moreover, the shielding material 31 is connected to ground (earth). Specifically, the shielding material 31 is connected to the pump drive circuit 32 through an earth wire 35 and hence is grounded.

According to the configuration of the fuel pump unit 1 related to the measures against the electrical noise in the present embodiment mentioned above, even where the fuel pump unit 1 is installed in the resin fuel tank 4, the electrical noise generated by the fuel pump 7 can be shielded by the shielding material 31, reducing leakage of the electrical noise to the outside of the fuel pump unit 1. Accordingly, even where the fuel pump unit 1 is installed in the resin fuel tank 4, it is possible to prevent the electrical noise generated by the fuel pump 7 from adversely affecting the peripheral components or parts. In other words, the fuel pump unit 1 can prevent the adverse influence of the electrical noise on vehicle-mounted electric devices. In the present embodiment, particularly, the shielding material 31 is provided in or on the reserve cup 5, which needs no additional shielding material in the fuel tank 4 and others. It is therefore possible to easily ensure a space for the shielding material 31 and a work thereof. This can realize relatively compact and easy measures against electrical noise. In the present embodiment, furthermore, the shielding material 31 is provided in or on the outer peripheral wall and the bottom wall of the reserve cup 5, thereby especially reducing leakage of electrical noise from the fuel pump 7 in a horizontal direction and a downward direction. This is premised on that the fuel tank 4 is mounted on a vehicle and separated from a vehicle interior by a metal plate of a vehicle frame. Thus, measures against upward leakage of electrical noise from the fuel pump 7 is removed.

In the present embodiment, the ground connection of the shielding material 31 can increase the shielding effect to the electrical noise as compared with the case of the shielding material is not grounded. FIG. 6 is a table showing an electrical noise reduction effect. Regarding a case (1) where the shielding material and the ground connection are not provided, a case (2) where only the shielding material is provided, and a case (3) where the shielding material and the ground connection are provided, the table shows the electrical noise reduction effect obtained by measuring electrical noise in a frequency range A (100 to 150 kHz) and a frequency range B (500 to 1700 kHz) by a spectral analyzer. In the case (1), no electrical noise reduction effect was found in both the frequency ranges A and B. In the case (2), an electrical noise reduction effect of "20 to 25 dB" could be obtained in the frequency range A. In the case (3), an electrical noise reduction effect of "20 to 25 dB" could be obtained in the frequency range A and also an electrical noise reduction effect of "20 dB" could be obtained in the frequency range B. Accordingly, the ground connection of the shielding material 31 as mentioned in the present embodiment can prevent the adverse influence of the electrical noise to the outside in the frequency range B as well as in the frequency range A, thus enhancing the electrical noise reduction effect.

Figures 7, 8:
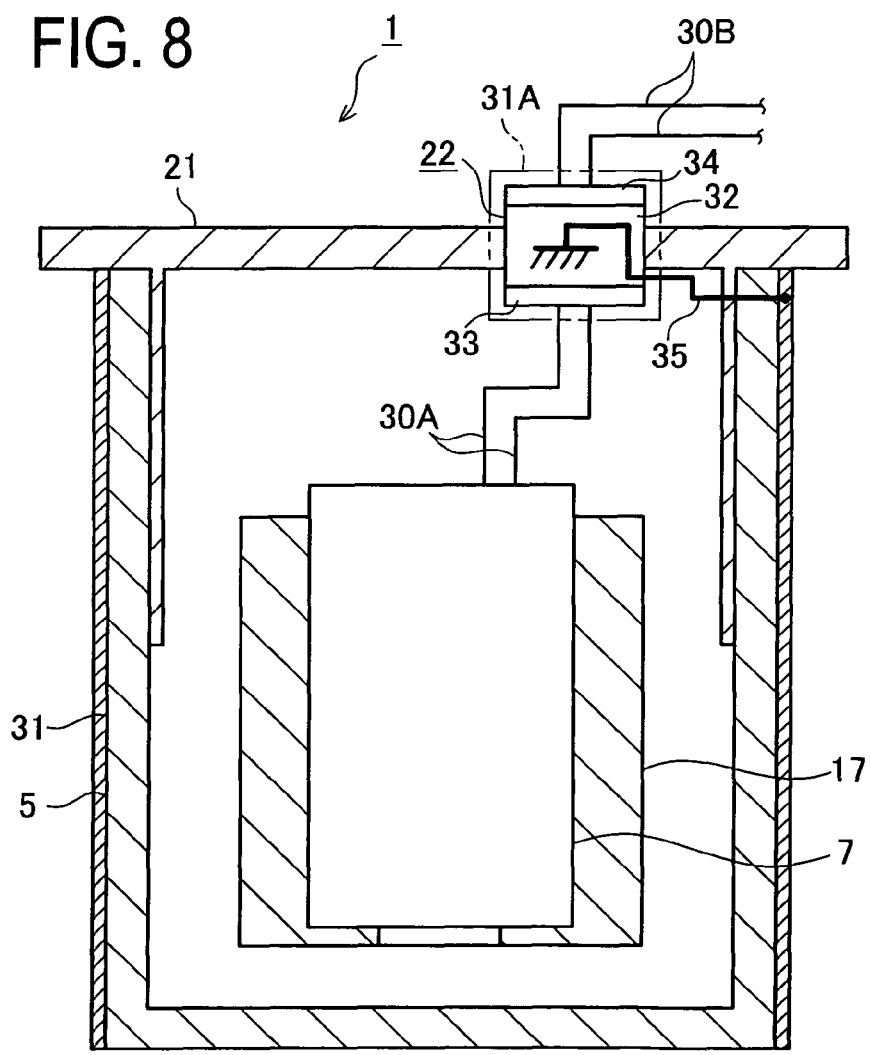
FIG. 7 is a table showing an electrical noise reduction effect in the first embodiment.
FIG. 8 is a schematic sectional view of a fuel pump unit in a second embodiment.

In the present embodiment, the first and second electric filters 33 and 34 are provided in the pump drive circuit 32. Accordingly, amplification of the electrical noise in the pump drive circuit 32 can be restrained by the electric filters 33 and 34. In particular, the second electric filter 34 is provided on the power-supply connecting side of the pump drive circuit 32, so that leakage of electrical noise from the pump drive circuit 32 to the outside can be reduced. Thus, the electrical noise reduction effect can be further enhanced by the presence of this second electric filter 34. Furthermore, the first electric filter 33 is provided on the pump connecting side of the pump drive circuit 32, so that entrance of the electrical noise from the fuel pump 7 to the pump drive circuit 32 can be restrained by the first electric filter 33. In this regard, the electrical noise reduction effect can be further enhanced by the presence of the first electric filter 33. FIG. 7 is another table showing the electrical noise reduction effect. Regarding a case (1) where no electric filter is provided and a case (2) where the electric filter is provided, the table shows the electrical noise reduction effect obtained by measuring electrical noise in the frequency range A (100 to 150 kHz) and the frequency range B (500 to 1700 kHz). In the case (1), no electrical noise reduction effect was found in both the frequency ranges A and B. In the case (2), on the other hand, an electrical noise reduction effect of "20 to 25 dB" could be obtained in the frequency range A and also an electrical noise reduction effect of "10 dB" could be obtained in the frequency range B. Accordingly, the ground connection of the shielding material 31 as mentioned in the present embodiment can provide the electrical noise reduction effect. In addition, the presence of the first electric filter 33 can contribute to further enhance the electrical noise reduction effect.

Embodiment 2

A second embodiment of a fuel pump unit embodying a fuel supply apparatus of the present invention will be explained below referring to the accompanying drawings.

FIG. 8 is a schematic sectional view of the fuel pump unit 1 in the second embodiment. This embodiment differs from the first embodiment in that the shielding material 31 is provided in or on only the outer peripheral wall of the reserve cup 5. Accordingly, this embodiment provides a smaller effect by the absence of the shielding material 31 in or on the bottom wall of the reserve cup 5 than the first embodiment. However, the present embodiment can still provide a sufficient electrical noise reduction effect. Operations and advantages related to the other configurations in the present embodiment are identical or similar to those in the first embodiment.

Embodiment 3

A third embodiment of a fuel pump unit embodying a fuel supply apparatus of the present invention will be explained below referring to the accompanying drawings.

Figure 9:
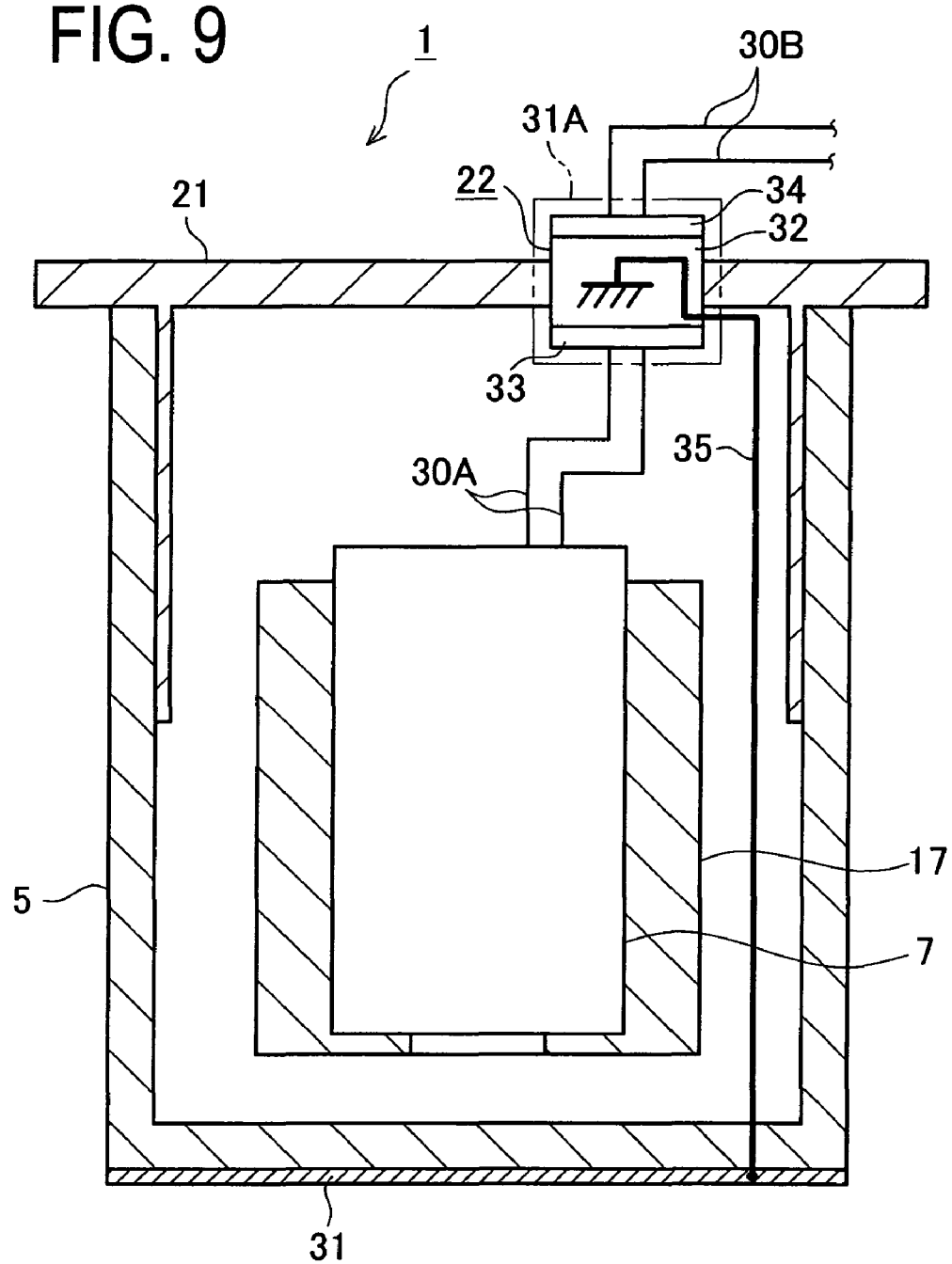
FIG. 9 is a schematic sectional view of a fuel pump unit in a third embodiment.

FIG. 9 is a schematic sectional view of the fuel pump unit 1 in the third embodiment. This embodiment differs from the first and second embodiments in that the shielding material 31 is provided in or on only the bottom wall of the reserve cup 5. Accordingly, this embodiment provides a smaller effect by the absence of the shielding material 31 in or on the outer peripheral wall of the reserve cup 5 than the first embodiment. However, the present embodiment can still provide a sufficient electrical noise reduction effect. Operations and advantages related to the other configurations in the present embodiment are identical or similar to those in the first embodiment.

Embodiment 4

A fourth embodiment of a fuel pump unit embodying a fuel supply apparatus of the present invention will be explained below referring to the accompanying drawings.

Figures 10, 11:
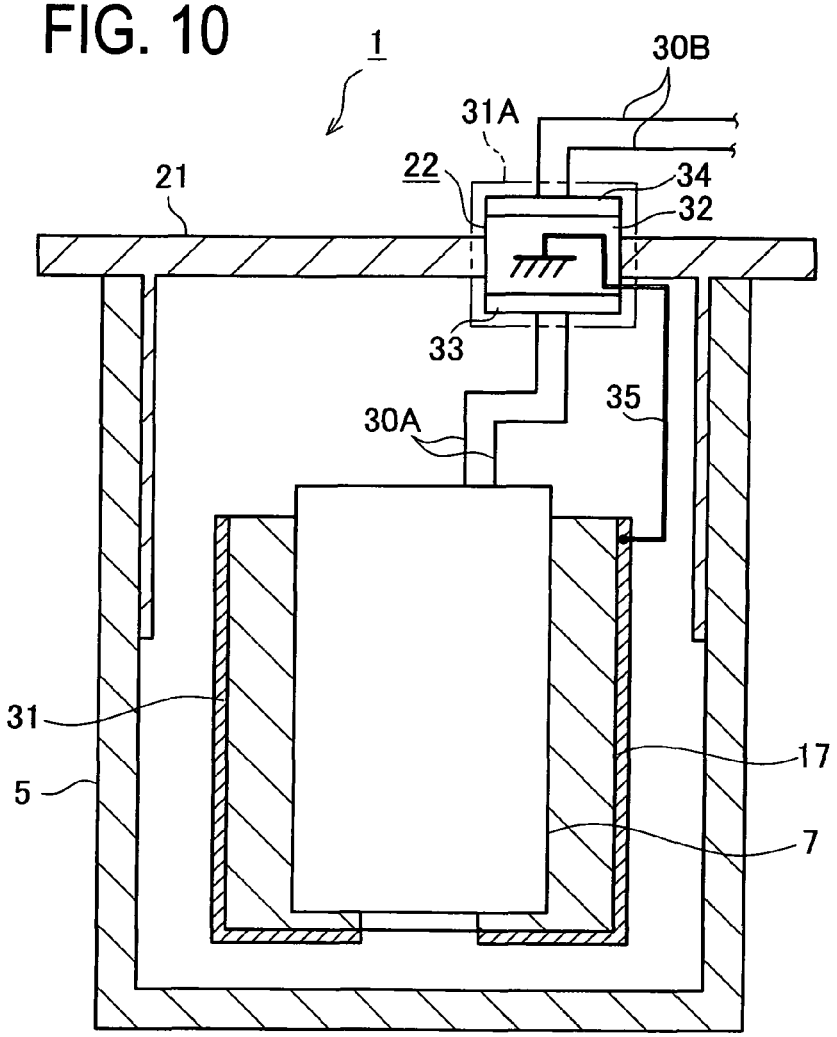
FIG. 10 is a schematic sectional view of a fuel pump unit in a fourth embodiment.
FIG. 11 is a table showing an electrical noise reduction effect in the fourth embodiment.

FIG. 10 is a schematic sectional view of the fuel pump unit 1 in the fourth embodiment. This embodiment differs from the aforementioned embodiments in that the shielding material 31 is provided in or on the outer peripheral wall and the bottom wall of the secondary filter case 17 instead of the reserve cup 5. Also in this embodiment, the shielding material 31 is connected to the pump drive circuit 32 through the earth wire 35 for ground connection. Here, The shielding material 31 may be provided in such a way that the secondary filter case 17 is made of an electrically conductive resin material, a metal mesh or net is inserted in the secondary filter case 17 by insert molding, the surface of the secondary filter case 17 is coated with an electrically conductive coating or a single metal thin film, or a metal ring is mounted on the outer periphery of the secondary filter case 17. The electrically conductive resin material and the materials for metal mesh or net and single metal thin film are the same as those in the first embodiment. The metal ring may be made of metal such as "chromeplated iron and SUS".

In the present embodiment, accordingly, the shielding material 31 is provided in or on the outer peripheral wall and the bottom wall of the secondary filter case 17. As in the aforementioned embodiments, the electrical noise generated by the fuel pump 7 can be shielded by the shielding material 31 and leakage of the electrical noise to the outside can be reduced. This makes it possible to prevent the electrical noise generated by the fuel pump 7 from adversely affecting the peripheral components or parts. In the present embodiment, the shielding material 31 is provided in or on the secondary filter case 17, needing no additional shielding material in the fuel tank 4 and others. It is therefore possible to easily ensure a space for the shielding material 31 and a work thereof. This can realize relatively compact and easy measures against electrical noise. Moreover, the shielding material 31 is provided closer to the source of electrical noise than the reserve cup 5, increasing the electrical noise shielding effect. In this regard, the configuration in the present embodiment can further enhance the electrical noise reduction effect than the aforementioned embodiments.

Also in the present embodiment, the shielding material 31 is grounded, increasing the electrical noise shielding effect. Accordingly, the electrical noise reduction effect can be enhanced by the ground connection. FIG. 11 is a table showing the electrical noise reduction effect. Regarding a case (1) where the shielding material and the ground connection are not provided, a case (2) where only the shielding material is provided, and a case (3) where the shielding material and the ground connection are provided, the table shows the electrical noise reduction effect obtained by measuring electrical noise in a frequency range A (100 to 150 kHz) and a frequency range B (500 to 1700 kHz). In the case (1), no electrical noise reduction effect was found in both the frequency ranges A and B. In the case (2), an electrical noise reduction effect of "10 dB" could be obtained in the frequency range A. In the case (3), an electrical noise reduction effect of "10 dB" could be obtained in the frequency range A and also an electrical noise reduction effect of "15 dB" could be obtained in the frequency range B. Accordingly, the ground connection of the shielding material 31 as mentioned in this embodiment can prevent the adverse influence of the electrical noise to the outside in the frequency range B as well as in the frequency range A, thus enhancing the electrical noise reduction effect.

In this embodiment, moreover, the shielding material 31 is provided in or on the outer periphery of the secondary filter case 17, needing no additional shielding material in the fuel tank 4 and others. It is therefore possible to easily ensure a space for the shielding material 31 and a work thereof. This can realize relatively compact and easy measures against electrical noise. Operations and advantages related to the other configurations in the present embodiment are identical or similar to those in the first embodiment.

Embodiment 5

A fifth embodiment of a fuel pump unit embodying a fuel supply apparatus of the present invention will be explained below referring to the accompanying drawings.

Figure 12:
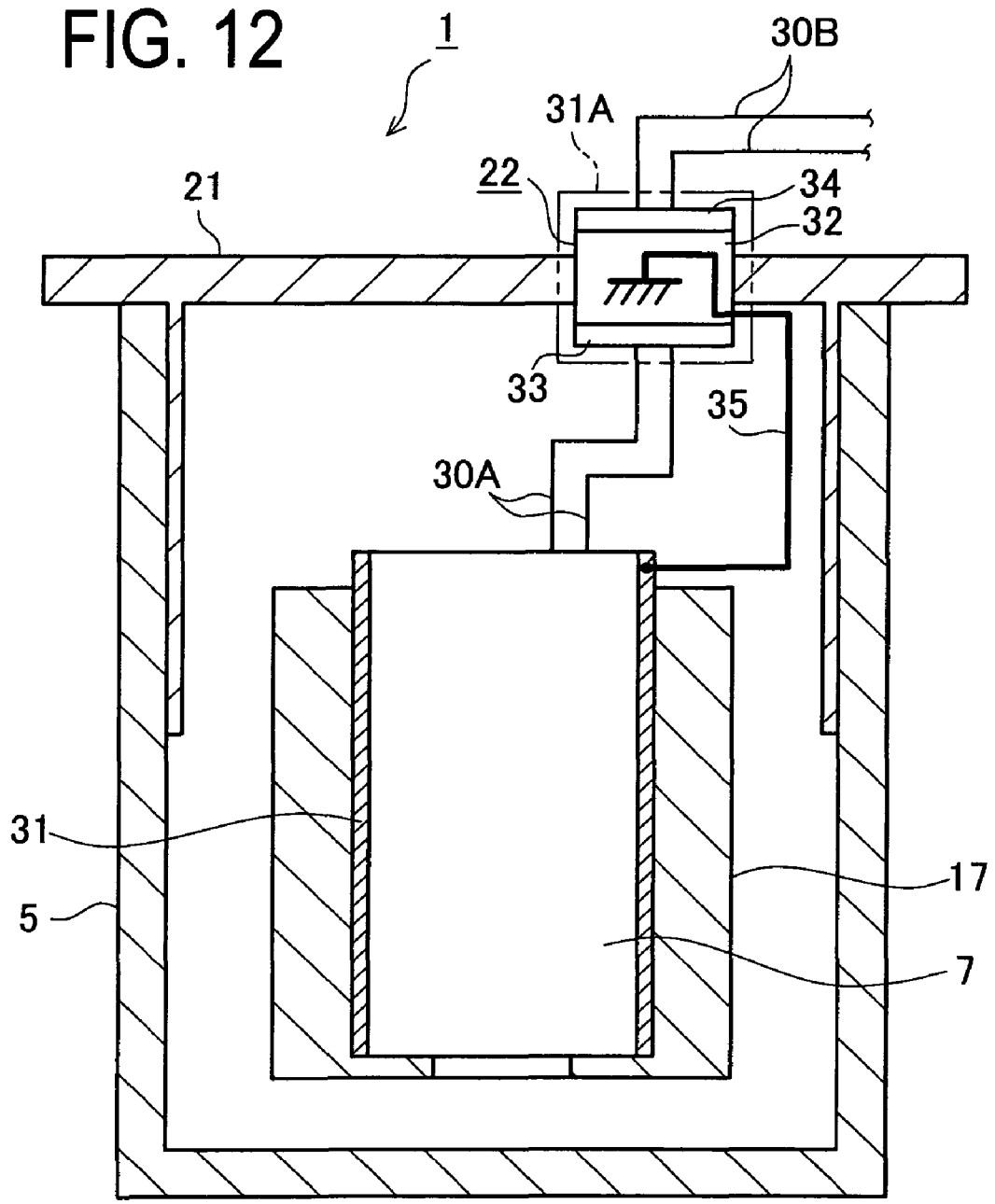
FIG. 12 is a schematic sectional view of a fuel pump unit in a fifth embodiment.

FIG. 12 is a schematic sectional view of the fuel pump 1 in the fifth embodiment. This embodiment differs from the aforementioned embodiments in that the shielding material 31 is provided in or on the outer periphery of the fuel pump 7 instead of the reserve cup 5 and the secondary filter case 17. Also in this embodiment, the shielding material 31 is connected to the pump drive circuit 32 through the earth wire 35 for ground connection. Here, the shielding material 31 may be a metal ring mounted on the outer periphery of the pump housing. The metal ring may be made of metal such as "chromeplated iron and SUS".

In this embodiment, accordingly, the shielding material 31 is provided in or on the outer periphery of the fuel pump 7. As in the aforementioned embodiments, the electrical noise generated by the fuel pump 7 can be shielded by the shielding material 31 and leakage of the electrical noise to the outside can be reduced. This makes it possible to prevent the electrical noise generated by the fuel pump 7 from adversely affecting the peripheral components or parts. In the present embodiment, particularly, the shielding material 31 is provided closest to the fuel pump 7 which is the source of electrical noise, so that the electrical noise shielding effect can be most increased. In this regard, the configuration in the present embodiment can most enhance the electrical noise reduction effect than the aforementioned embodiments. In addition, the ground connection of the shielding material 31 can further increase the electrical noise reduction effect.

In this embodiment, the shielding material 31 is provided in or on the outer periphery of the fuel pump 7. It is therefore possible to easily ensure a space for the shielding material 31 and a work thereof. This can realize relatively compact and easy measures against electrical noise. Operations and advantages related to the other configurations in the present embodiment are identical or similar to those in the first embodiment.

Embodiment 6

A sixth embodiment of a fuel pump unit embodying a fuel supply apparatus of the present invention will be explained below referring to the accompanying drawings.

Figures 13, 14:
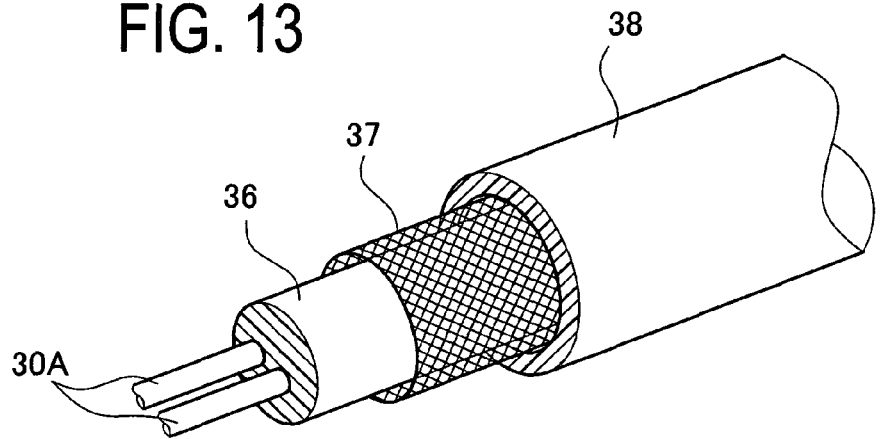
FIG. 13 is a perspective view of a shielding material placed to cover an outer periphery of a harness in a sixth embodiment.
FIG. 14 is a table showing an electrical noise reduction effect in the sixth embodiment.

This embodiment differs from the aforementioned first to fifth embodiments in that harness 30A for connecting the fuel pump 7 and the pump controller 22 are applied with a shielding material on the outer periphery and the shielding material is grounded. FIG. 13 is a schematic view of one example of a shielding material 37 provided surrounding the harness 30A. In this embodiment, the harness 30A is externally coated with an inner-layer insulation material 36 such as resin. This insulation material 36 is externally covered with the shielding material 37 formed of wire-mesh knitted in a cylindrical shape. Those insulation material 36 and shielding material 37 are covered by an outer-layer insulation material 38 such as synthetic rubber. In the above manner, the shielding material 37 is provided on the outer periphery of the harness 30A.

In the present embodiment, accordingly, the electrical noise which attempts to travel from the fuel pump 7 to the pump drive circuit 32 of the pump controller 22 through the harness 30A can be restrained by the shielding material 37 surrounding the harness 30A. It is therefore possible to enhance the electrical noise reduction effect by the presence of the shielding material 37 provided on the outer periphery of the harness 30A. In the present embodiment, the ground connection of the shielding material 37 can increase the shielding effect to the electrical noise as compared with the case of the shielding material is not grounded. In this regard, the electrical noise reduction effect can be further enhanced.

FIG. 14 is a table showing the electrical noise reduction effect. This table shows test results performed with a focus on only the effects produced by the presence of the shielding material and the ground connection with respect to the harness. Regarding a case (1) where the shielding material and the ground connection are not provided around the harness, a case (2) where only the shielding material is provided around the harness, and a case (3) where the shielding material and the ground connection are provided around the harness, the table shows the electrical noise reduction effect obtained by measuring electrical noise in a frequency range A (100 to 150 kHz) and a frequency range B (500 to 1700 kHz) by a spectral analyzer. In the case (1), no electrical noise reduction effect was found in both the frequency ranges A and B. In the case (2), an electrical noise reduction effect of "5 dB" could be obtained in both the frequency ranges A and B. In the case (3), an electrical noise reduction effect of "20 dB" could be obtained in both the frequency ranges A and B. Accordingly, the ground connection of the shielding material 37 as mentioned in the present embodiment can prevent the adverse influence of the electrical noise to the outside in both the frequency ranges A and B, thus enhancing the electrical noise reduction effect. Operations and advantages related to the other configurations in the present embodiment are identical or similar to those in the first to fifth embodiments.

Embodiment 7

A seventh embodiment of a fuel pump unit embodying a fuel supply apparatus of the present invention will be explained below referring to the accompanying drawings.

This embodiment differs from the aforementioned first to sixth embodiments in that the shielding material 31A is provided on or around the outer periphery of the pump drive circuit 32 or the electric filters 33 and 34 and the shielding material 31A is grounded, as shown by a chain double-dashed line in FIGS. 5, 8, 9, 10, and 12 respectively. Here, the shielding material 31A provided on or around the pump drive circuit 32 or the electric filters 33 and 34 may be a metal case or a resin case formed with a metal plating layer.

In the present embodiment, accordingly, the electrical noise which attempts to travel from the fuel pump 7 to the pump drive circuit 32 or the electric filters 33 and 34 and radiate from the pump drive circuit 32 or the electric filters 33 and 34 can be prevented by the shielding material 31A on or around the outer periphery of each device 32 to 34. It is therefore possible to enhance the electrical noise reduction effect by the presence of the shielding material 31A. Further, the electrical noise shielding effect is increased by the ground connection of the shielding material 31A, thus further enhancing the electrical noise reduction effect. Operations and advantages related to the other configurations in the present embodiment are identical or similar to those in the first to sixth embodiments.

Embodiment 8

An eighth embodiment of a fuel pump unit embodying a fuel supply apparatus of the present invention will be explained below referring to the accompanying drawings.

Figure 15:
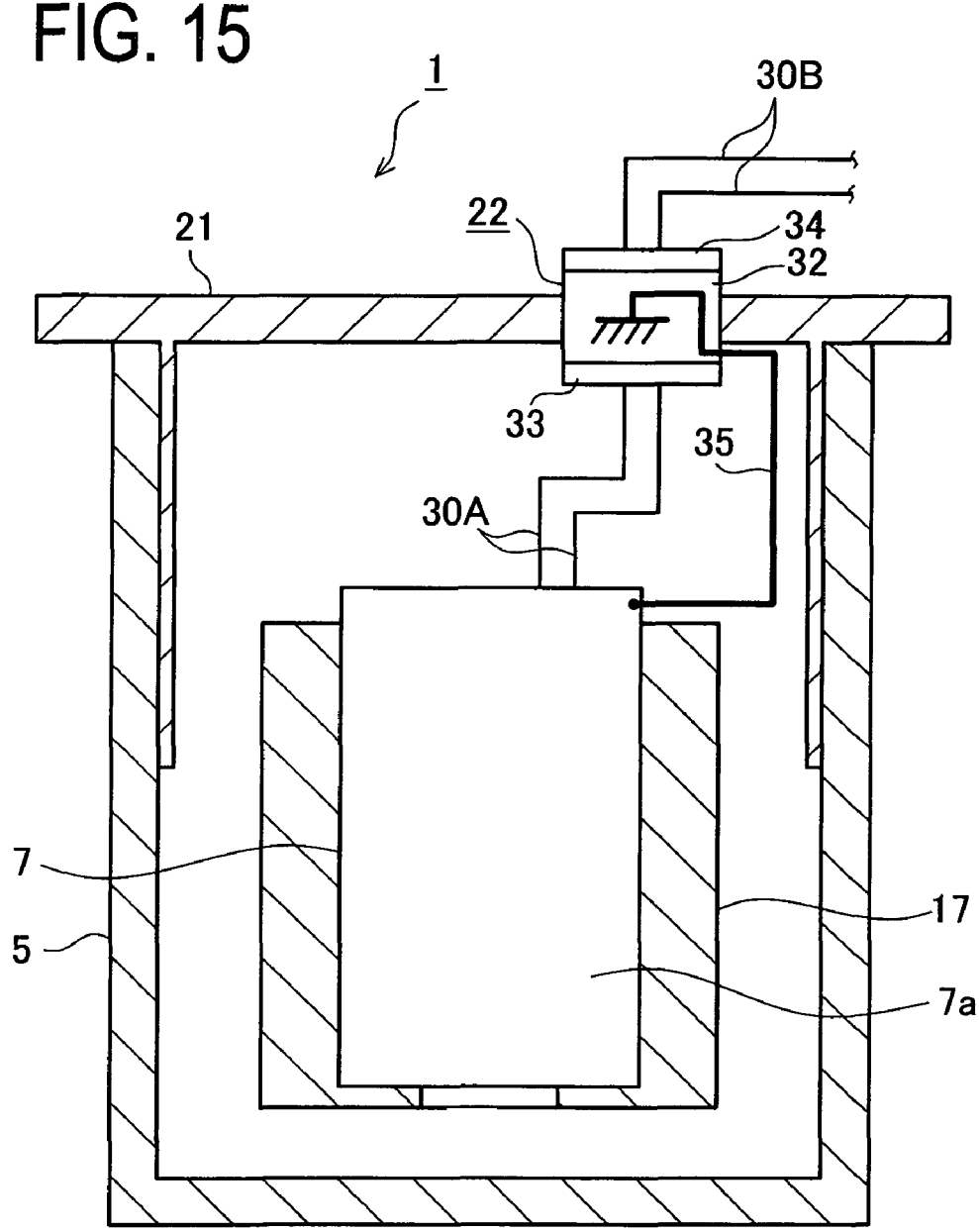
FIG. 15 is a schematic sectional view of a fuel pump unit in an eighth embodiment.

FIG. 15 is a schematic sectional view of the fuel pump unit 1 in the eighth embodiment. This embodiment differs from the aforementioned first to seventh embodiments in that the shielding material 31 is removed and instead thereof the pump housing 7a forming the outer surface of the fuel pump 7 is connected to the pump drive circuit 32 through the earth wire 35 for ground connection. In the present embodiment, the pump housing 7a corresponds to the electrically conductive outer surface member of the invention. In other words, in the present embodiment, a special shielding material is not used, but the pump housing 7a of the fuel pump 7 is utilized as the shielding material and hence the pump housing 7a is grounded.

In the present embodiment, therefore, the pump housing 7a of the fuel pump 7 functions as the shielding material. Accordingly, even where the fuel pump unit 1 is installed in the resin fuel tank 4, the electrical noise generated by the fuel pump 7 can be shielded by the pump housing 7a, reducing leakage of the electrical noise to the outside. Even where the fuel pump unit 1 is installed in the resin fuel tank 4, it is possible to prevent the electrical noise generated by the fuel pump 7 from affecting the peripheral components or parts. In the present embodiment, especially, the shielding material is not used but the earth wire 35 is simply connected to the pump housing 7a, needing no additional shielding material in the fuel tank 4 and the fuel pump unit 1, thus facilitating manufacture thereof. This can realize relatively compact and easy measures against electrical noise. Operations and advantages related to the other configurations in the present embodiment are identical or similar to those in the first embodiment.

Embodiment 9

A ninth embodiment of a fuel pump unit embodying a fuel supply apparatus of the present invention will be explained below referring to the accompanying drawings.

Figure 16:
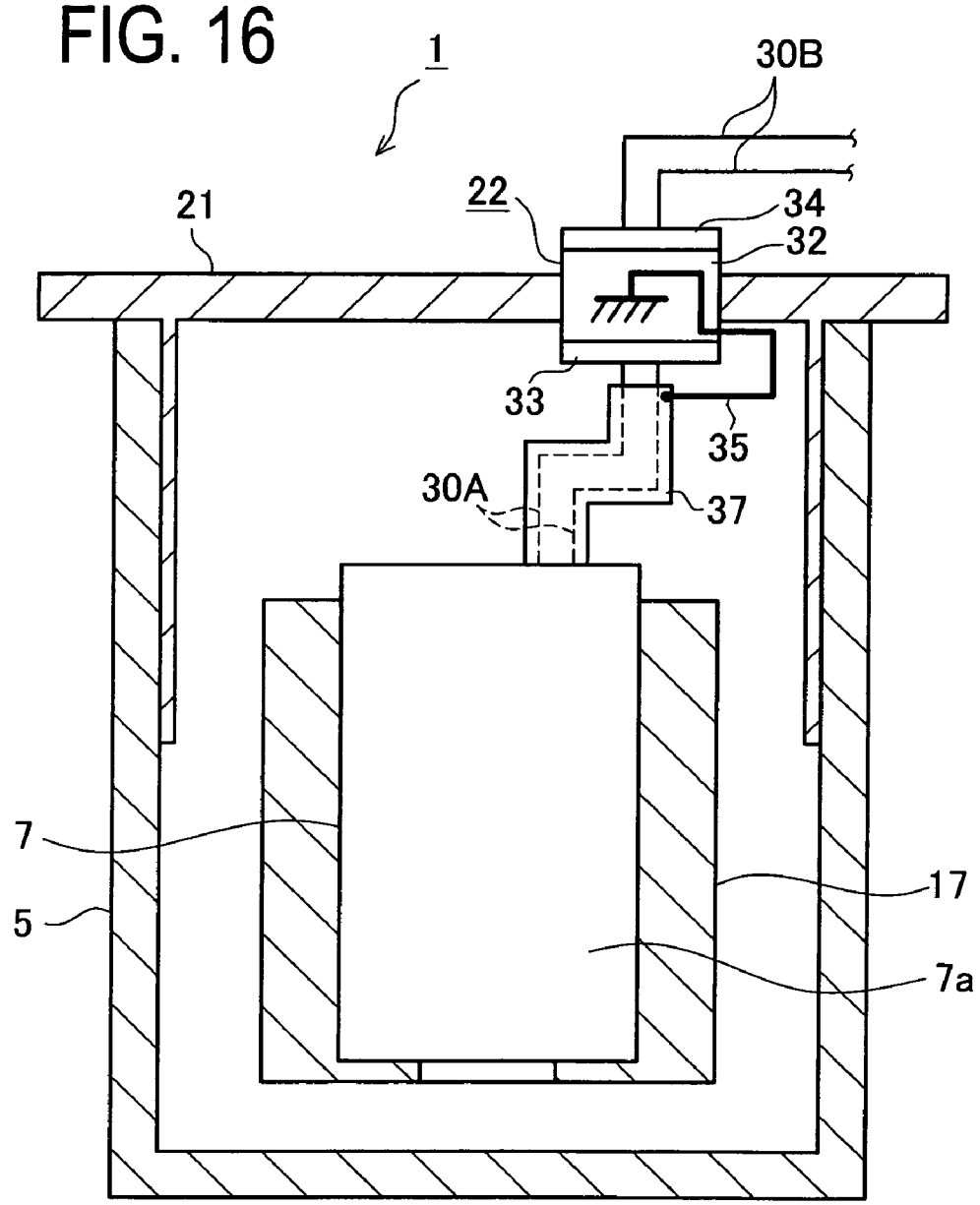
FIG. 16 is a schematic sectional view of a fuel pump unit in a ninth embodiment.

FIG. 16 is a schematic sectional view of the fuel pump unit 1 in the ninth embodiment. This embodiment differs from the eighth embodiment in that the shielding material 37 is provided covering the harness 30A that connect the fuel pump 7 and the pump controller 22, instead of providing the earth wire 35 between the fuel pump 7 and the pump drive circuit 32. One end of this shielding material 37 is connected to the pump housing 7a, while the other end of the shielding material 37 is connected to the pump drive circuit 32 through the earth wire 35 for ground connection. As the shielding material 37, for example, the wiring integrally made of the harness 30A and the shielding material 37 as shown in FIG. 13 may be used.

In the present embodiment, accordingly, the electrical noise which attempts to travel from the fuel pump 7 to the pump drive circuit 32 through the harness 30A can be restrained by the shielding material 37 covering the harness 30A. It is therefore possible to enhance the electrical noise reduction effect by the presence of the shielding material 37. In the present embodiment, moreover, the other end of the shielding material 37 is connected to the pump drive circuit 32 through the earth wire 35, so that the earth wire 35 can be shortened to simplify the earth structure. Operations and advantages related to the other configurations in the present embodiment are identical or similar to those in the eighth embodiment.

According to the present embodiment, as compared with the case where the shielding material 37 and the earth wire 35 are not provided, the electrical noise reduction effect of "15 dB" can be obtained in both the frequency region A (100 to 150 kHz) and the frequency region B (500 to 1700 kHz).

Embodiment 10

A tenth embodiment of a fuel pump unit embodying a fuel supply apparatus of the present invention will be explained below referring to the accompanying drawings.

Figure 17:
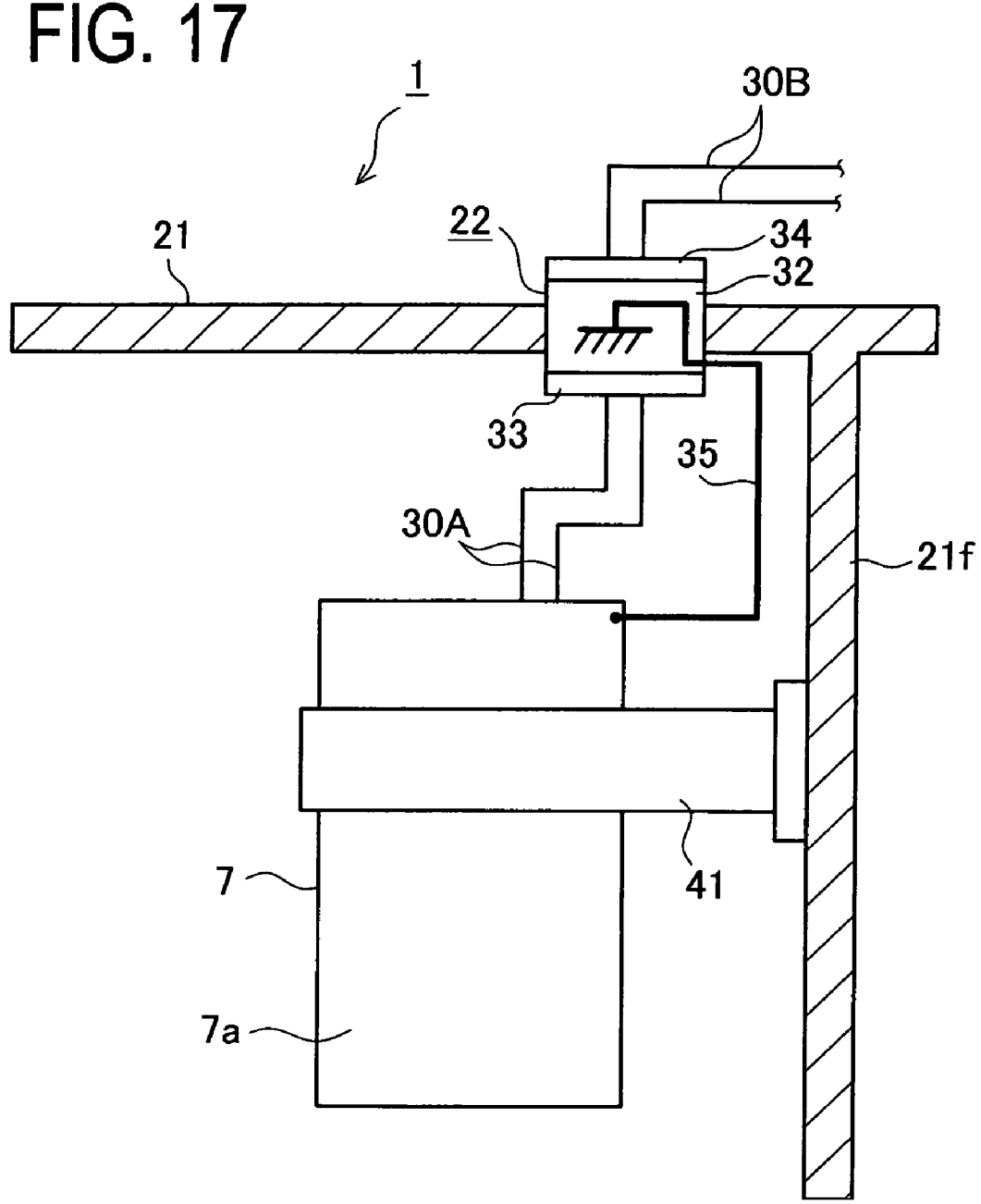
FIG. 17 is a schematic sectional view of a fuel pump unit in a tenth embodiment.

FIG. 17 is a schematic sectional view of the fuel pump unit 1 in the tenth embodiment. This fuel pump unit 1 in this embodiment, different from that of the eighth embodiment, does not include the reserve cup 5, the secondary filter 9, and the secondary filter case 17. The unit cover 21 is formed with a bracket 21f extending downward. The fuel pump 7 is supported with respect to the bracket 21f by a belt 41. In the present embodiment, as with the eighth embodiment, the pump housing 7a corresponding to the electrically conductive outer surface member of the invention is connected to the pump drive circuit 32 through the earth wire 35. In other words, in the present embodiment, a special shielding material is not used but the pump housing 7a of the fuel pump 7 is utilized as the shielding material and hence the pump housing 7a is grounded. Thus, the present embodiment can provide the same operations and advantages related to the electrical noise generated by the fuel pump 7 as those in the eighth embodiment.

Embodiment 11

An eleventh embodiment of a fuel pump unit embodying a fuel supply apparatus of the present invention will be explained below referring to the accompanying drawings.

Figure 18:
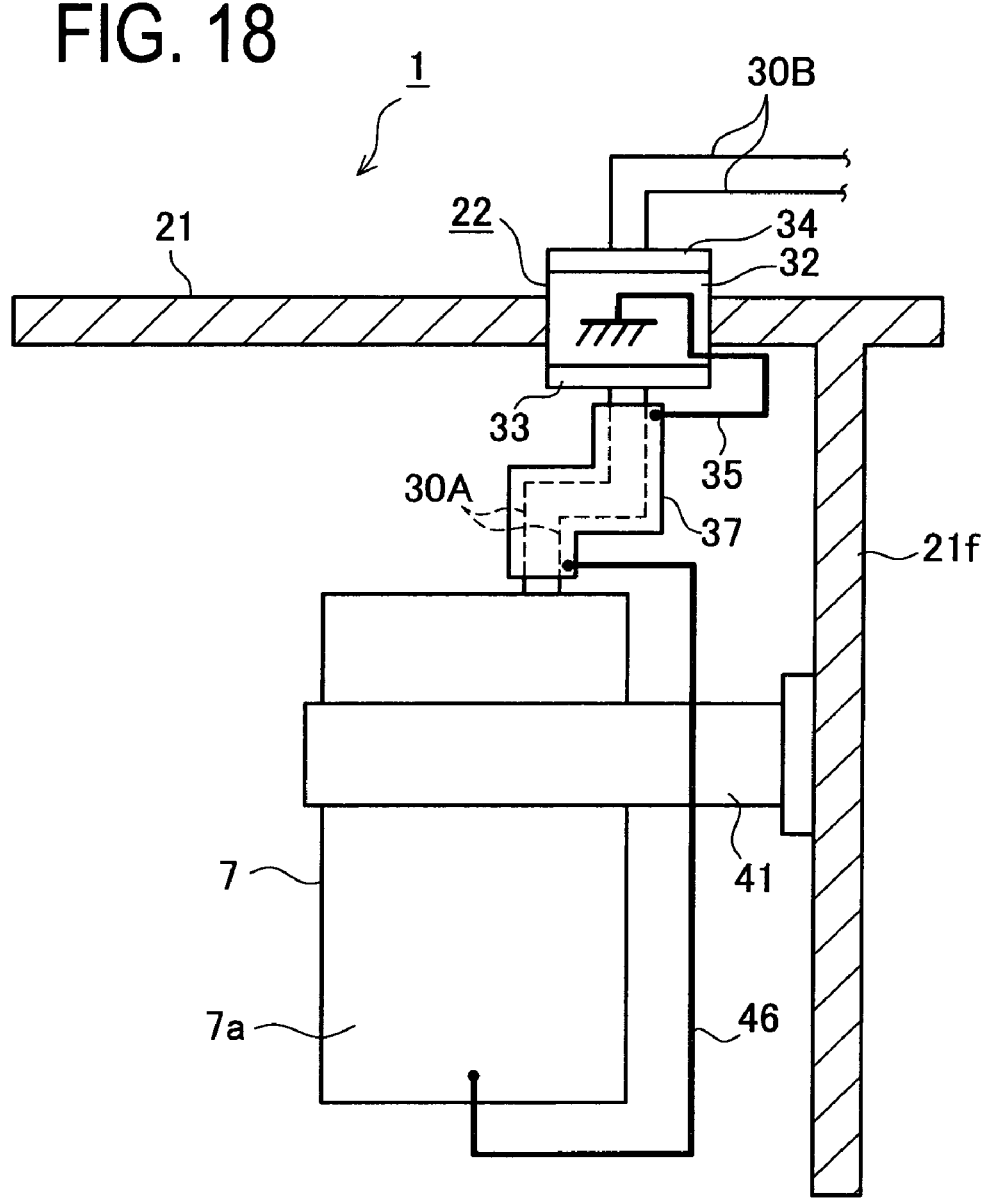
FIG. 18 is a schematic sectional view of a fuel pump unit in an eleventh embodiment.

FIG. 18 is a schematic sectional view of the fuel pump unit 1 in the eleventh embodiment. The fuel pump unit 1 in this embodiment differs from that of the tenth embodiment in that the shielding material 37 is provided covering the harness 30A that connect the fuel pump 7 and the pump controller 22. One end of the shielding material 37 is connected to the pump drive circuit 32 through the earth wire 35 for ground connection. Further, the pump housing 7a is connected to the shielding material 37 through another shielded wire 46 to connect the pump housing 7a to ground via the shielding material 37.

Figure 19:
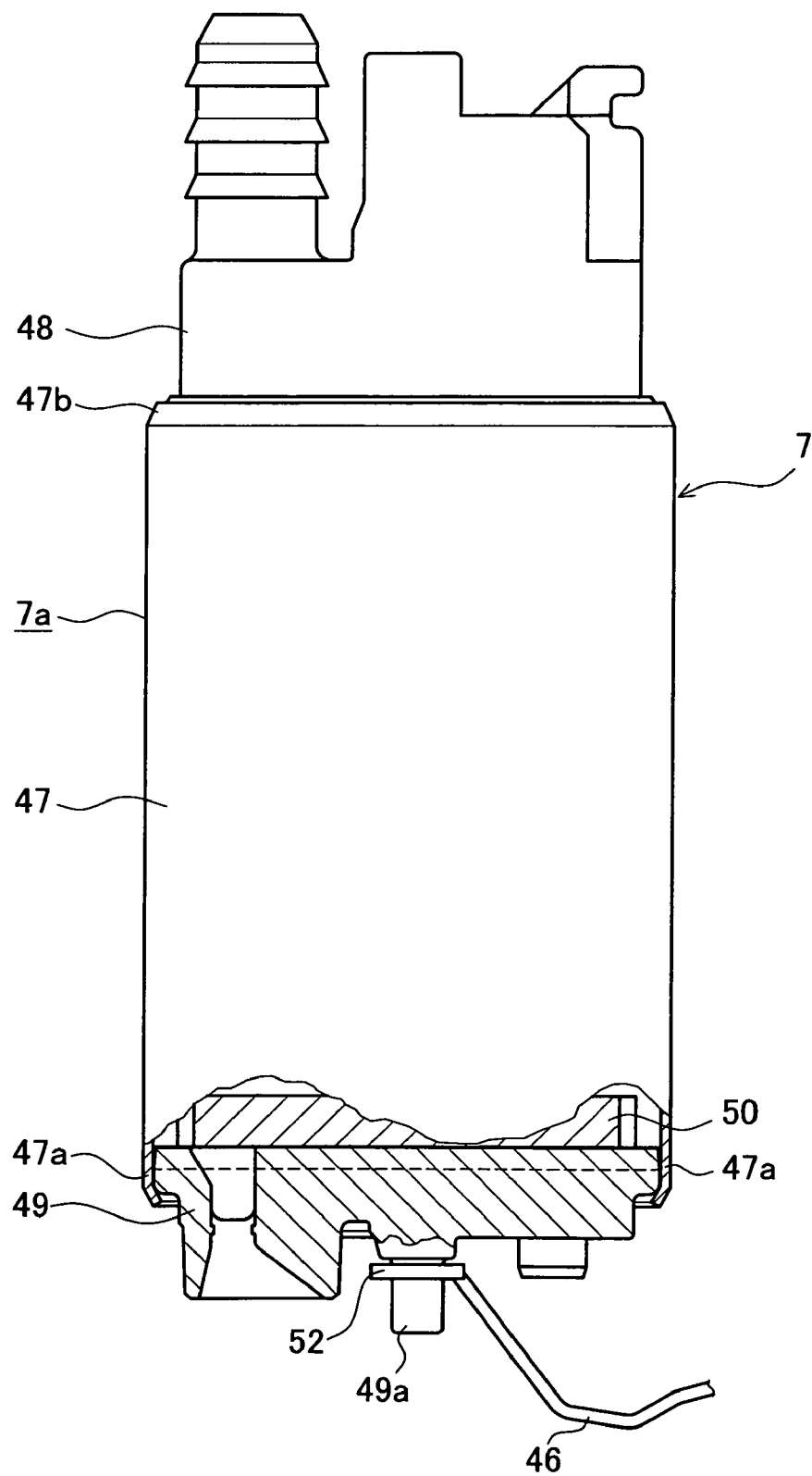
FIG. 19 is a partly sectional side view of the fuel pump in the eleventh embodiment.

FIG. 19 is a partly sectional side view of the fuel pump 7 in this embodiment. The pump housing 7a of the fuel pump 7 in this embodiment includes a cylindrical housing 47, an upper body 48 provided on the housing 47, and a lower body 49 provided under the housing 47. On the lower body 49, an impeller 50 of the fuel pump 7 is placed to be slidable. In the present embodiment, the housing 47 is basically made of a steel plate and applied thereon with zinc plating, and the surface is applied with a chromate layer which is an electrically non-conducting member. In the present embodiment, the upper body 48 is made of resin. FIG. 20 is a side view of the lower body 49. FIG. 21 is a plan view of the lower body 49. The lower body 49 in the present embodiment is made of aluminum and the surface thereof excepting a part is coated with an electrically conductive film or layer. However, as indicated by cross-hatching in FIGS. 20 and 21, the upper part of the lower body 49 is covered by an insulation film 51 by alumite treatment. This insulation film 51 is provided as measures against wear due to sliding of the impeller 50 and protection against rust. As shown in FIG. 19, a lower end 47a of the housing 47 is caulked on an upper periphery of the lower body 49 to assemble the housing 47 and the lower body 49 together. The lower end 47a is in contact with a portion of the insulation film 51 as shown in FIG. 19 and also in contact with a portion of the conductive film other than the insulation film 51. The surface of the housing 47 is coated with the chromate layer which is the electrically non-conductive member, excepting the lower end 47a from which the chromate layer is removed so that the electrically conductive material is exposed. The above caulking of the lower end 47a provides electrical conductivity between the housing 47 and the lower body 49. An upper end 47b of the housing 47 and the upper body 48 are similarly assembled together by caulking. As shown in FIG. 14, the lower body 49 is formed with a protrusion 49a at a center of a lower surface. The aforementioned shielded wire 46 is connected to this protrusion 49a through an E-ring 52. Thus, the shielded wire 46 is connected to the lower body 49.

According to the fuel pump unit 1 in this embodiment, the housing 47 and the lower body 49 constituting the pump housing 7a of the fuel pump 7 function as the shielding material. Even where the fuel supply apparatus is installed in the resin fuel tank 4, the electrical noise generated by the fuel pump 7 is shielded by the housing 47 and the lower body 49, reducing leakage of the electrical noise to the outside. Accordingly, even where the fuel pump unit 1 is installed in the resin fuel tank 4, it is possible to prevent the electrical noise generated by the fuel pump 7 from adversely affecting the peripheral components or parts. Especially, the electrical noise radiated in a lateral direction and a downward direction of the fuel pump 7 can be more reduced. Further, the electrical noise which attempts to travel from the fuel pump 7 to the pump controller 22 through the harness 30A can be restrained by the shielding material 37. It is therefore possible to enhance the electrical noise reduction effect by the presence of the shielding material 37 covering the harness 30A. Moreover, the housing 47 and the lower body 49 constituting the pump housing 7a are connected to ground via the shielded wire 46 and the shielding material 37. As compared with the case where they are not grounded, the electrical noise shielding effect can be more increased. In this regard, the electrical noise reduction effect can be further enhanced.

FIG. 22 is a table showing the electrical noise reduction effect in the present embodiment. This table shows test results performed with a focus on only the effects produced by the presence of the shielding material and the ground connection with respect to the harness. Regarding a case (1) where the shielding material and the ground connection are not provided around the harness, a case (2) where only the shielding material is provided around the harness, and a case (3) where the shielding material and the ground connection are provided around the harness and the pump housing is connected to the shielding material for ground connection, the table shows the electrical noise reduction effect obtained by measuring electrical noise in a frequency range A (100 to 150 kHz) and a frequency range B (500 to 1700 kHz) by a spectral analyzer. In the case (1), no electrical noise reduction effect was found in both the frequency ranges A and B. In the case (2), an electrical noise reduction effect of "5 dB" could be obtained in both the frequency ranges A and B. In the case (3), an electrical noise reduction effect of "15 dB" could be obtained in the frequency range A and an electrical noise reduction effect of "20 dB" could be obtained in the frequency range B. Accordingly, connecting of the pump housing 7a to the shielding material 37 for the ground connection can prevent the adverse influence of the electrical noise to the outside in both the frequency ranges A and B, thus enhancing the reduction effect.

In the present embodiment, the surfaces of the housing 47 and the lower body 49 are partly formed of an electrically conductive material (an electrically conductive film) so that the conductive material (the conductive film) portions of the housing 47 and the lower body 49 are connected to each other. This connection can easily provide electrical conductivity between the housing 47 and the lower body 49.

Embodiment 12

A twelfth embodiment of a fuel pump unit embodying a fuel supply apparatus of the present invention will be explained below referring to the accompanying drawings.

Figure 23:
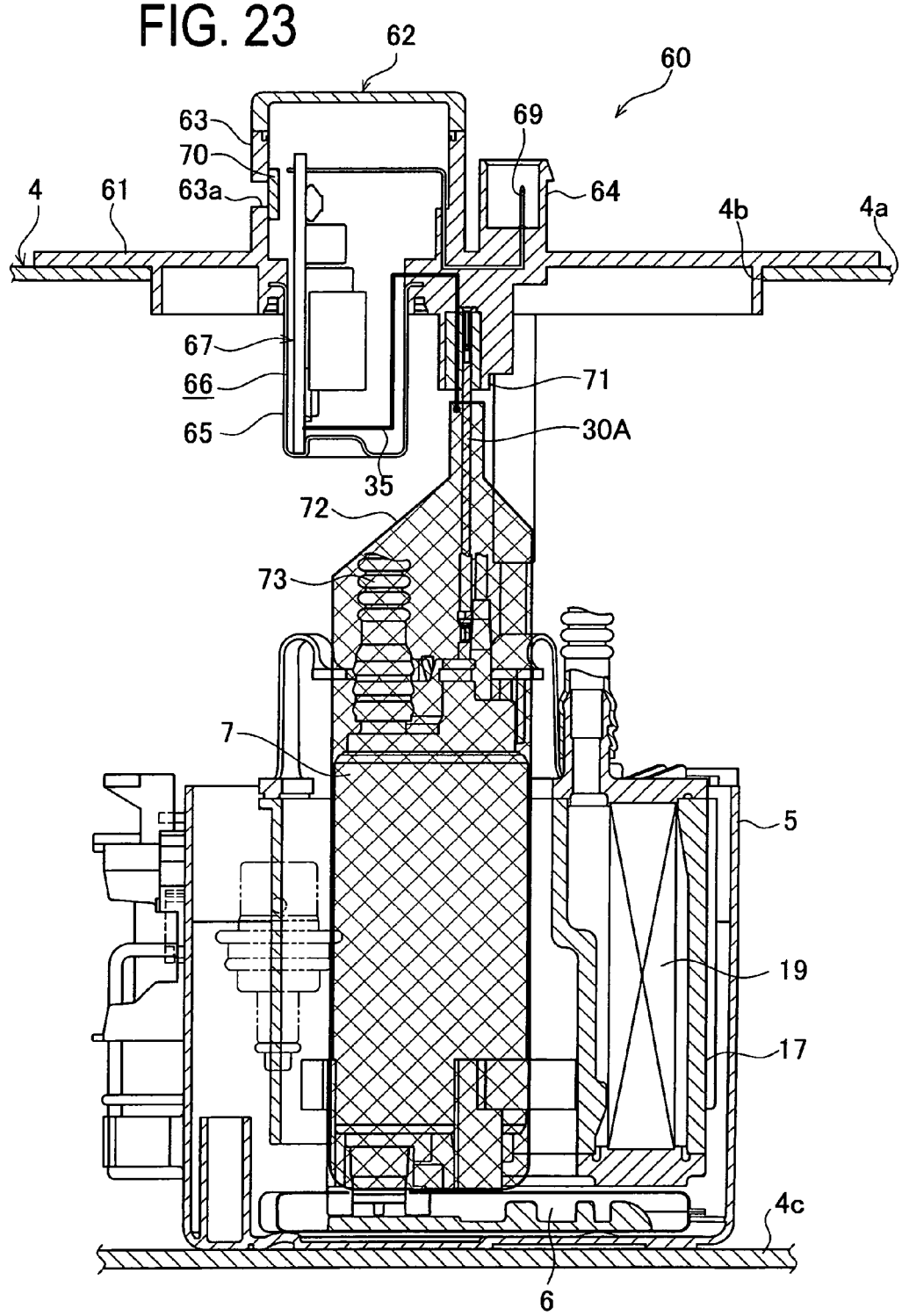
FIG. 23 is a partly sectional side view showing a state where a fuel pump unit is installed in a fuel tank in a twelfth embodiment.

FIG. 23 is a partly sectional side view showing a state where a fuel pump unit 60 in this embodiment is installed in the fuel tank 4. This fuel pump unit 60 includes a set plate 61, the reserve cup 5 supported by the set plate 61, the primary filter 6 placed in the reserve cup 5, the fuel pump 7, the secondary filter case 17, and others. In the present embodiment, a controller 62 constituting a pump drive circuit of the invention is integrally provided with the set plate 61. Specifically, the set plate 61 is integrally formed with a case 63 and a connector 64 which are formed protruding upward to the outside (on an upper surface side). Additionally, on the upper surface of the set plate 61, other parts (not shown) related to the fuel pump 7 and others are formed protruding to the outside. On the lower surface of the set plate 61, a metal cup 65 is attached under the case 63. This cup 65 is located in the fuel tank 4. The inside of the cup 65 communicates with the inside of the case 63. The cup 65 is assembled with the set plate 61 by insert molding. In the present embodiment, the case 63 and the cup 65 constitute a container 66 of the controller 62. In this container 66, a pump drive circuit 67 is placed. This pump drive circuit 67 is fixed to the cup 65. A distal end of an external terminal 69 extending from the pump drive circuit 67 is arranged inside the connector 64. The case 63 is formed with a vent hole 63a opening to outside air. The case 63 is internally provided with a filter 70 covering the vent hole 63a.

The set plate 61 is integrally formed with a connector 71 protruding from the lower surface of the set plate 61. This connector 71 is connected to the harness 30A that electrically connects the fuel pump 7 and the controller 62. In the present embodiment, the fuel pump 7 and the harness 30A are integrally covered by an electrically conductive mesh shielding material 72. The mesh shielding material 72 used in this embodiment is a cable shielding product made in such a way that a metal fine wire having light weight and superior flexibility is knitted in stockinet into a cylindrical shape. This mesh shielding material 72 is arranged to entirely enclose, like a bag, the fuel pump 7 and the harness 30A. This mesh shielding material 72 is grounded through the pump drive circuit 67 of the controller 62 with the earth wire 35 connected to the upper end of the shielding material 72. The material of the shielding material 72 may include for example a tinned copper wire, iron alloy, copper alloy, tin alloy, etc.

According to the fuel pump unit 60 in this embodiment, consequently, the fuel pump 7 and the harness 30A are externally coated integrally by the conductive mesh shielding material 72. Thus, the electrical noise generated by the fuel pump 7 or the electrical noise which attempts to travel from the fuel pump 7 to the pump drive circuit 67 through the harness 30A can be shielded and restrained by the mesh shielding material 72. Even where the fuel pump 7 and the harness 30A constituting the fuel pump unit 60 are placed in the resin fuel tank 4, the electrical noise generated by the fuel pump 7 or the electrical noise which attempts to travel from the fuel pump 7 to the pump drive circuit 67 through the harness 30A can be prevented from adversely affecting the peripheral components or parts. In this embodiment, moreover, the fuel pump 7 is entirely covered by the mesh shielding material 72, resulting in a reduction of electrical noise from the fuel pump 7 itself. Thus, the electrical noise radiated from the fuel pump 7 in all directions can be more reduced.

Here, an explanation will be given to differences in electrical noise reduction effect between the configuration including the measures against electrical noise such as the electric filter or the like and the configuration including no measures against electrical noise. In the present embodiment, regarding a case (1) where the electric filter is provided as the measures against electrical noise, a case (2) where only the fuel pump is covered by the mesh shielding material which is grounded, and a case (3) where the fuel pump and the harness are entirely covered by the mesh shielding material which is grounded, the electrical noise in a frequency range A (100 to 150 kHz) and a frequency range B (500 to 1700 kHz) was measured by a spectral analyzer. In the case (1), an electrical noise reduction effect of "30 dB" could be obtained in the frequency range A and an electrical noise reduction effect of "20 dB" could be obtained in the frequency range B. In the case (2), an electrical noise reduction effect of "15 dB" could be obtained in both the frequency ranges A and B. In the case (3), further, an electrical noise reduction effect of "30 dB" could be obtained in both the frequency ranges A and B. In the present embodiment where the fuel pump 7 and the harness 30A are entirely integrally covered by the mesh shielding material 72, it is found that the adverse influence of the electrical noise to the outside can be prevented in both the frequency ranges A and B, thus enhancing the electrical noise reduction effect.

In the present embodiment using the mesh shielding material 72, the configuration is simpler than the electric filter to achieve the electrical noise, resulting in a cost reduction. Further, since there is no need for the electric filter in the controller 62, the dimension of a circuit substrate of the pump drive circuit 67 can be reduced and downsizing of the controller 62 can be achieved. The electrical noise reduction can be realized in the fuel pump 7 itself, so that the use of a choke coil and a condenser or the like as measures against electrical noise, which are generally built in or attached close to the pump, can be withdrawn.

As shown in FIG. 23, the fuel pump 7 includes a resin fuel pipe 73 which is apt to build up static electricity. In the present embodiment, the fuel pump 7 and the harness 30A are entirely covered by the mesh shielding material 72 which is connected to ground. Accordingly, the pressure regulator (a metal component) provided in the fuel pump unit does not have to be grounded by terminal-connection to an earth wire as measures against static electricity. The mesh shielding material 72 can also be used as a constituent component for ground connection. The ground connection of the mesh shielding material 72 can further enhance the electrical noise reduction effect.

Moreover, in the present embodiment, the mesh shielding material 72 is provided over the fuel pump 7 and the harness 30A. Therefore, no additional shielding material has to be provided in the fuel tank 4 and others and it is possible to easily ensure a space for the mesh shielding material 72 and a work thereof. Since the mesh shielding material 72 is provided for the fuel pump 7 and the harness 30A, it requires only a simple work of entirely covering the fuel pump 7 and the harness 30A together by the mesh shielding material 72. This configuration for measures against electrical noise that the fuel pump 7 and the harness 30A are covered together by the mesh shielding material 72 can facilitate the work thereof as compared with the measures against electrical noise applied to the fuel pump 7 and the harness 30A separately. Further, the mesh shielding material 72 can be easily provided over the harness 30A. Thus, relatively compact and easy measures against electrical noise can be realized.

Embodiment 13

A thirteenth embodiment of a fuel pump unit embodying a fuel supply apparatus of the present invention will be explained below referring to the accompanying drawings.

Figure 24:
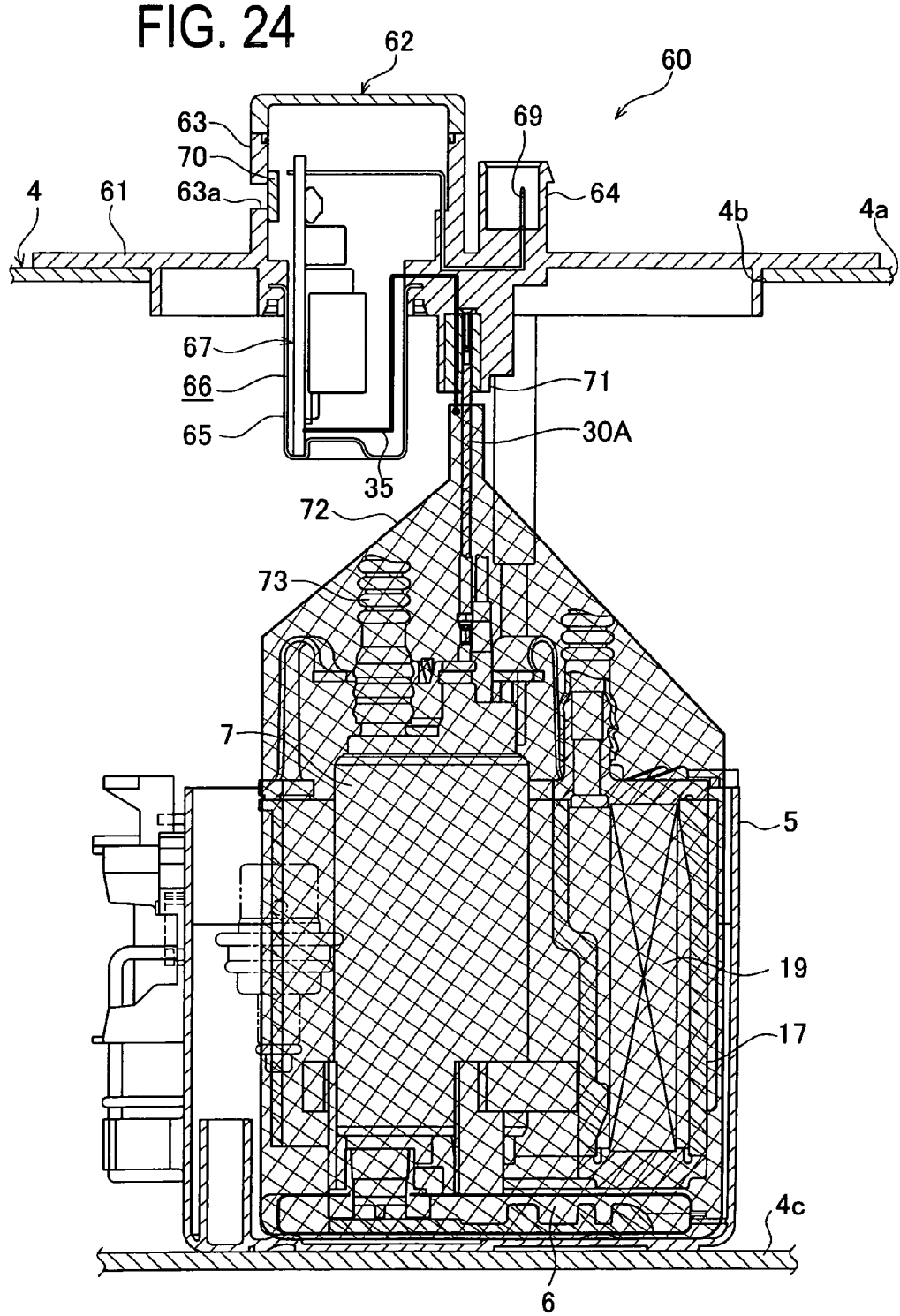
FIG. 24 is a partly sectional side view showing a state where a fuel pump unit is installed in a fuel tank in a thirteenth embodiment.

FIG. 24 is a partly sectional side view showing a state where the fuel pump unit 60 of this embodiment is installed in the fuel tank 4. This embodiment differs from the twelfth embodiment in that the fuel pump 7, the secondary filter case 17, and the harness 30A are entirely integrally covered by the mesh shielding material 72. Other configurations are identical to those in the twelfth embodiment.

Accordingly, the present embodiment can also provide operations and advantages identical or similar to those in the twelfth embodiment. In this embodiment, particularly, the mesh shielding material 72 is provided for the fuel pump 7, the secondary filter case 17, and the harness 30A. It therefore requires only a simple work of entirely covering the fuel pump 7, the secondary filter case 17, and the harness 30A together by the mesh shielding material 72. In this regard, the work for measures against electrical noise can be facilitated.

Embodiment 14

A fourteenth embodiment of a fuel pump unit embodying a fuel supply apparatus of the present invention will be explained below referring to the accompanying drawings.

Figure 25:
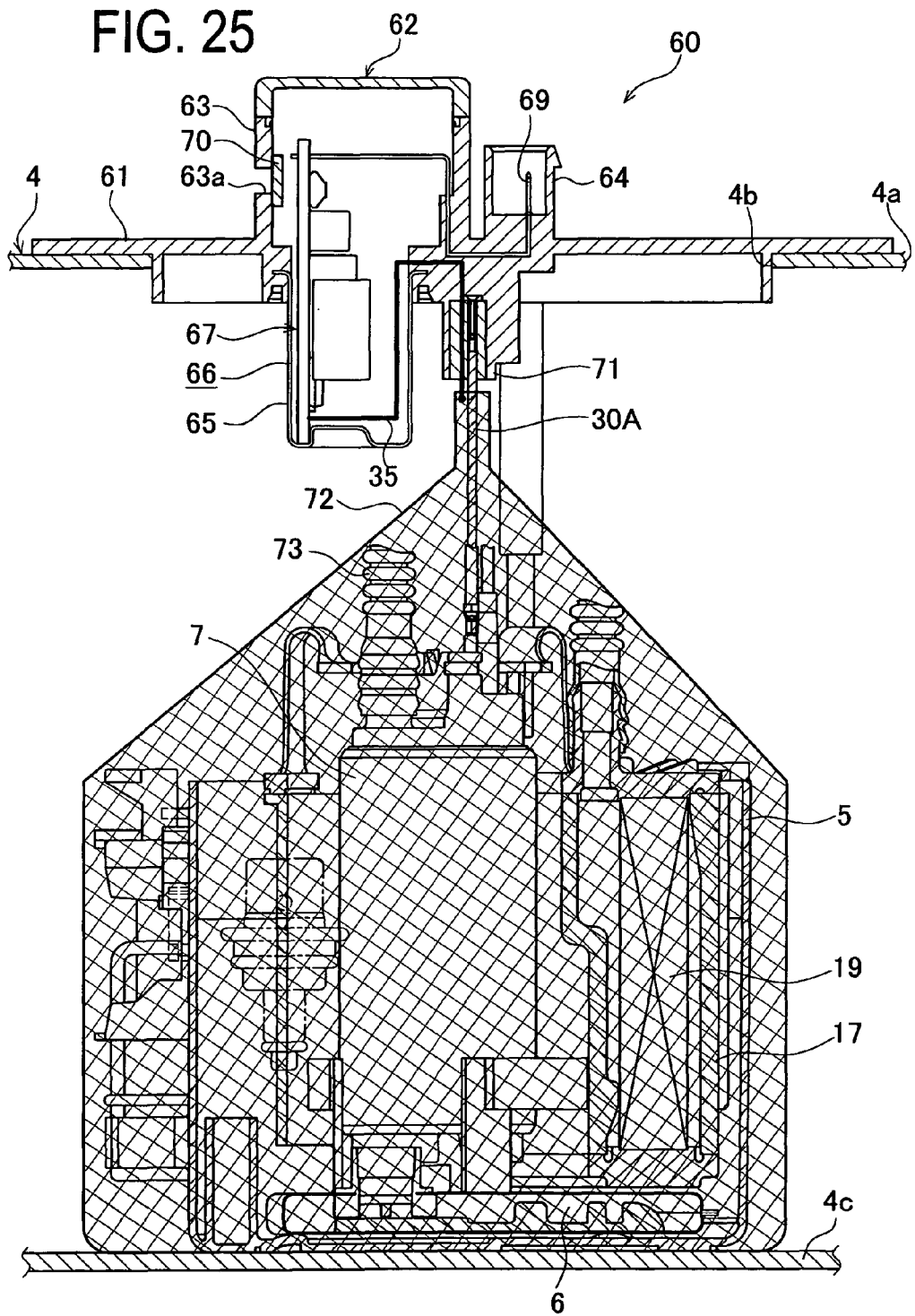
FIG. 25 is a partly sectional side view showing a state where a fuel pump unit is installed in a fuel tank in a fourteenth embodiment.

FIG. 25 is a partly sectional side view showing a state where the fuel pump unit 60 of this embodiment is installed in the fuel tank 4. This embodiment differs from the twelfth embodiment in that the fuel pump 7, the secondary filter case 17, the reserve cup 5, and the harness 30A are integrally covered by the mesh shielding material 72. Other configurations are identical to those in the twelfth embodiment.

Accordingly, the present embodiment can also provide operations and advantages identical or similar to those in the twelfth embodiment. In this embodiment, particularly, the mesh shielding material 72 is provided for the fuel pump 7, the secondary filter case 17, the reserve cup 5, and the harness 30A. It therefore requires only a simple work of entirely covering the fuel pump 7, the secondary filter case 17, the reserve cup 5, and the harness 30A together by the mesh material 72. In this regard, the work for measures against electrical noise can be facilitated.

Embodiment 15

A fifteenth embodiment of a fuel pump unit embodying a fuel supply apparatus of the present invention will be explained below referring to the accompanying drawings.

Figure 26:
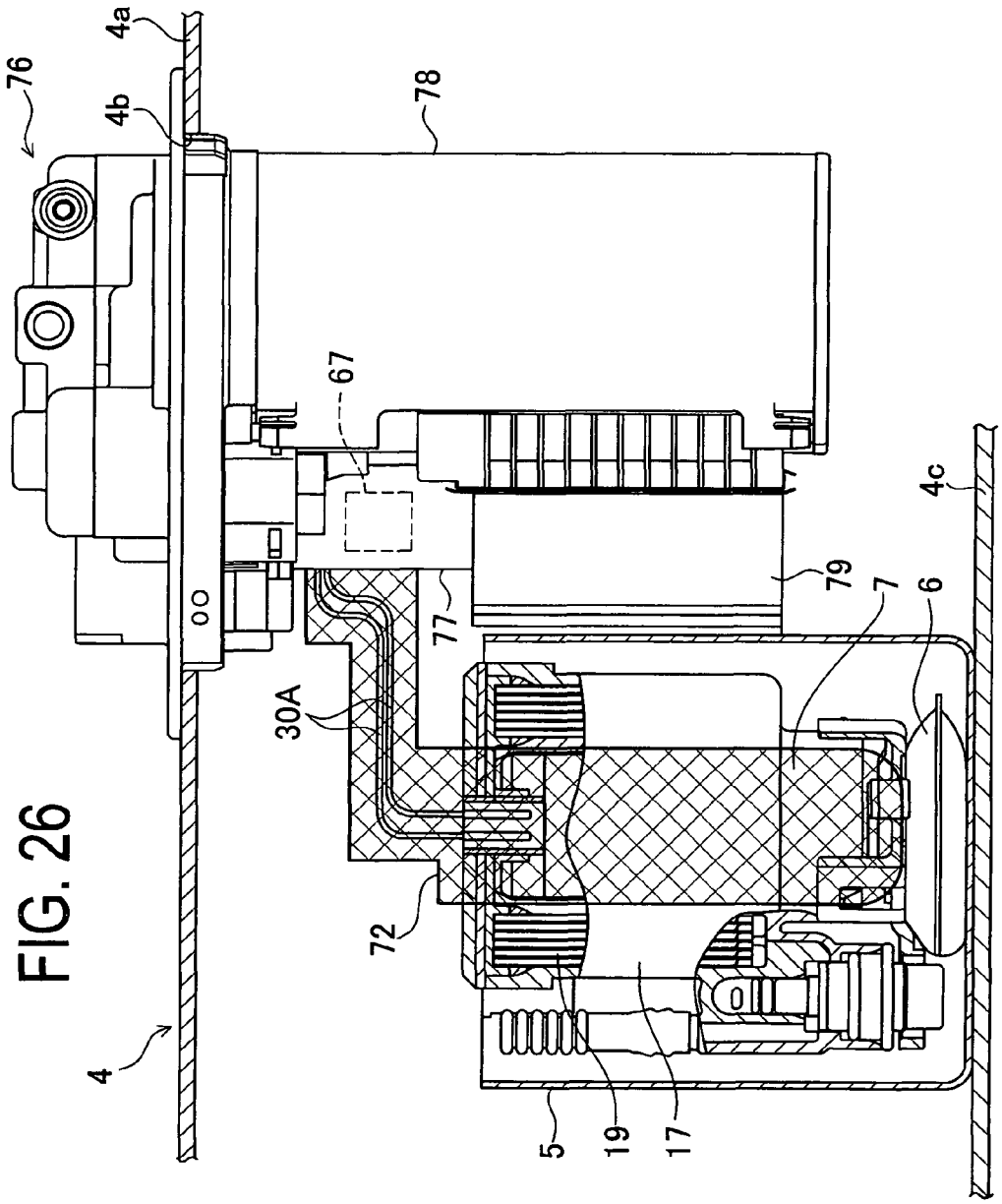
FIG. 26 is a partly sectional side view showing a state where a fuel pump unit is installed in a fuel tank in a fifteenth embodiment.

FIG. 26 is a partly sectional side view showing a state where a fuel pump unit 76 of this embodiment is installed in the fuel tank 4. The fuel pump unit 76 of this embodiment includes a canister 78 in addition to the fuel pump 7, the secondary filter case 17, the reserve cup 5, and a controller 77. The canister 78 serves to once adsorb fuel vapor generated in the fuel tank 4 and hence contains an adsorbing material made of activated charcoal or the like. The canister 78 and the reserve cup 5 are connected to each other through a connection member 79. The canister 78 is attached to the upper wall 4a of the fuel tank 4 in such a way that an upper part of the canister 78 is inserted through the upper wall 4a. The fuel pump 7 is surrounded by the secondary filter case 17. The fuel pump 7 and the secondary filter case 17 are set in place in the reserve cup 5. The controller 77 is held in a connecting area between the canister 78 and the reserve cup 5 and fixed to the connection member 79. The controller 77 contains the pump drive circuit 67. The harness 30A extending from the pump drive circuit 67 is electrically connected to the fuel pump 7.

In the fuel pump unit 76 including the canister 78 in this embodiment, the fuel pump 7 and the harness 30A are integrally covered by the conductive mesh shielding material 72. Other configurations are identical to those in the twelfth to fourteenth embodiments.

In this embodiment, accordingly, operations and advantages identical or similar to those in the twelfth embodiment can be obtained even though the fuel pump unit 76 is different in type from the fuel pump unit 60.

Embodiment 16

A sixteenth embodiment of a fuel pump unit embodying a fuel supply apparatus of the present invention will be explained below referring to the accompanying drawings.

Figure 27:
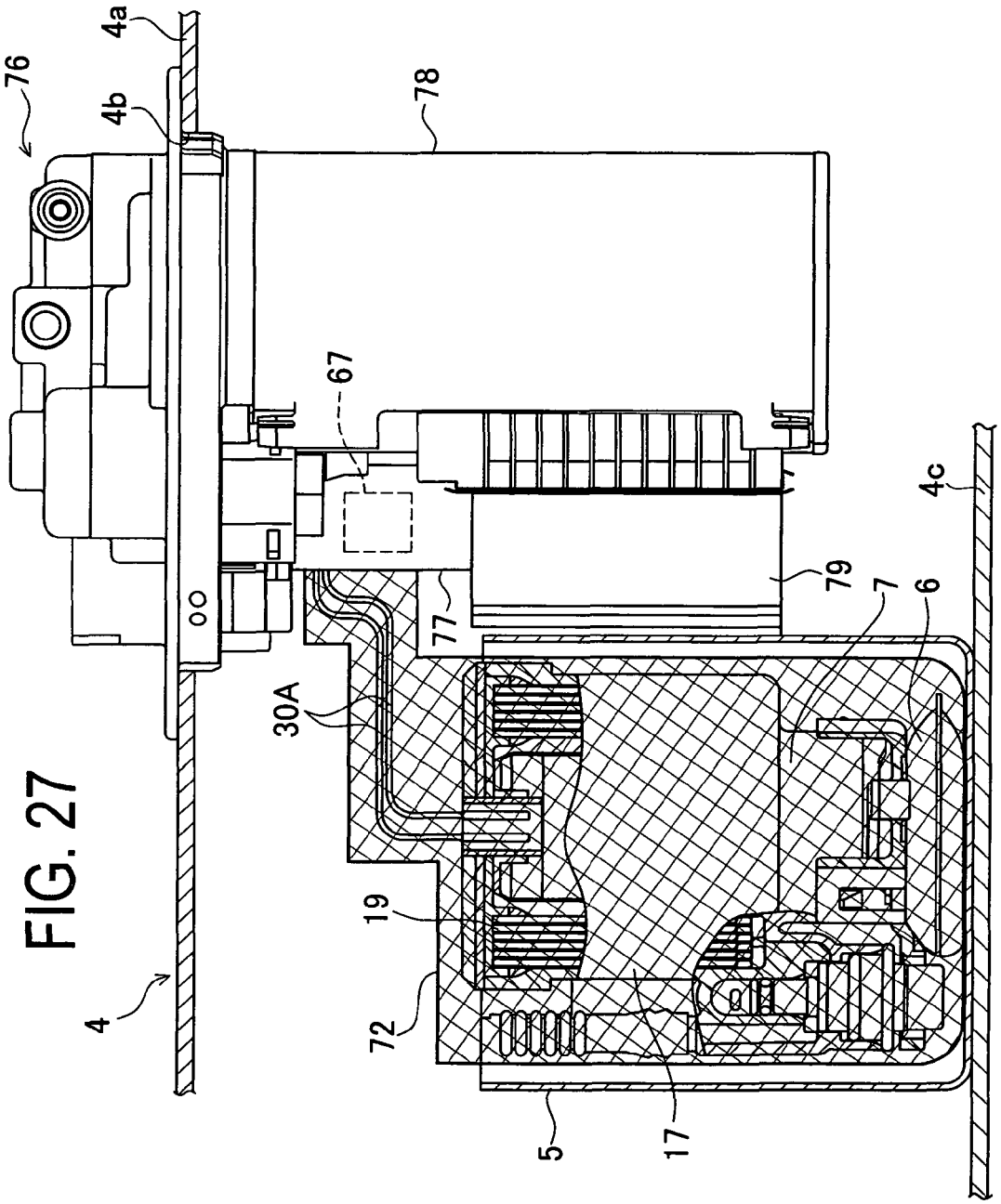
FIG. 27 is a partly sectional side view showing a state where a fuel pump unit is installed in a fuel tank in a sixteenth embodiment.

FIG. 27 is a partly sectional side view showing a state where the fuel pump unit 76 of this embodiment is installed in the fuel tank 4. This embodiment differs from the fifteenth embodiment in that the fuel pump 7, the secondary filter case 17, and the harness 30A are integrally covered by the mesh shielding material 72. Other configurations are identical to those in the fifteenth embodiment.

Accordingly, the present embodiment can also provide operations and advantages identical or similar to those in the fifteenth embodiment. In the present embodiment, particularly, the mesh shielding material 72 is provided for the fuel pump 7, the secondary filter case 17, and the harness 30A. It therefore requires only a simple work of entirely covering the fuel pump 7, the secondary filter case 17, and the harness 30A together by the mesh material 72. In this regard, the work for measures against electrical noise can be facilitated.

Embodiment 17

A seventeenth embodiment of a fuel pump unit embodying a fuel supply apparatus of the present invention will be explained below referring to the accompanying drawings.

Figure 28:
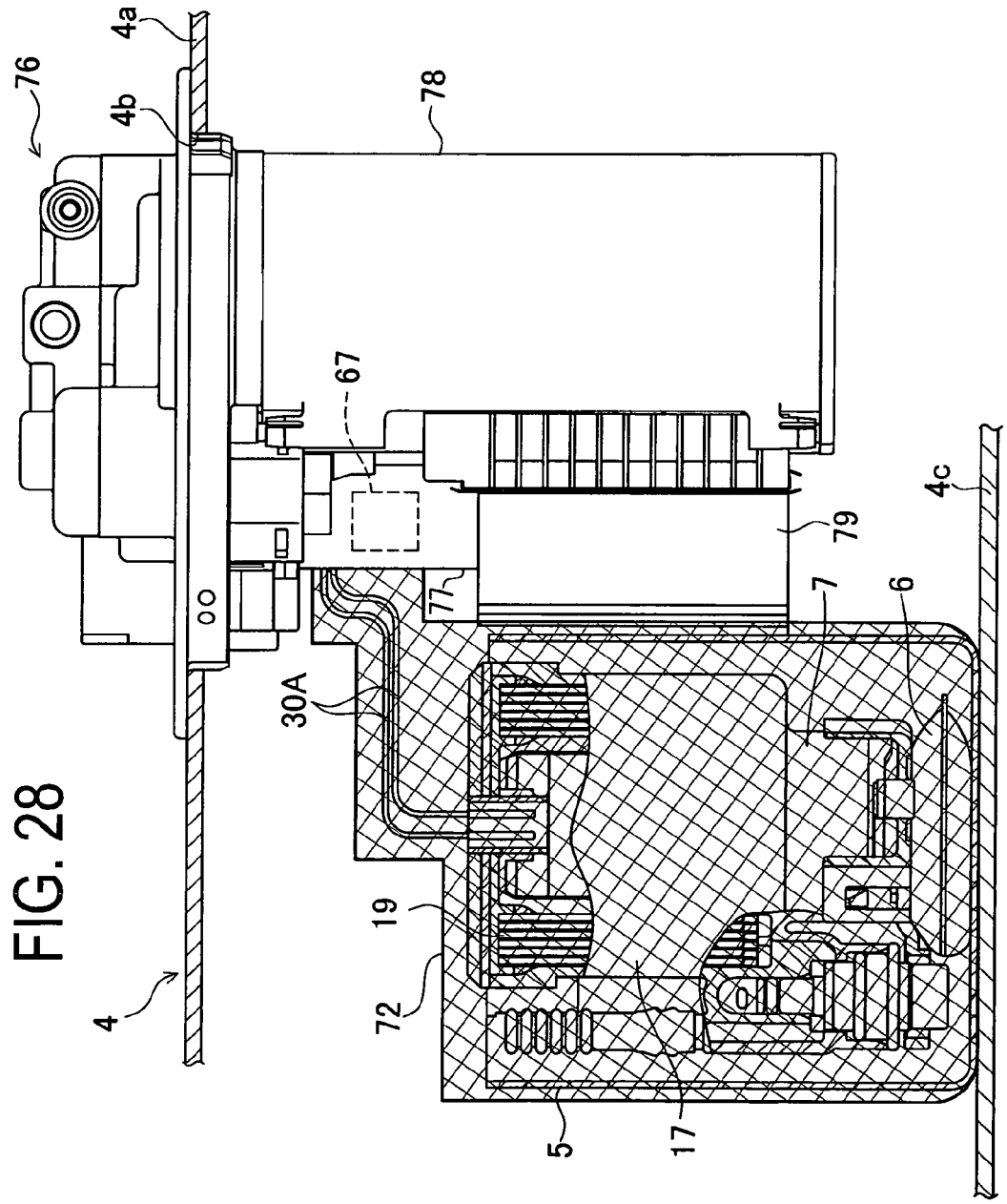
FIG. 28 is a partly sectional side view showing a state where a fuel pump unit is installed in a fuel tank in a seventeenth embodiment.

FIG. 28 is a partly sectional side view showing a state where the fuel pump unit 76 of this embodiment is installed in the fuel tank 4. This embodiment differs from the fifteenth embodiment in that the fuel pump 7, the secondary filter case 17, the reserve cup 5, and the harness 30A are integrally covered together by the mesh shielding material 72. Other configurations are identical to those in the fifteenth embodiment.

Accordingly, the present embodiment can also provide operations and advantages identical or similar to those in the fifteenth embodiment. In the present embodiment, particularly, the mesh shielding material 72 is provided for the fuel pump 7, the secondary filter case 17, the reserve cup 5, and the harness 30A. It therefore requires only a simple work of entirely covering the fuel pump 7, the secondary filter case 17, the reserve cup 5, and the harness 30A together by the mesh material 72. In this regard, the work for measures against electrical noise can be facilitated.

Embodiment 18

An eighteenth embodiment of a fuel pump unit embodying a fuel supply apparatus of the present invention will be explained below referring to the accompanying drawings.

Figure 29:
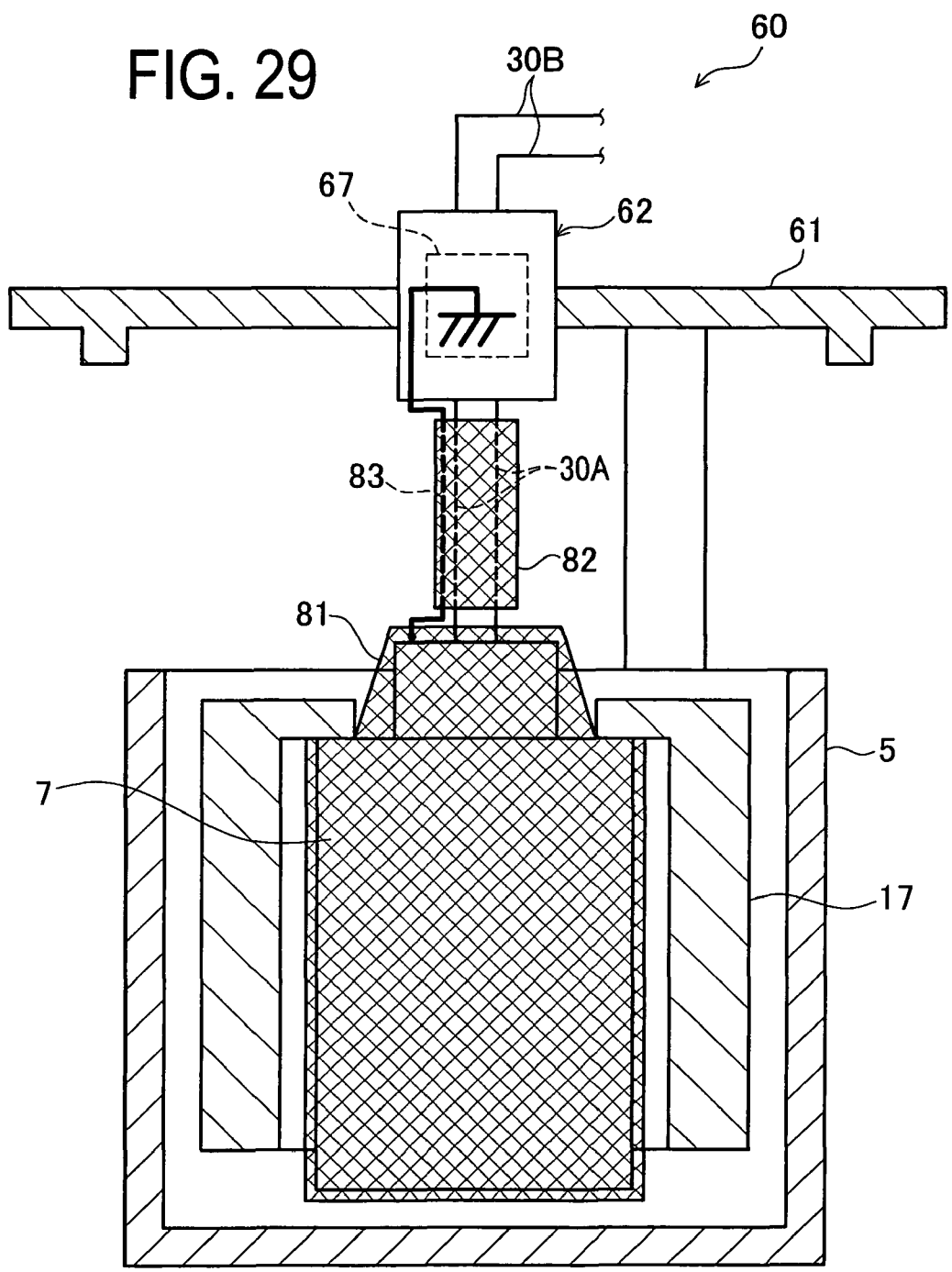
FIG. 29 is a schematic sectional view of a fuel pump unit in an eighteenth embodiment.

FIG. 29 is a schematic sectional of the fuel pump unit 60. The fuel pump unit 60 in FIG. 29 is illustrated to show a conceptual basic structure identical or similar to the fuel pump unit 60 shown in FIGS. 23 to 25. In this embodiment, the fuel pump 7 is covered by a first mesh shielding material 81 having electrical conductivity and the harness 30A are covered by a second mesh shielding material 82 having electrical conductivity. The second mesh shielding material 82 corresponds to a second mesh shielding material of the invention. In the present embodiment, specifically, the fuel pump 7 and the harness 30a are separately covered by the mesh shielding materials 81 and 82 respectively. In this embodiment, the first mesh shielding material 81 is electrically connected to the second mesh shielding material 82 that is connected to ground through the pump drive circuit 67 of the controller 62. In this embodiment, an earth wire 83 which is a single bare wire is arranged in parallel with the harness 30A. While this earth wire 83 is placed in contact with the second mesh shielding material 82, the earth wire 83 and the harness 30A are covered by the second mesh shielding material 82. One end of the earth wire 83 is electrically connected to the first mesh shielding material 81 and the other end of the earth wire 83 is grounded through the drive circuit 67. The present embodiment differs from the twelfth embodiment in the above configuration. Other configurations are basically the same as those in the twelfth embodiment.

Figure 30:
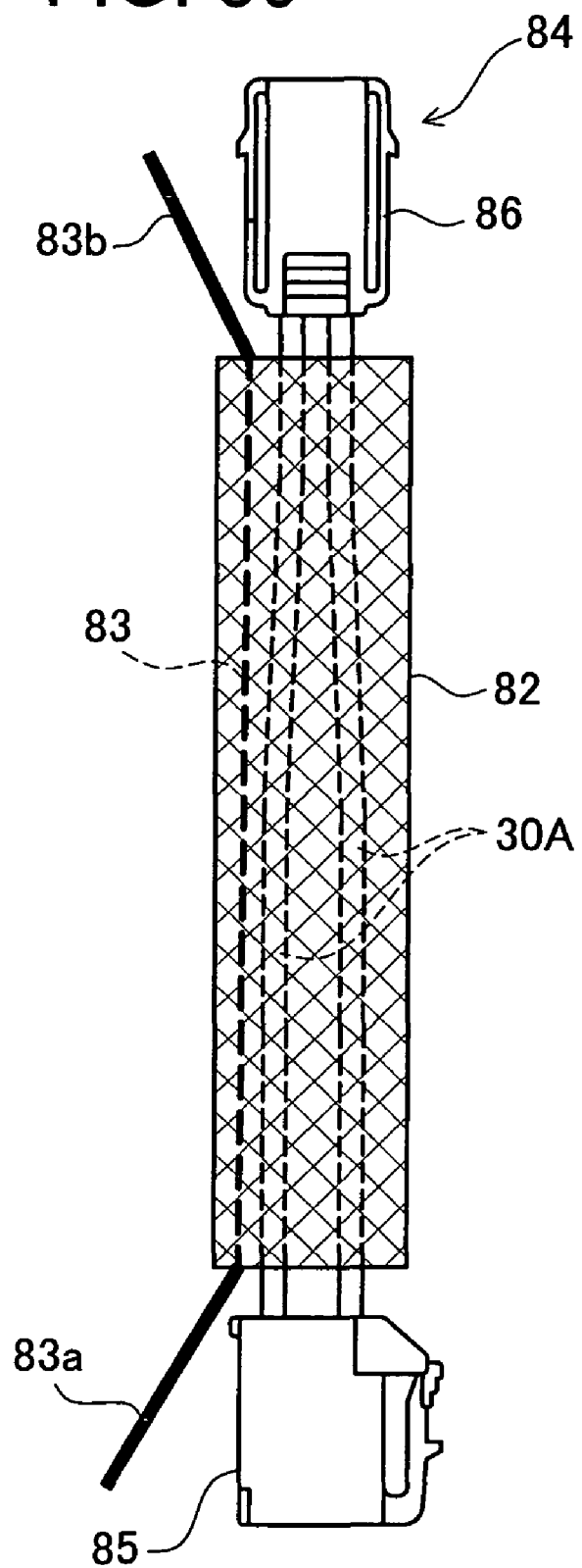
FIG. 30 is a plan view of a harness unit covered by a second mesh shielding material in the eighteenth embodiment.
Figure 31:
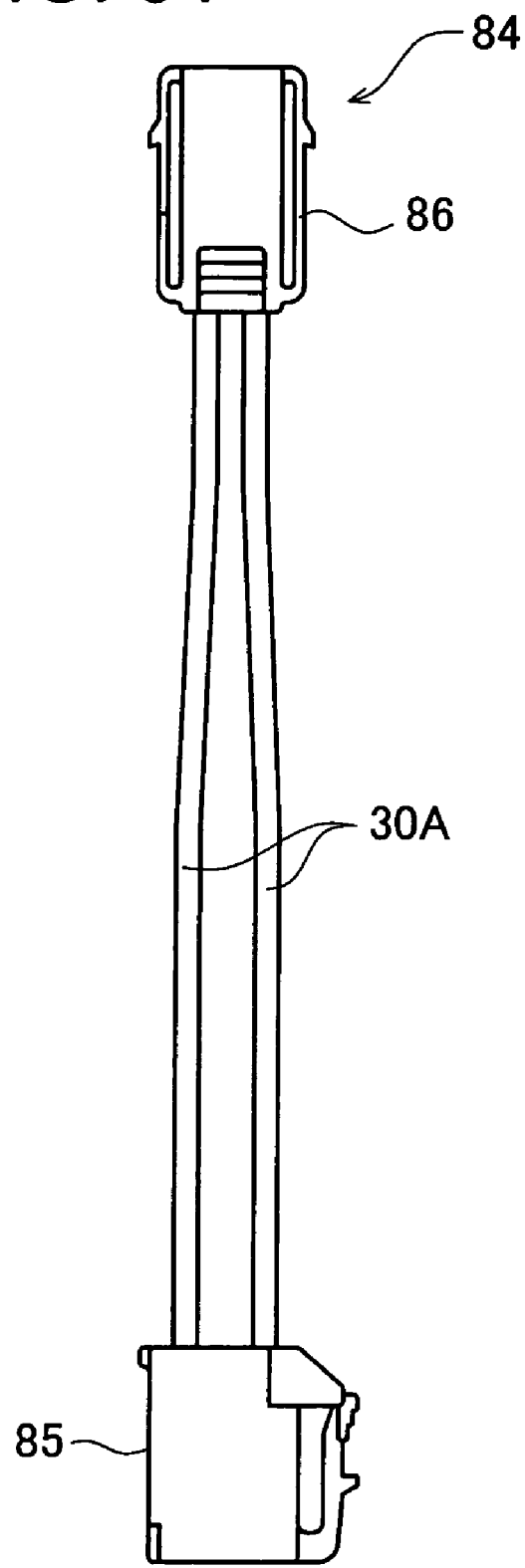
FIG. 31 is a plan view of the harness unit in the eighteenth embodiment.

FIG. 30 is a plan view of a harness unit 84 including the harness 30A covered by the second mesh shielding material 82. FIG. 31 is a plan view of only the harness unit 84. As shown in FIG. 31, the harness unit 84 includes a first terminal 85 connected to the pump drive circuit 67 of the controller 77, a second terminal 86 connected to the fuel pump 7, and a harness 30A having a pair of lead wires placed between both terminals 85 and 86. Each harness 30A is made of a normal electric wire coated with an insulation material. With respect to this harness unit 84, as shown in FIG. 30, the earth wire 83 formed of a bare wire is arranged in parallel with the pair of lead wires of the harness 30A. Those earth wire 83 and harness 30A are covered together by the second mesh shielding material 82. Here, both ends of the earth wire 83 extend out of both open ends of the cylindrical second mesh shielding material 82. The first terminal 85 is connected to the connector 64 shown in FIGS. 23 to 25. One end (a first end) 83a of the earth wire 83 is electrically connected to the pump drive circuit 67. The second terminal 86 is connected to a connector (not shown) of the fuel pump 7. The other end (a second end) 83b of the earth wire 83 is connected to the first mesh shielding material 81 covering the fuel pump 7. The earth wire 83 is formed of a bare wire. Thus, a portion of the earth wire 83 covered by the second mesh shielding material 82 is in contact with and electrically connected to the mesh shielding material 82 as shown in FIG. 30.

In this embodiment, consequently, the fuel pump 7 and the harness 30A are covered by the corresponding mesh shielding materials 81 and 82 which are grounded through the earth wire 83. This embodiment can therefore provide operations and advantages identical or similar to those in the twelfth embodiment.

In this embodiment, the fuel pump 7 and the harness 30A are covered by the separate mesh shielding materials 81 and 82 respectively. Accordingly, there is less limitations in wiring and in assembly of components, whereby achieving an increase in freedom for works of providing each mesh shielding material 81, 82 in the fuel pump unit 60. The ground connection of the first and second mesh shielding materials 81 and 82 can further enhance the electrical noise reduction effect.

In this embodiment, while the earth wire 83 which is a bare wire is arranged in contact with the second mesh shielding material 82, the earth wire 83 and the harness 30A are covered by the second mesh shielding material 82. The first end 83a of the earth wire 83 is grounded and the second end 83b of the earth wire 83 is connected to the first mesh shielding material 81. Accordingly, wiring of the first and second mesh shielding materials 81 and 82 and the earth wire 83 can be facilitated. This makes it possible to further enhance the electrical noise reduction effect by the ground connection of the first and second mesh shielding materials 81 and 82 and to simplify a work for ground connection.

Embodiment 19

A nineteenth embodiment of a fuel pump unit embodying a fuel supply apparatus of the present invention will be explained below referring to the accompanying drawings.

Figure 32:
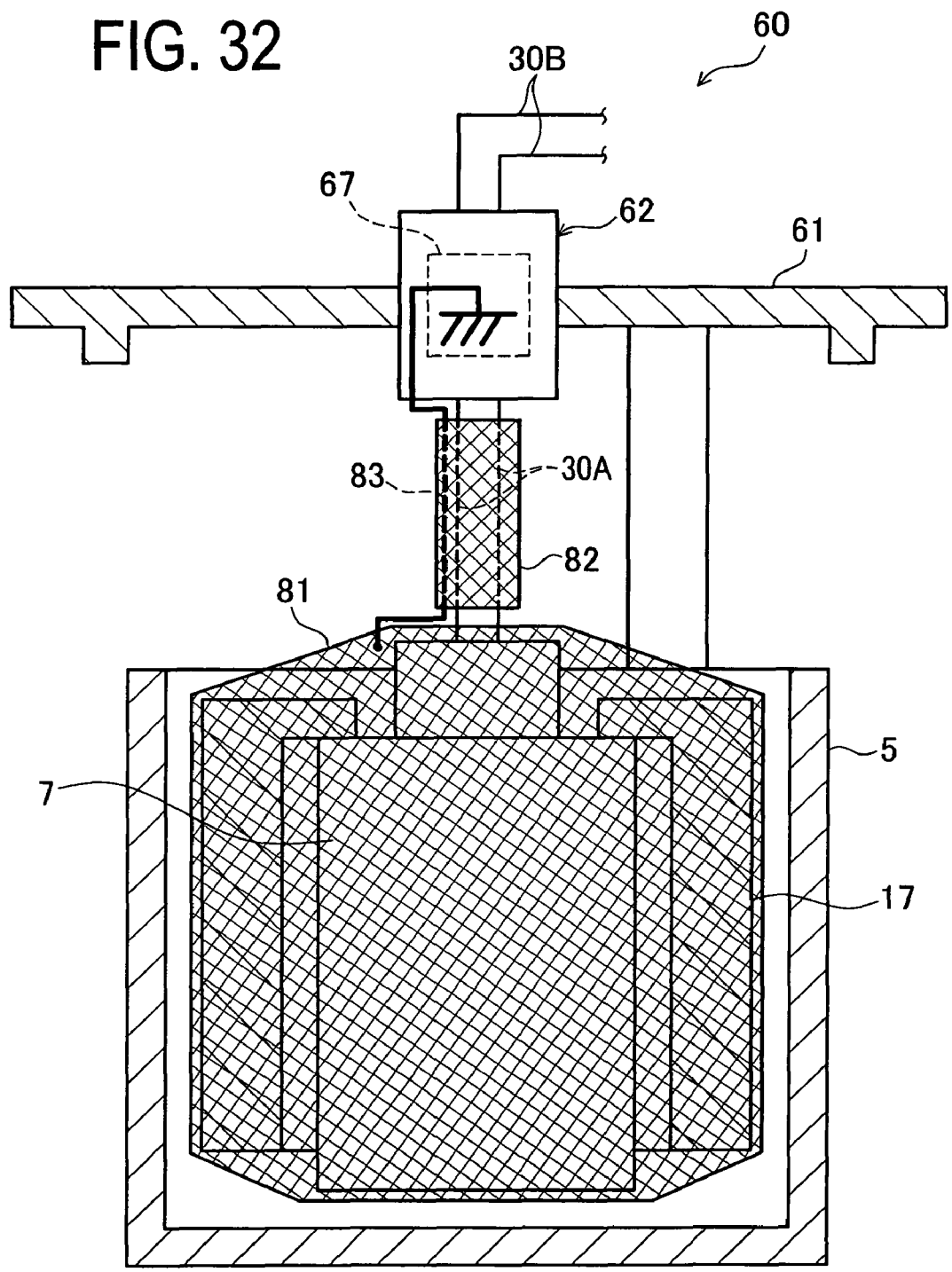
FIG. 32 is a schematic sectional view of a fuel pump unit in a nineteenth embodiment.

FIG. 32 is a schematic sectional view of the fuel pump unit 60 corresponding to FIG. 29. In the present embodiment, the fuel pump 7 and the secondary filter case 17 are integrally covered together by the first mesh shielding material 81, and the harness 30A are covered by the second mesh shielding material 82. Further, the first mesh shielding material 81 is electrically connected to the second mesh shielding material 82 that is grounded through the pump drive circuit 67. This embodiment differs from the eighteenth embodiment in the above configuration.

In this embodiment, consequently, the fuel pump 7 and the secondary filter case 17, and the harness 30A are separately covered by the corresponding mesh shielding materials 81 and 82. These mesh shielding materials 81 and 82 are grounded through the earth wire 83. This embodiment can therefore also provide operations and advantages identical or similar to those in the eighteenth embodiment. In this embodiment, particularly, the first mesh shielding material 81 is provided for the fuel pump 7 and the secondary filter case 17. Accordingly, it requires only a simple work of entirely covering the fuel pump 7 and the secondary filter case 17 together by the first mesh shielding material 81. In this regard, the work for measures against electrical noise can be facilitated.

Embodiment 20

A twentieth embodiment of a fuel pump unit embodying a fuel supply apparatus of the present invention will be explained below referring to the accompanying drawings.

Figure 33:
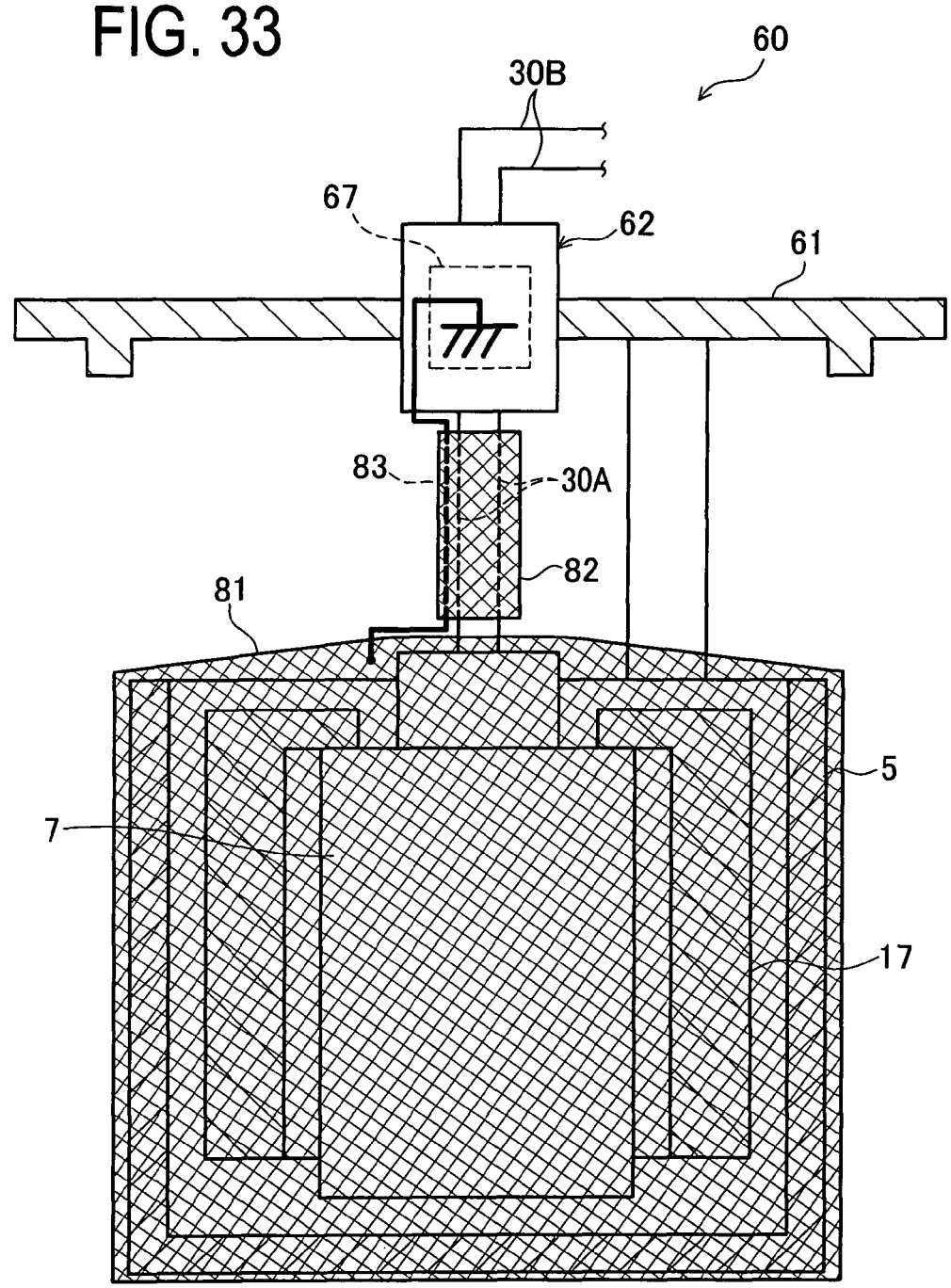
FIG. 33 is a schematic sectional view of a fuel pump unit in a twentieth embodiment.

FIG. 33 is a schematic sectional view of the fuel pump unit 60 corresponding to FIG. 29. In this embodiment, the fuel pump 7, the secondary filter case 17, and the reserve cup 5 are integrally covered together by the first mesh shielding material 81, and the harness 30A are covered by the second mesh shielding material 82. The first mesh shielding material 81 is electrically connected to the second mesh shielding material 82 that is grounded through the pump drive circuit 67. This embodiment differs from the eighteenth embodiment in the above configuration.

In this embodiment, consequently, the fuel pump 7, the secondary filter case 17, the reserve cup 5, and the harness 30A are covered by the corresponding mesh shielding materials 81 and 82 separately. Those mesh shielding materials 81 and 82 are grounded through the earth wire 83. Thus, this embodiment can also provide operations and advantages identical or similar to those in the eighteenth embodiment. In this embodiment, especially, the first mesh shielding material 81 is provided for the fuel pump 7, the secondary filter case 17, and the reserve cup 5. It therefore requires only a simple work of entirely covering the fuel pump 7, the secondary filter case 17, and the reserve cup 5 together by the first mesh shielding material 81. In this regard, the work for measures against electrical noise can be facilitated.

Embodiment 21

A twenty-first embodiment of a fuel pump unit embodying a fuel supply apparatus of the present invention will be explained below referring to the accompanying drawings.

Figure 34:
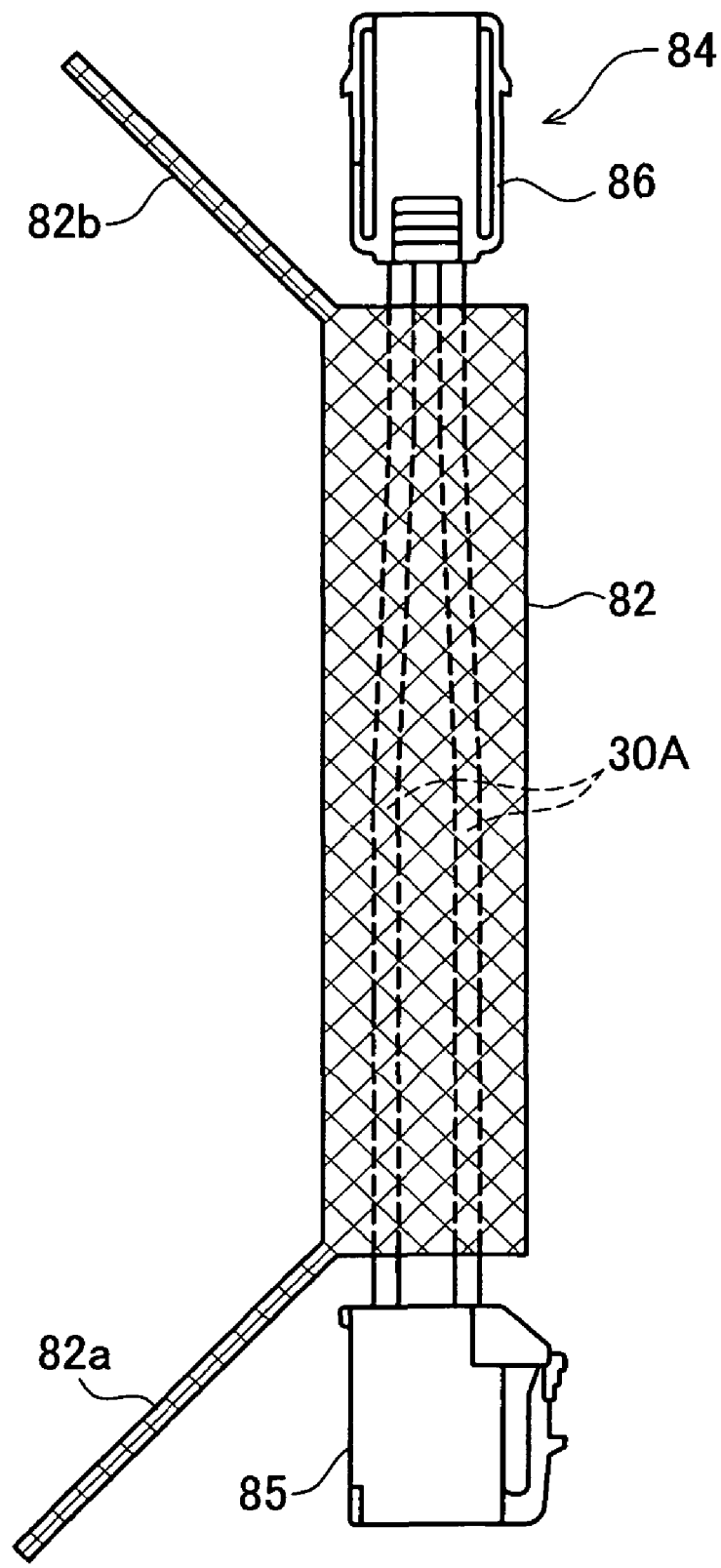
FIG. 34 is a plan view of a harness unit covered by a second mesh shielding material in a twenty-first embodiment.

FIG. 34 is a plan view of the harness unit 84 covered by the second mesh shielding material 82. In this embodiment, the aforementioned earth wire 83 formed of a bare wire is removed and instead thereof both ends of the second mesh shielding material 82 are partly twisted respectively to form bare-wire connection ends 82a and 82b. One connection end 82a is connected to the pump drive circuit 67 and the other connection end 82b is connected to the first mesh shielding material 81. The present embodiment differs from the eighteenth to twentieth embodiments in the above configuration.

Thus, the present embodiment can also provide operations and advantages identical or similar to those in the eighteenth to twentieth embodiments. In addition, the configuration related to the second mesh shielding material 82 can be simplified by the absence of the earth wire 83.

Embodiment 22

A twenty-second embodiment of a fuel pump unit embodying a fuel supply apparatus of the present invention will be explained below referring to the accompanying drawings.

Figure 35:
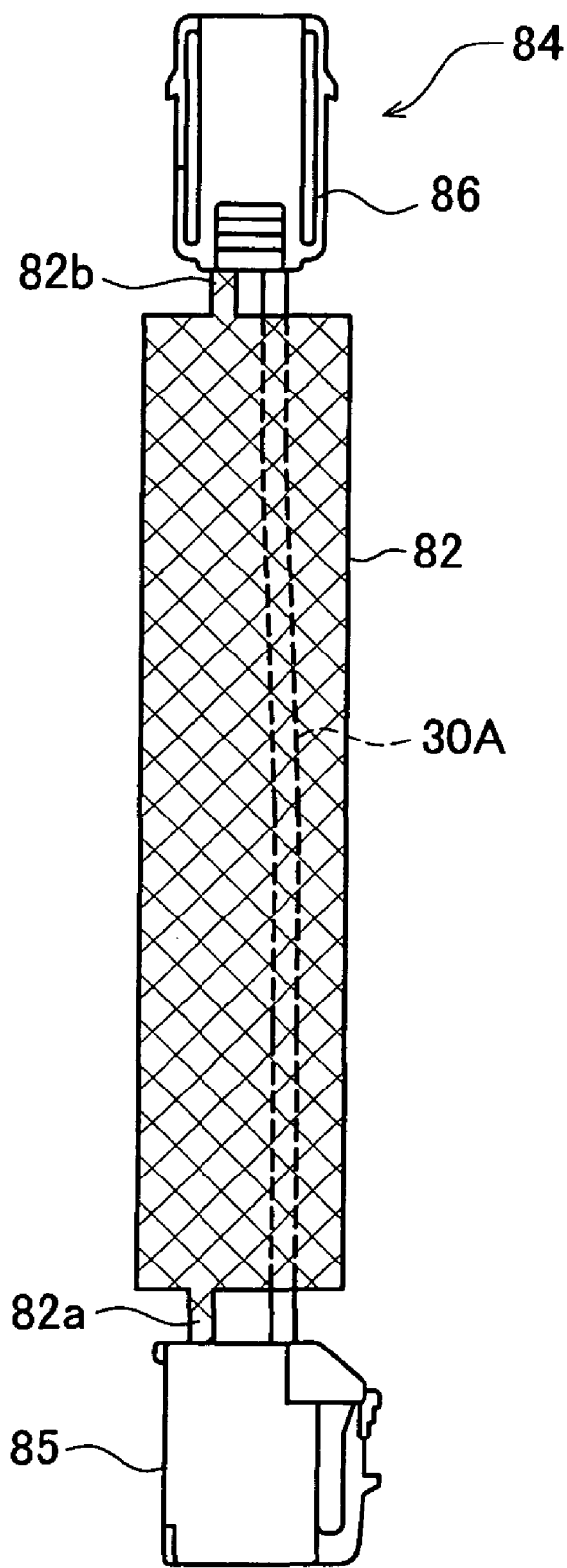
FIG. 35 is a plan view of a harness unit covered by a second mesh shielding material in a twenty-second embodiment.

FIG. 35 is a plan view of the second mesh shielding material 82 and the harness unit 84. In this embodiment, the earth wire 83 formed of a bare wire is removed and a single lead wire of the harness 30A is provided. Instead, both ends of the second mesh shielding material 82 are partly twisted respectively to form the connection ends 82a and 82b. Specifically, the second mesh shielding material 82 is configured that parts of both ends thereof are formed as the connection ends 82a and 82b to provide a second lead wire which pairs up with the harness 30A (a single lead wire). One connection end 82a is connected to the first terminal 85 and the other connection end 82b is connected to the second terminal 86 respectively. This configuration allows the use of the second mesh shielding material 82 as the second lead wire of the harness 30A. Accordingly, both ends of the second mesh shielding material 82 are connected to the terminals 85 and 86 respectively, so that the second mesh shielding material 82 can function as a lead wire of a negative side of the harness 30A and also as an earth wire.

Consequently, this embodiment can also provide operations and advantages identical or similar to those in the eighteenth to twentieth embodiments. In addition, the configuration can be simplified by the absence of the earth wire 83 and one lead wire of the harness 30A in relation to the second mesh shielding material 82. This results in a reduction in the number of components of the harness unit 84, thereby saving trouble works for assembly and achieving a cost reduction.

Embodiment 23

A twenty-third embodiment of a fuel pump unit embodying a fuel supply apparatus of the present invention will be explained below referring to the accompanying drawings.

Figure 36:
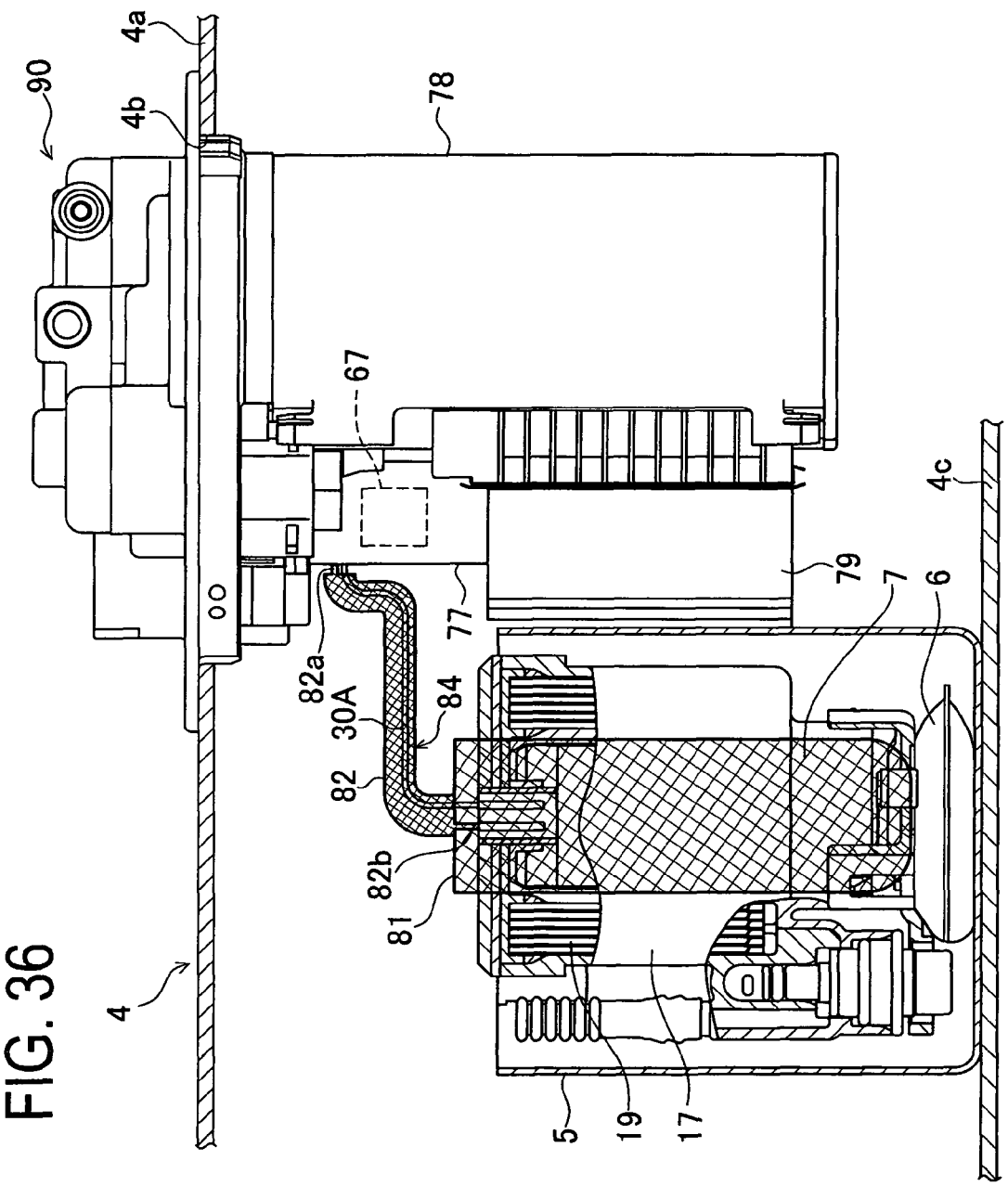
FIG. 36 is a partly sectional side view showing a state where a fuel pump unit is installed in a fuel tank in a twenty-third embodiment.

In this embodiment, the harness unit 84 of the twenty-second embodiment is embodied in the fuel pump unit. FIG. 36 is a partly sectional side view showing a state where a fuel pump unit 90 is installed in the fuel tank 4. This fuel pump unit 90 has the basic structure identical or similar to the fuel pump unit 76 shown in FIGS. 26 to 28 corresponding to the fifteenth to seventeenth embodiments and differs from the fuel pump unit 76 shown in FIGS. 26 to 28 in the configuration of the mesh shielding material and the harness. In the fuel pump unit 90 of this embodiment, specifically, the fuel pump 7 and the harness 30A are separately covered by the first mesh shielding material 81 and the second mesh shielding material 82 respectively, as in the eighteenth embodiment. The first mesh shielding material 81 is electrically connected to the second mesh shielding material 82 that is grounded through the pump drive circuit 67 of the controller 62. As the harness 30A and the second mesh shielding material 82, the harness unit 84 of the twenty-second embodiment is used.

Consequently, the present embodiment can also provide operations and advantages identical or similar to those in the eighteenth to twenty-second embodiments.

Embodiment 24

A twenty-fourth embodiment of a fuel pump unit embodying a fuel supply apparatus of the present invention will be explained below referring to the accompanying drawings.

Figure 37:
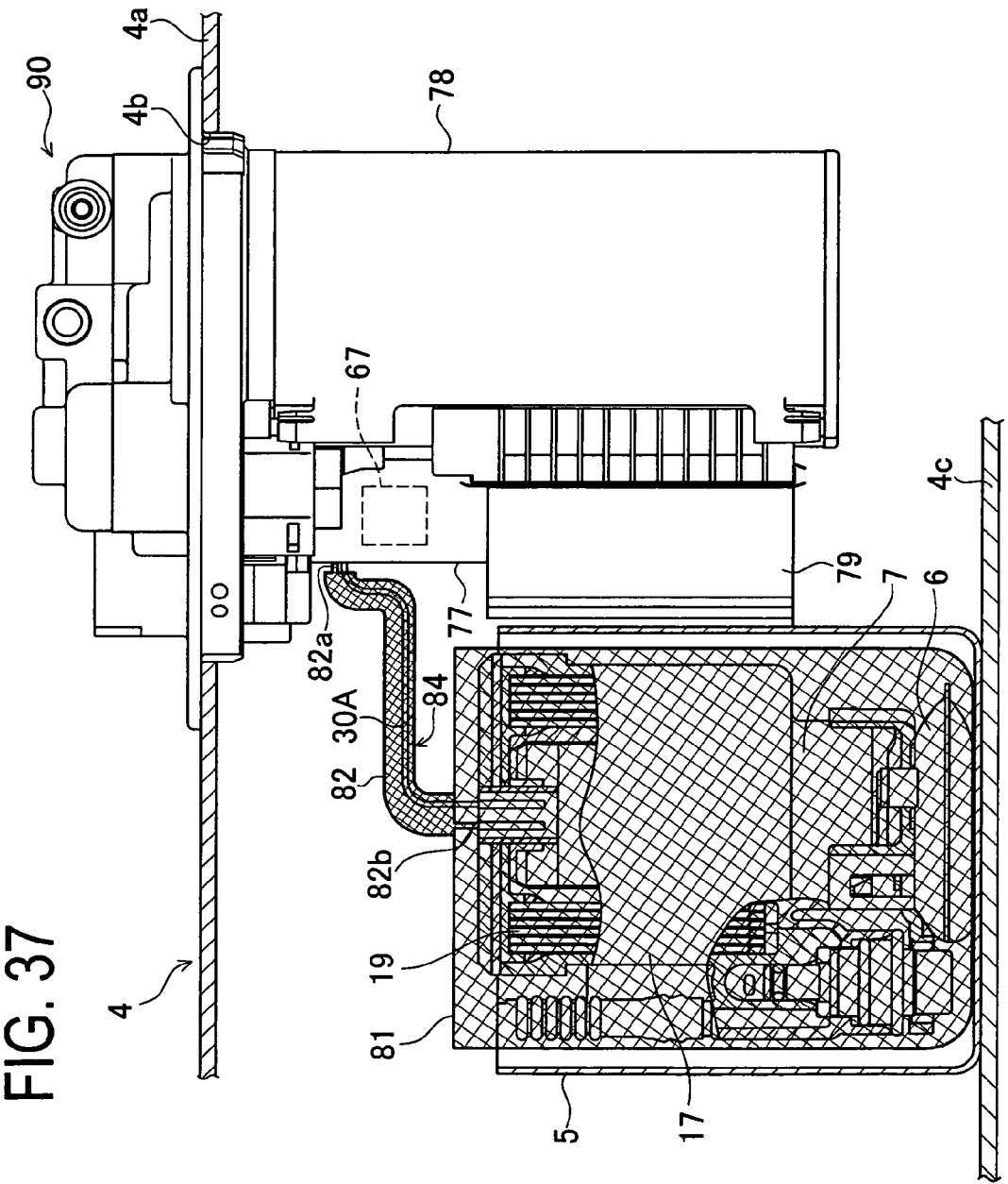
FIG. 37 is a partly sectional side view showing a state where a fuel pump unit is installed in a fuel tank in a twenty-fourth embodiment.

FIG. 37 is a partly sectional side view showing a state where the fuel pump unit 90 is installed in the fuel tank 4. In this embodiment, similarly, the harness unit 84 of the twenty-second embodiment is embodied in the fuel pump unit 90, in which the first mesh shielding material 81 is different in configuration from that in the twenty-third embodiment. In this embodiment, specifically, the fuel pump 7 and the secondary filter case 17 are integrally covered by the first mesh shielding material 81 as in the nineteenth embodiment. Other configurations are identical or similar to those in the twenty-third embodiment.

Consequently, the present embodiment can also provide operations and advantages identical or similar to those in the nineteenth and twenty-second embodiments.

Embodiment 25

A twenty-fifth embodiment of a fuel pump unit embodying a fuel supply apparatus of the present invention will be explained below referring to the accompanying drawings.

Figure 38:
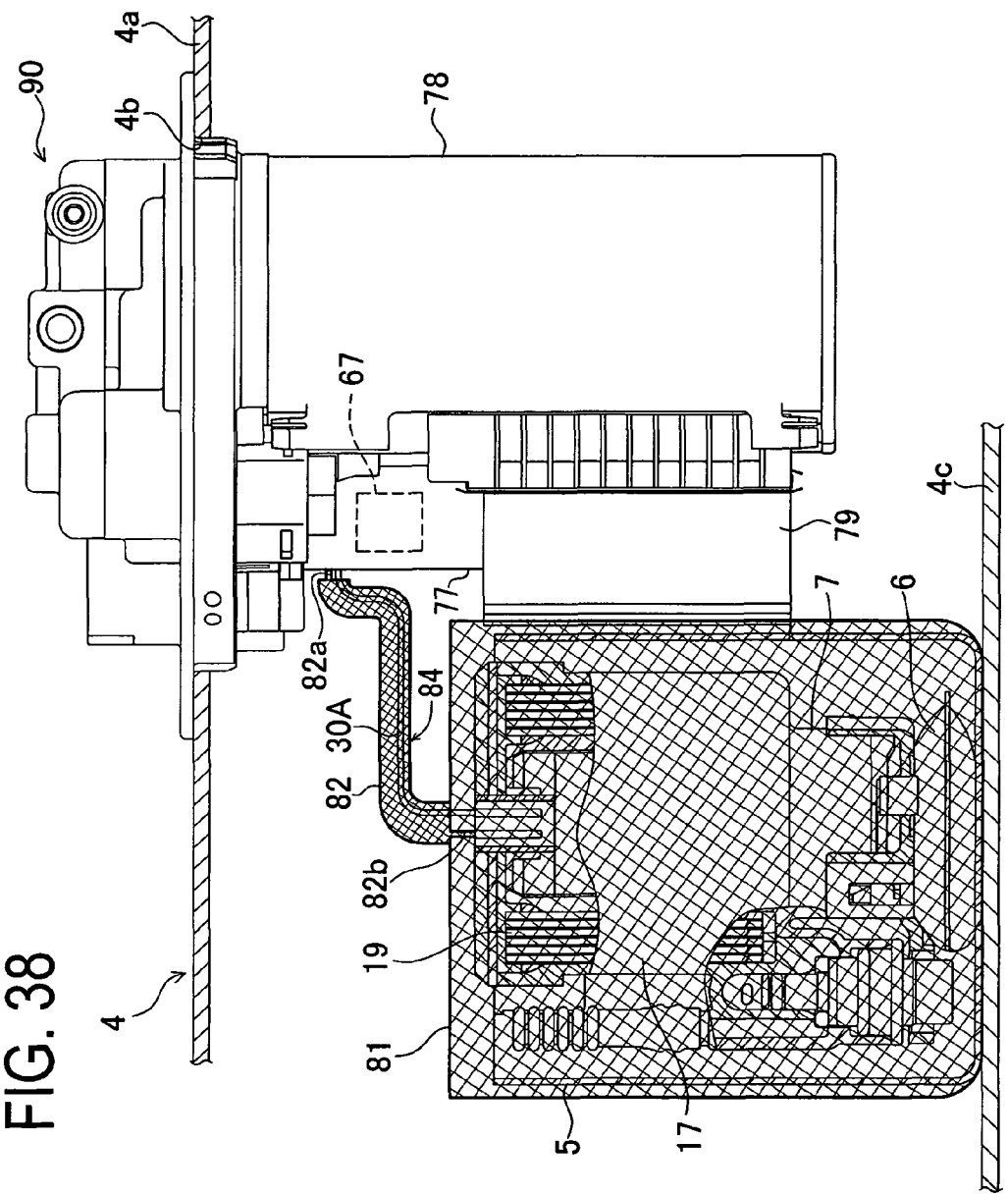
FIG. 38 is a partly sectional side view showing a state where a fuel pump unit is installed in a fuel tank in a twenty-fifth embodiment.

FIG. 38 is a partly sectional side view showing a state where the fuel pump unit 90 is installed in the fuel tank 4. In this embodiment, the harness unit 84 of the twenty-second embodiment is embodied in the fuel pump unit 90 in which the first mesh shielding material 81 is different in configuration from that in the twenty-third and twenty-fourth embodiments. In this embodiment, specifically, the fuel pump 7, the secondary filter case 17, and the reserve cup 5 are integrally covered together by the first mesh shielding material 81 as in the twentieth embodiment. Other configurations are identical or similar to those in the twenty-third embodiment.

Thus, the present embodiment can also provide operations and advantages identical or similar to those in the twentieth and twenty-second embodiments.

Embodiment 26

A twenty-sixth embodiment of a fuel pump unit embodying a fuel supply apparatus of the present invention will be explained below referring to the accompanying drawings.

Figure 39:
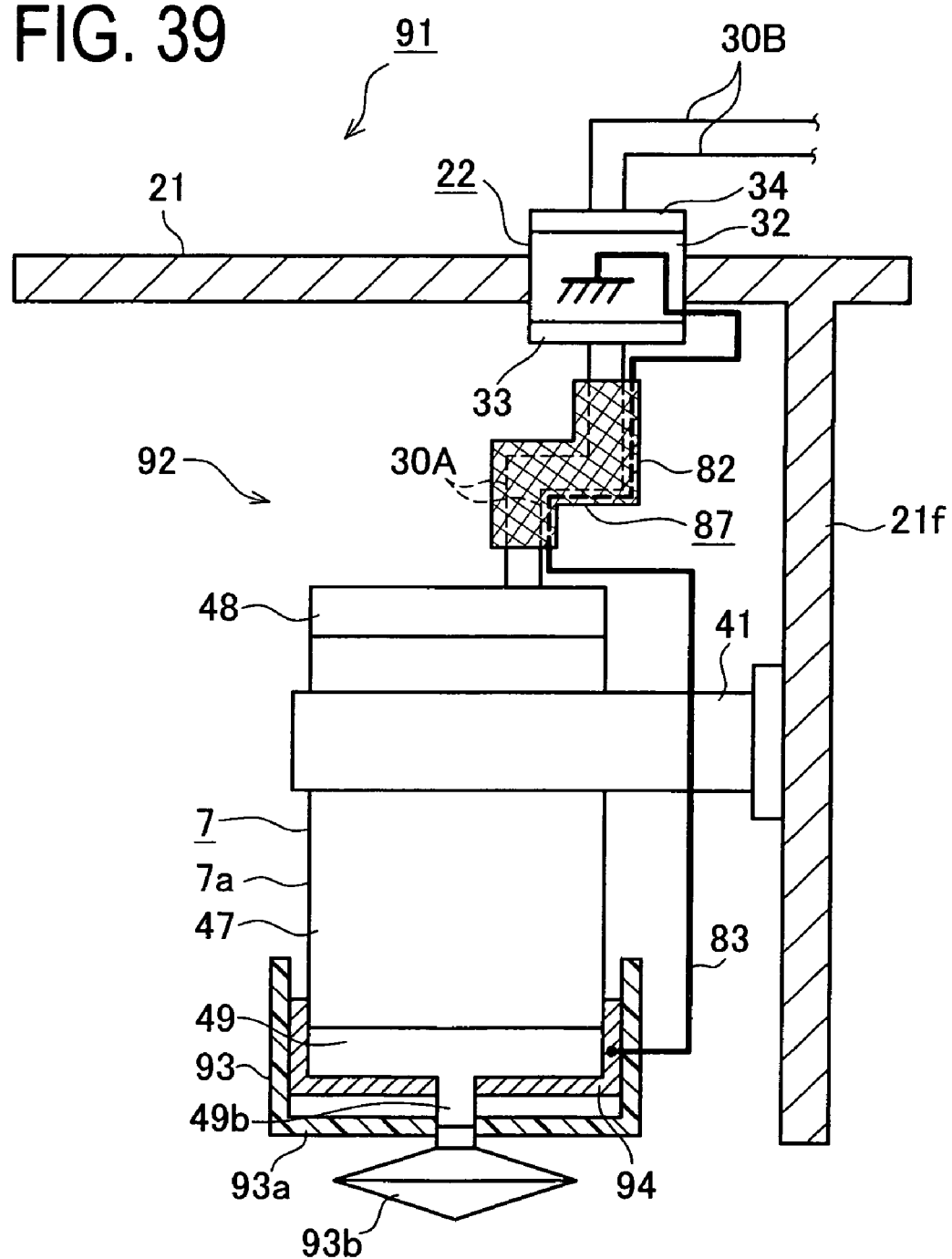
FIG. 39 is a schematic sectional view of a fuel pump unit in a twenty-sixth embodiment.
Figure 40:
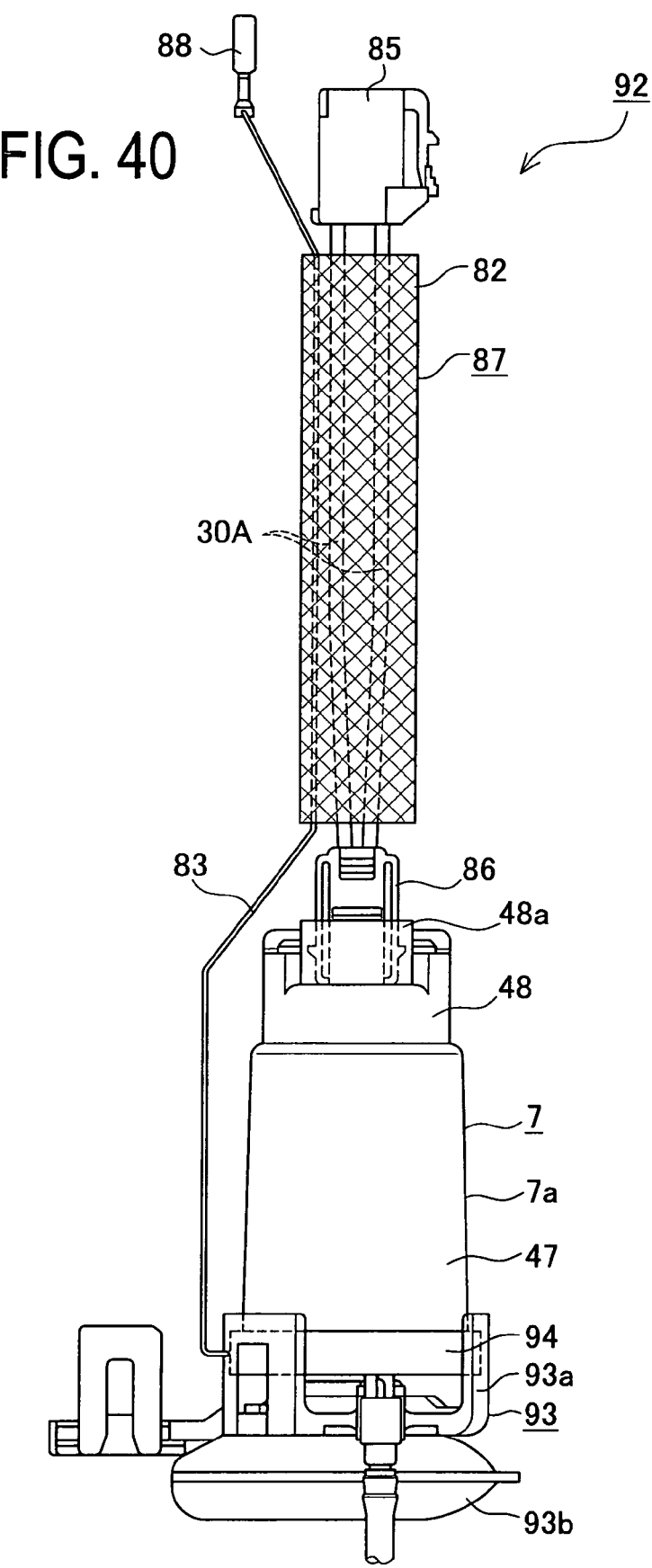
FIG. 40 is a detail front view of a pump assembly in the twenty-sixth embodiment.
Figure 41:
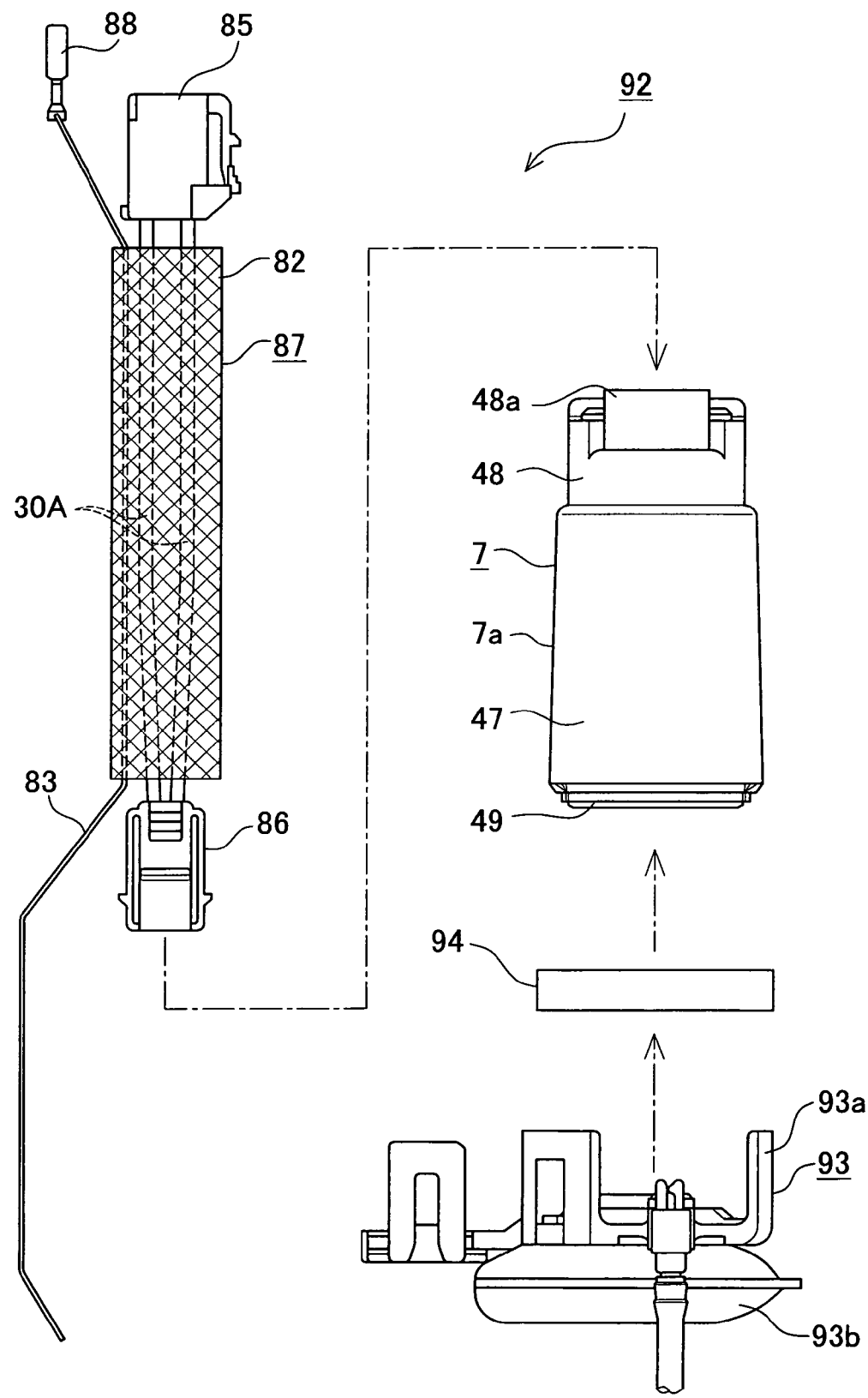
FIG. 41 is an exploded front view of the pump assembly in the twenty-sixth embodiment.

FIG. 39 is a schematic sectional view of a fuel pump unit 91 of this embodiment. FIG. 40 is a detail front view of a pump assembly 92 constituting a main part of the fuel pump unit 91. FIG. 41 is an exploded front view of the pump assembly 92 of FIG. 40. The fuel pump unit 91 of this embodiment includes the pump assembly 92 supported by the unit cover 21 and the controller 22 mounted in the unit cover 21 to control the fuel pump 7. The pump assembly 92 includes the fuel pump 7, a filter unit 93, and a harness unit 87. The fuel pump 7 is supported by a bracket 21f of the unit cover 21 through a belt 41. The pump housing 7a of the fuel pump 7 is constituted by the cylindrical housing 47, the upper body 48, and the lower body 49. The housing 47 is basically made of a steel plate and applied thereon with zinc plating and the surface is applied with a chromate layer which is an electrically non-conducting member. The upper body 48 is made of resin and the lower body 49 is made of aluminum. A lower cover 94 made of an electrically conductive material is fitted over a lower end of the fuel pump 7 so that the lower cover 94 covers the lower body 49. Part of the lower cover 94 is in contact with the housing 47 to provide electrical conductivity between the lower cover 94 and the housing 47 (in such a way as mentioned later). Further, the filter unit 93 is fitted over the lower cover 94. The filter unit 93 includes a cover 93a fitted over the lower cover 94 and a filter 93b provided under the cover 93a. The lower body 49 includes a discharge part 49b extending downward. This discharge part 49b is placed extending through the lower cover 94 and is connected to the filter 93b. A harness unit 87 is arranged to connect the fuel pump 7 and the pump controller 22. This harness unit 87 includes a harness 30A having a pair of lead wires, the earth wire 83, and a mesh shielding material 82 covering the harness 30A and the earth wire 83. Each of the lead wires of the harness 30A and the earth wire 83 is formed of a normal electric wire coated with an insulation material. Only a part of the earth wire 83 covered by the mesh shielding material 82 is a bare wire with no coating. This provides electrical conductivity between the earth wire 83 and the mesh shielding material 82. One end of the earth wire 83 is connected to the lower cover 94 and the other end of the earth wire 83 is connected to the pump drive circuit 32 of the controller 22. Accordingly, the housing 47 of the fuel pump 7 is connected to ground through the lower cover 94, the earth wire 83, and the pump drive circuit 32. As shown in FIGS. 40 and 41, the harness unit 87 is provided with the first terminal 85 connected to the pump drive circuit 32 of the controller 22 and the second terminal 86 connected to the fuel pump 7. The second terminal 86 is engaged and connected with the connector 48a formed in the upper body 48 of the fuel pump 7. One end of the earth wire 83 is provided with a terminal 88 that is connected to the pump drive circuit 32 of the controller 22.

Figure 42:
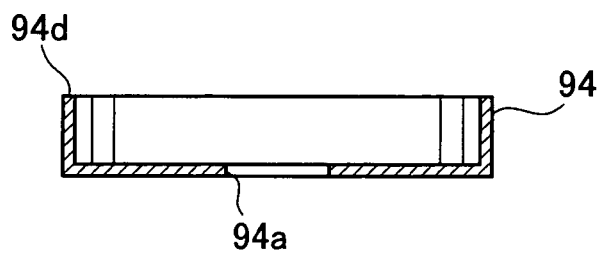
FIG. 42 is a longitudinal sectional view of a lower cover in the twenty-sixth embodiment.
Figure 43:
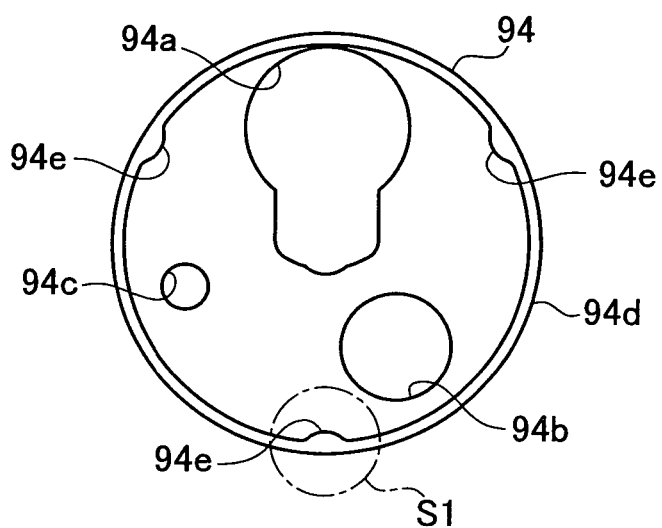
FIG. 43 is a plan view of the lower cover in the twenty-sixth embodiment.
Figure 44:
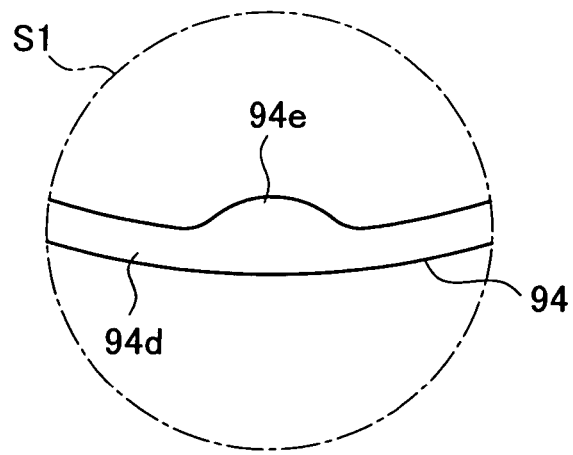
FIG. 44 is an enlarged view showing a part circled by a chain line in FIG. 43 in the twenty-sixth embodiment.

FIG. 42 is a longitudinal sectional view of the lower cover 94. FIG. 43 is a plan view of the lower cover 94. FIG. 44 is an enlarged view of a part S1 circled by a chain line in FIG. 43. The lower cover 94 is of a bottom-closed cylindrical shape with holes 94a, 94b, and 94c in the bottom through which the discharge part 49b of the lower body 49 and others are inserted. The lower cover 94 includes a peripheral wall 94d internally formed with a plurality of protrusions 94e arranged at equal angular intervals. Each protrusion 94e is formed protruding toward the center of the lower cover 94. When the lower cover 94 is fitted over the lower end of the fuel pump 7, each protrusion 94e is engaged on the housing 47 by slightly scraping the outer surface (the chromate layer) of the housing 47, thereby ensuring electrical conductivity between the lower cover 94 and the housing 47.

According to the fuel pump unit 91 of this embodiment, consequently, the housing 47 constituting the pump housing 7a of the fuel pump 7 and the lower cover 94 function as the shielding material. Even when the pump assembly 92 constituting the fuel pump unit 91 is placed in the resin fuel tank 4, the electrical noise generated by the fuel pump 7 is shielded by the housing 47 and the lower cover 94, thus reducing leakage of the electrical noise to the outside. Accordingly, even where the pump assembly 92 is placed in the resin fuel tank 4, it is possible to prevent the electrical noise generated by the fuel pump 7 from adversely affecting the peripheral components or parts. Especially, the electrical noise radiated in a lateral direction and a downward direction of the fuel pump 7 can be more reduced. Further, the electrical noise which attempts to travel from the fuel pump 7 to the pump controller 22 through the harness 30A can be restrained by the second mesh shielding material 82. This makes it possible to enhance the electrical noise reduction effect by the presence of the second mesh shielding material 82 surrounding the harness 30A. Moreover, the lower cover 94 fitted over the lower end of the fuel pump 7 is connected to ground via the earth wire 83 and the pump drive circuit 32. As compared with the case where they are not grounded, the electrical noise shielding effect can be more increased. In this regard, the electrical noise reduction effect can be further enhanced.

Here, an explanation will be given to differences in electrical noise reduction effect between the configuration including the measures against the electrical noise such as the electric filter or the like and the configuration including no measures against the electrical noise. In this embodiment, regarding a case (1) where the lower part of the fuel pump is covered by the lower cover 94 which is grounded, a case (2) where the lower part of the fuel pump is covered by the lower cover 94 which is grounded and the harness 30A are entirely covered by the mesh shielding material 82 which is grounded, and a case (3) where an electric filter is provided as measures against electrical noise, the electrical noise in a frequency range A (100 to 150 kHz) and a frequency range B (500 to 1700 kHz) was measured by a spectral analyzer. In the case (1), an electrical noise reduction effect of "15 dB" could be obtained in both the frequency ranges A and B. In the case (2), an electrical noise reduction effect of "30 dB" could be obtained in both the frequency ranges A and B. In the case (3), further, an electrical noise reduction effect of "30 dB" could be obtained in the frequency range A and an electrical noise reduction effect of "20 dB" could be obtained in the frequency range B. In this embodiment where the lower end of the fuel pump is covered by the lower cover 94 which is grounded and the harness 30A are entirely covered by the mesh shielding material 82 which is grounded, it is found that the adverse influence of the electrical noise to the outside can be prevented in both the frequency ranges A and B, thus enhancing the electrical noise reduction effect.

In this embodiment, the lower cover 94 has only to be fitted over the lower end of the fuel pump 7 before the filter unit 93 is attached to the fuel pump 7. This can improve workability as compared with the case where the mesh shielding material is mounted on the fuel pump 7 and others.

Figure 45:
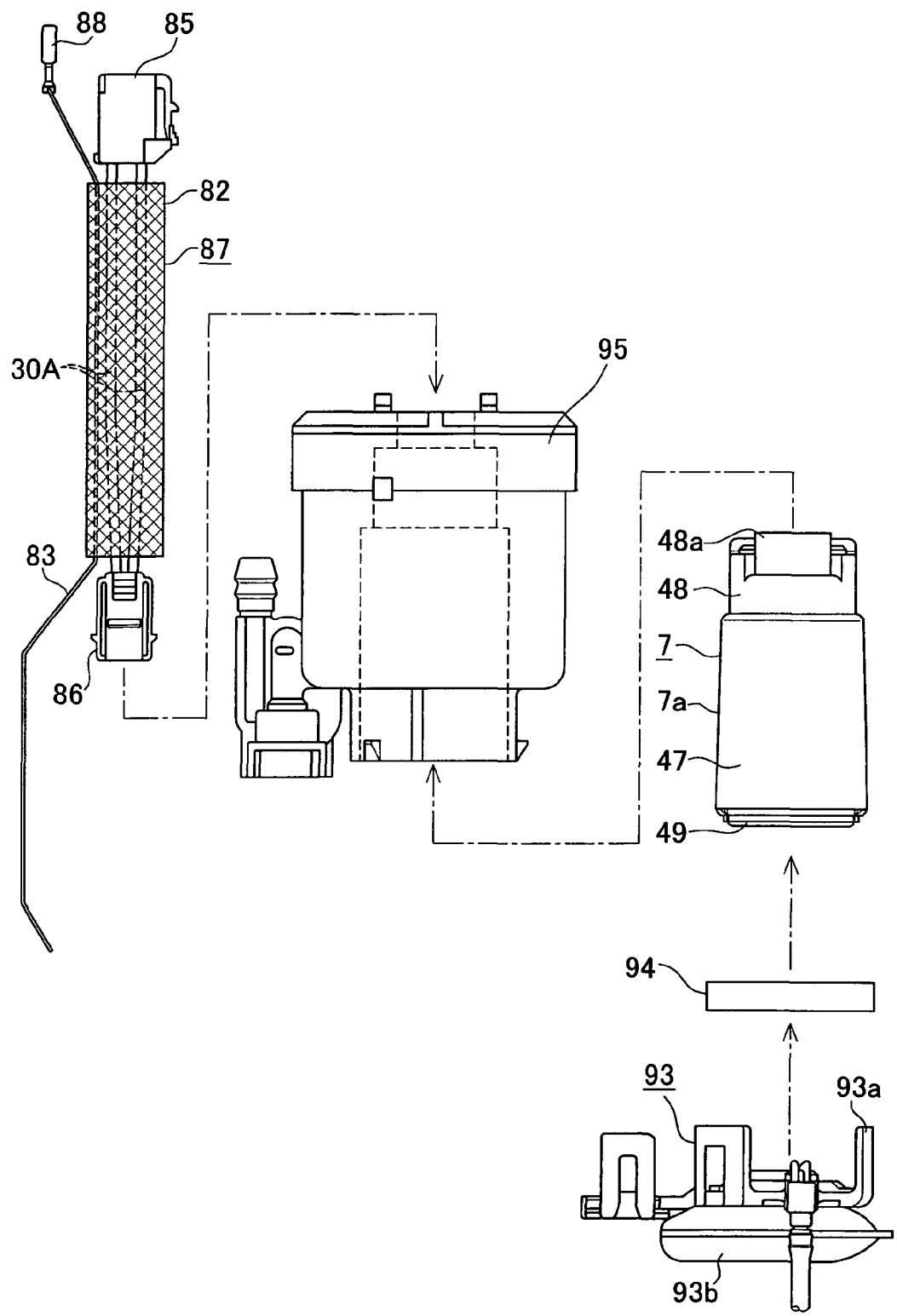
FIG. 45 is an exploded front view of a pump assembly in another example.

Moreover, the pump assembly 92 of this embodiment may be configured to further include a secondary filter case 95 mounted surrounding the fuel pump 7 as shown in FIG. 45.

Embodiment 27

A twenty-seventh embodiment of a fuel pump unit embodying a fuel supply apparatus of the present invention will be explained below referring to the accompanying drawings.

Figure 46:
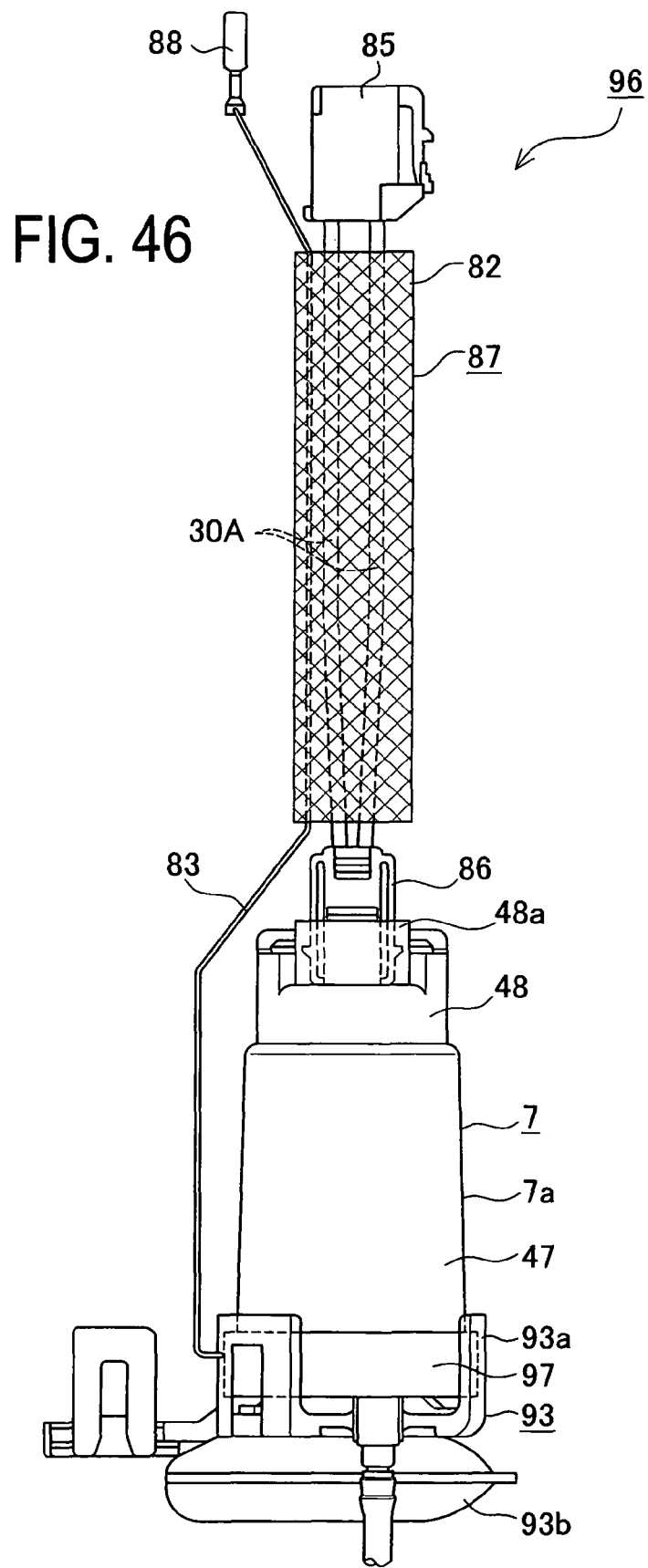
FIG. 46 is a detail front view of a pump assembly in a twenty-seventh embodiment.
Figure 47:
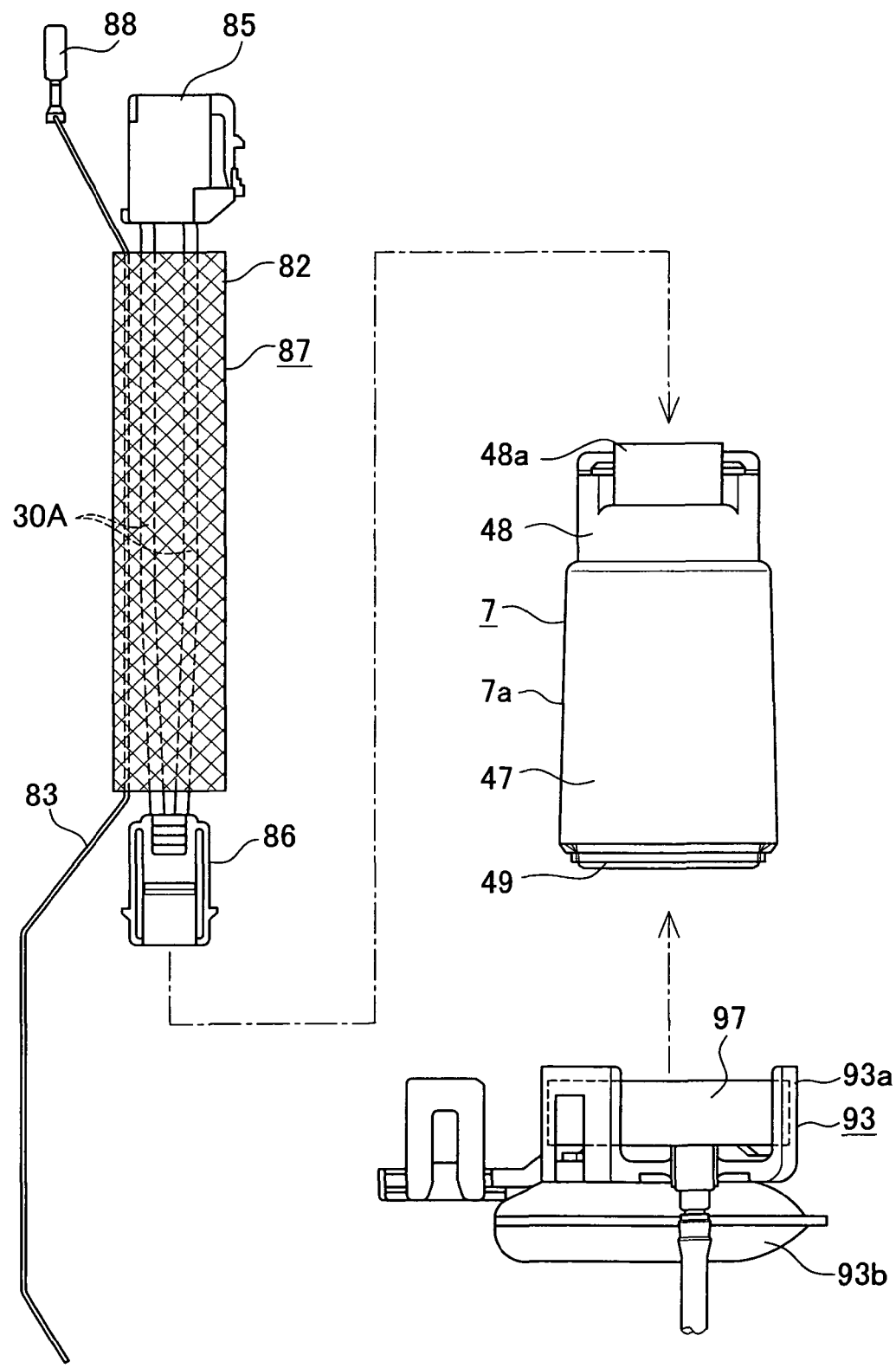
FIG. 47 is an exploded front view of the pump assembly in the twenty-seventh embodiment.
Figure 48:
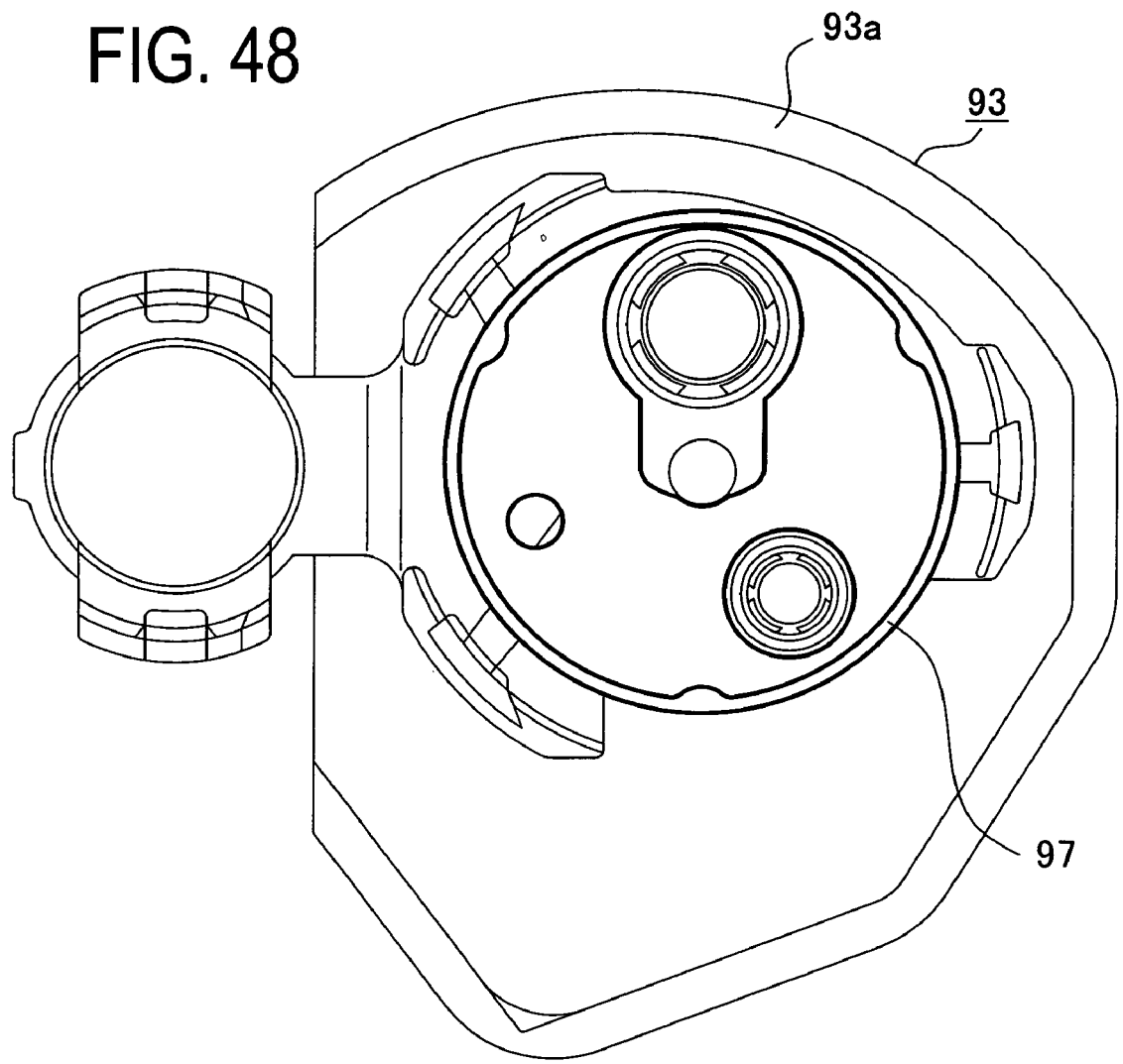
FIG. 48 is a plan view of a filter unit in the twenty-seventh embodiment.

FIG. 46 is a detail front view of a pump assembly 96 constituting main part of the fuel pump unit of this embodiment. FIG. 47 is an exploded front view of the pump assembly 96. This embodiment differs from the twenty-sixth embodiment in the filter unit 93 and the lower cover 97. Specifically, the lower cover 97 of this embodiment is formed to be deeper (i.e. larger in height) than the lower cover 94 of the twenty-sixth embodiment and the lower cover 97 is provided integral with the filter unit 93. FIG. 48 is a plan view of the filter unit 93 integrally including the lower cover 97. To be concrete, the lower cover 97 is integrally assembled with the cover 93a of the filter unit 93 by insert molding. Other configurations are identical or similar to those in the twenty-sixth embodiment.

Consequently, this embodiment can also provide operations and advantages identical or similar to those in the twenty-sixth embodiment. In this embodiment, particularly, the lower cover 97 is provided integral with the filter unit 93 and hence can be fitted over the fuel pump 7 at the same time when the filter unit 93 is mounted on the lower end of the fuel pump 7. As compared with the twenty-sixth embodiment, the workability to produce the pump assembly 96 can be further improved.

Figure 49:
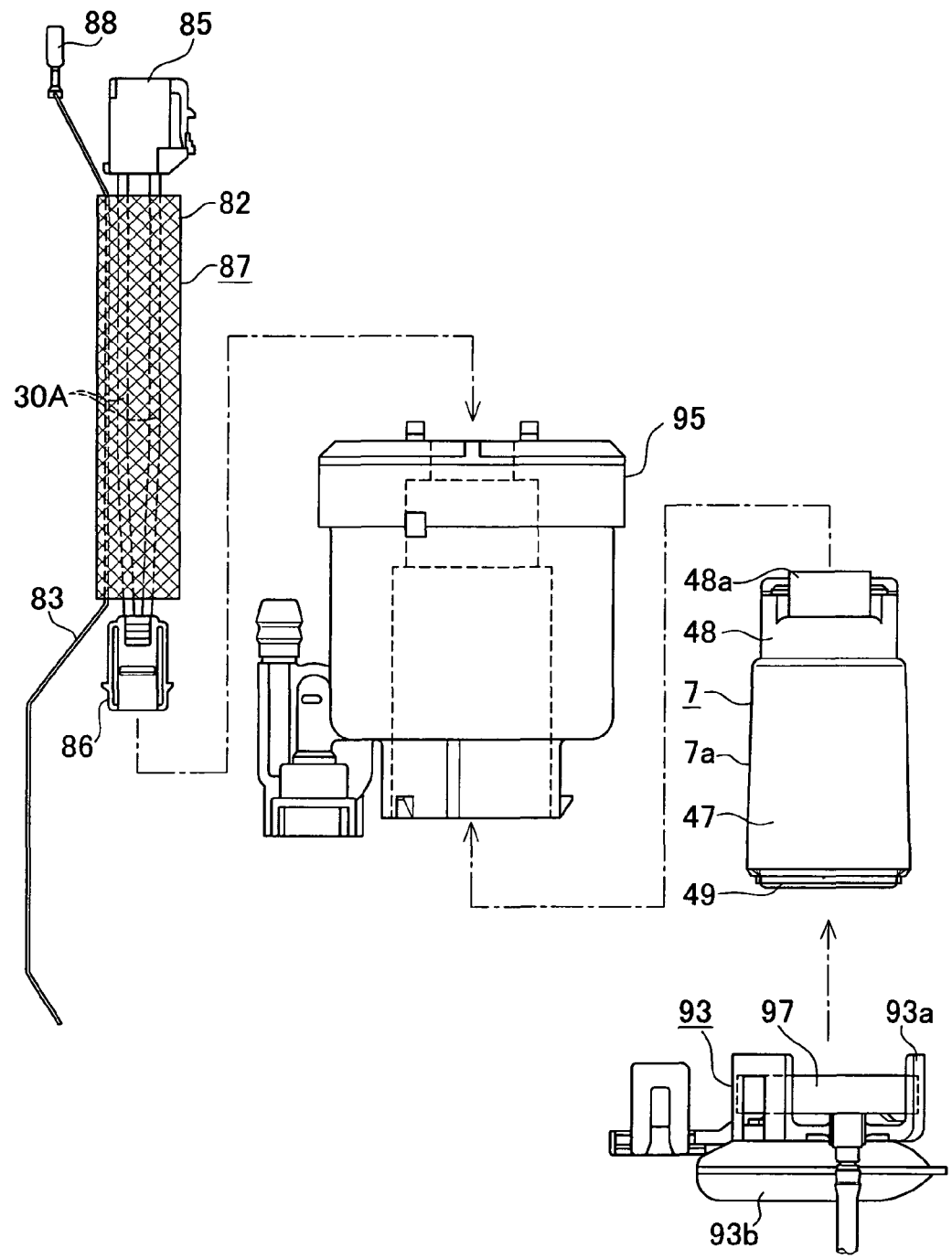
FIG. 49 is an exploded front view of a pump assembly in another example.

Moreover, the pump assembly 96 of this embodiment may be configured to further include the secondary filter case 95 mounted surrounding the fuel pump 7 as shown in FIG. 49.

Embodiment 28

A twenty-eighth embodiment of a fuel pump unit embodying a fuel supply apparatus of the present invention will be explained below referring to the accompanying drawings.

Figure 50:
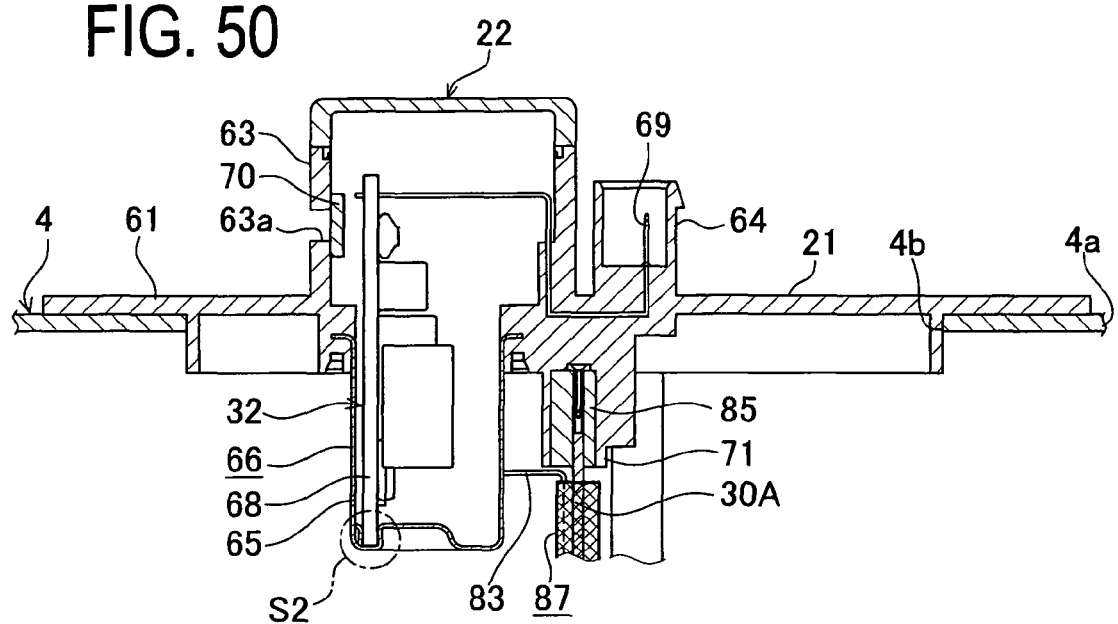
FIG. 50 is a sectional view of a part of a fuel pump unit in a twenty-eighth embodiment.

FIG. 50 is a sectional view of a part of the fuel pump unit of the twenty-eighth embodiment. This embodiment shows a connection relationship between the earth wire 83 of the harness unit 87 and the controller 22 in the twenty-sixth and twenty-seventh embodiments.

Figure 51:
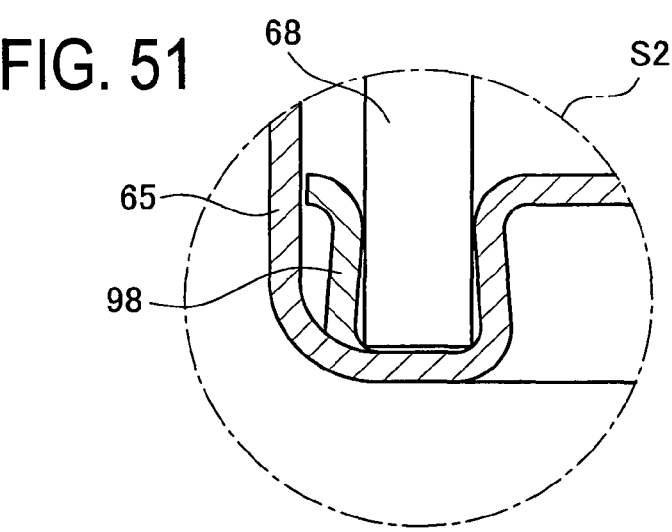
FIG. 51 is an enlarged sectional view showing a part circled by a chain line in FIG. 50 in the twenty-eighth embodiment.

In this fuel pump unit, the controller 22 is provided integral with the set plate 61 constituting the unit cover 21. The configurations related to the set plate 61 and the controller 22 are identical or similar to those in the twelfth embodiment. In other words, the set plate 61 is integrally formed on the upper surface with the case 63 and the connector 64 which are formed protruding upward. The metal cup 65 attached on the lower surface of the set plate 61 is placed in the fuel tank 4. The pump drive circuit 32 is set in the container 66 of the controller 22 constituted by the case 63 and the cup 65. The pump drive circuit 32 is fixed to the cup 65. A distal end of the external terminal 69 extending from the pump drive circuit 32 is arranged inside the connector 64. The connector 71 is formed to be integrally protruding downward from the set plate 61. This connector 71 is connected to the first terminal 85 of the harness unit 87. In this embodiment, one end of the earth wire 83 of the harness unit 87 is connected to the cup 65 of the controller 22, providing electrical conductivity between the earth wire 83 and the cup 65. Further, the circuit substrate 68 constituting the pump drive circuit 32 is connected to the cup 65 to provide electrical conductivity between the circuit substrate 68 and the cup 65. FIG. 51 is an enlarged sectional view of a part S2 circled by a chain line in FIG. 50. To be concrete, the circuit substrate 68 is connected to the cup 65 through a metal clip 98, ensuring electrical conductivity between the circuit substrate 68 and the cup 65. The above configuration allows the earth wire 83 to be grounded through the pump drive circuit 32.

According to this embodiment, therefore, the earth wire 83 of the harness unit 87 is connected to the cup 65 of the controller 22 adjacent the harness unit 87 to ground the lower cover 94 (97) attached to the fuel pump 7. Therefore, there is no need for providing a special connector in the set plate 61 to connect one end of the earth wire 83 to the pump drive circuit 32. Accordingly, the set plate 61 can be simplified in configuration by the absence of the special connector. Freedom in connection of one end of the earth wire 83 can also be increased.

Embodiment 29

A twenty-ninth embodiment of a fuel pump unit embodying a fuel supply apparatus of the present invention will be explained below referring to the accompanying drawings.

Figure 52:
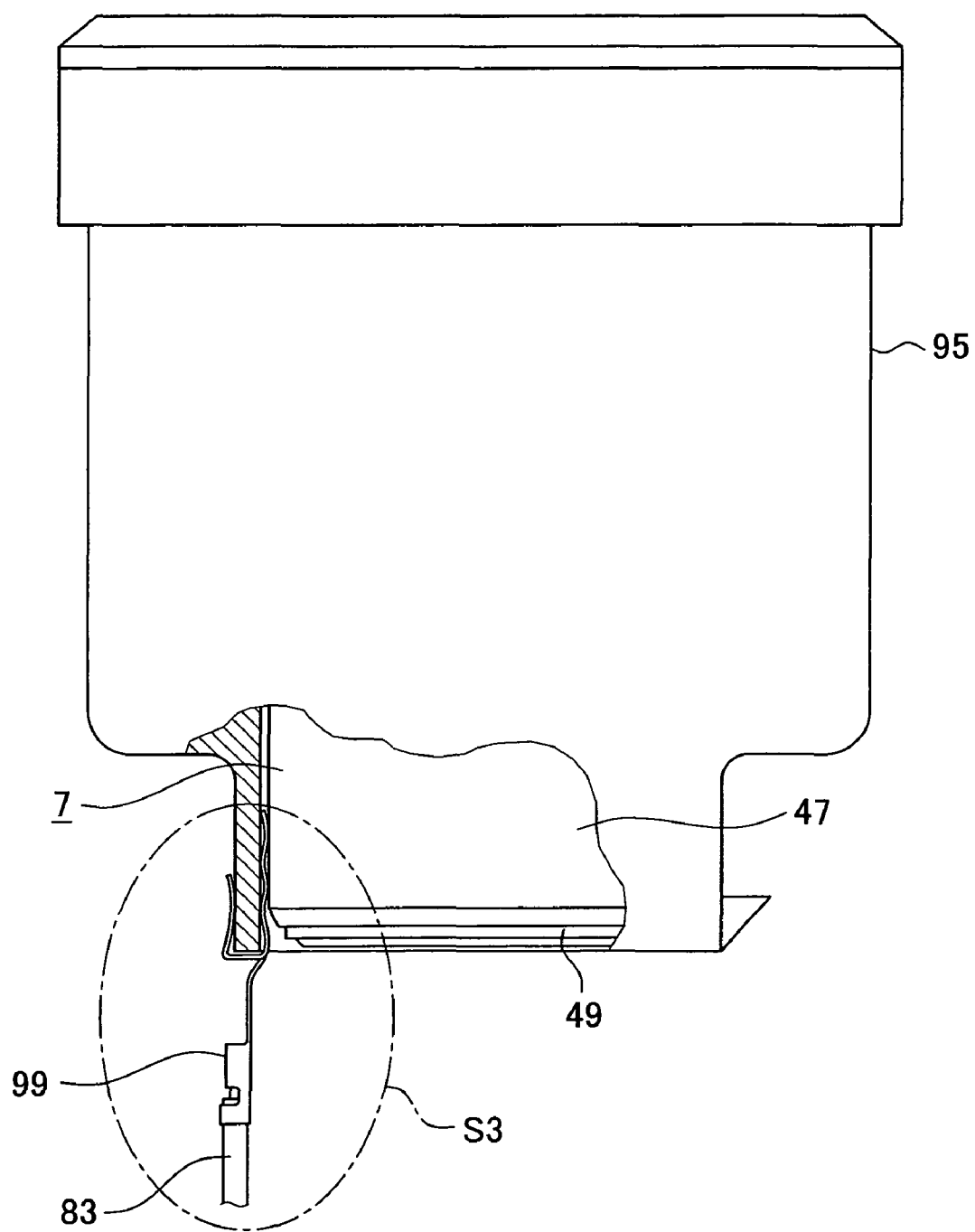
FIG. 52 is a partly sectional front view showing a state where a fuel pump is installed in a secondary filter case in a twenty-ninth embodiment.
Figure 53:
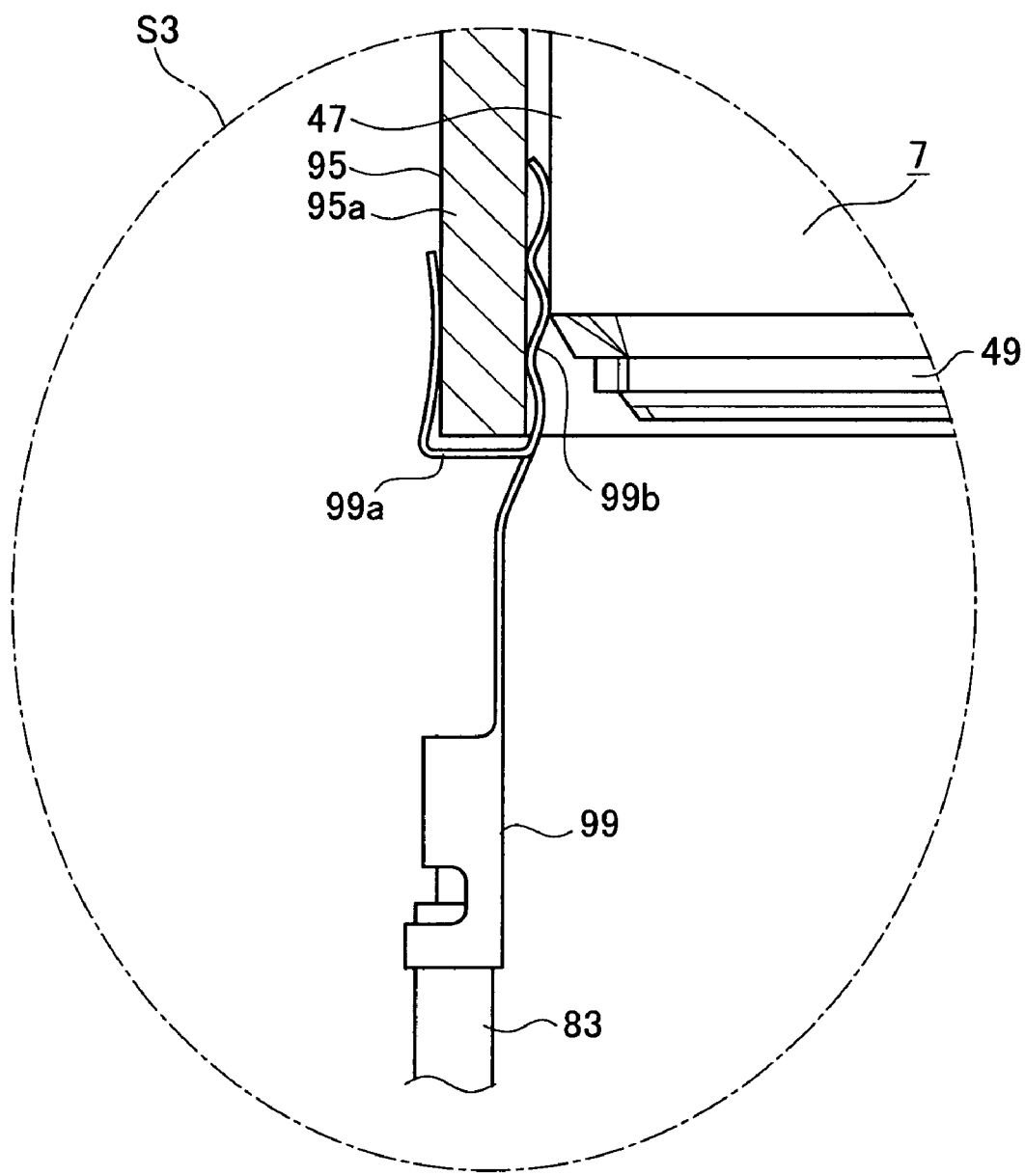
FIG. 53 is an enlarged sectional view showing a part elliptically circled by a chain line in FIG. 52 in the twenty-ninth embodiment.

In this embodiment, a concrete configuration will be explained to connect the earth wire 83 to the housing 47 of the fuel pump 7. FIG. 52 is a partly sectional front view showing a state where the fuel pump 7 is installed in the secondary filter case 95. FIG. 53 is an enlarged sectional view showing a part S3 elliptically circled by a chain line in FIG. 52. In this embodiment, a clip terminal 99 is attached to one end of the earth wire 83. A clip portion 99a of the clip terminal 99 is fitted from below on a peripheral wall 95a of the secondary filter case 95. An inner piece 99b of the clip portion 99a is pressure fitted in a clearance between the peripheral wall 95a of the secondary filter case 95 and the housing 47 of the fuel pump 7 so that the inner piece 99b is held in contact with the housing 47. The inner piece 99b of the clip portion 99a is formed in corrugated shape as shown in FIG. 53 to have an elastic force in a direction of thickness thereof. By this elastic force, the inner piece 99b is held in pressure contact with the peripheral wall 95a and the housing 47 respectively and firmly fixed thereto.

According to this embodiment, consequently, the earth wire 83 can be easily connected to the housing 47 of the fuel pump 7 and electrical conductivity can be easily ensured between the earth wire 83 and the housing 47.

The present invention is not limited to the aforementioned embodiments and may be embodied in other specific forms as mentioned below without departing from the essential characteristics thereof.

In the first to seventh embodiments, the pump drive circuit 32 of the pump controller 22 is provided with the two electric filters 33 and 34. As an alternative, the first electric filter 33 of the two electric filters 33 and 34 may be removed or both of them may be removed.

The shielding materials 31 and 37 are grounded in the above embodiments but may be not grounded.

In the fourth embodiment, the shielding material 31 is provided in or on the peripheral wall and the bottom wall of the secondary filter case 17. Alternatively, the shielding material may be provided on the inner surface of this secondary filter case.

In the above embodiments, the shielding material 31 is provided in any one of the reserve cup 5, the secondary filter case 17, and the fuel pump 7. The shielding material may be provided in at least two of the reserve cup, secondary filter case, and fuel pump.

In the above embodiments, the secondary filter case 17 containing the secondary filter is used as a case that covers the fuel pump 7. The case is not limited to the secondary filter case and may be any case that simply covers the fuel pump.

In the eighth embodiment, the earth wire 35 is connected to one end of the pump housing 7a of the fuel pump 7. An alternative is to connect the earth wire to the washer 10 (see FIG. 1) provided between the pump housing 7a and the primary filter 6. This case also can provide the operations and advantages identical or similar to those in the eighth embodiment.

In the ninth embodiment, one end (a first end) of the shielding material 37 is connected to the pump housing 7a and the other end (a second end) of the shielding material 37 is connected to the pump drive circuit 32 through the earth wire 35 for ground connection. As an alternative, instead of connecting the first end of the shielding material 37 to the pump housing 7a and grounding the second end of the shielding material 37, a part of the pump housing 7a or the washer 10 (see FIG. 1) or the like may be grounded.

In the eleventh embodiment, the upper body 48 is made of resin only. Further, the upper body may be coated with the electrically conductive film as with the lower body. In this case, the upper body, the housing, and the lower body function together as the shielding material. This makes it possible to further reduce the electrical noise particularly radiated in lateral, upward, and downward directions of the fuel pump. In this case, it may be arranged that at least parts of the surfaces of the housing 47 and the upper body 48 and at least parts of the surfaces of the housing 47 and the lower body 49 are made of an electrically conductive material (an electrically conductive film), and the electrically conductive portion (electrically conductive film) of the upper end 47b of the housing 47 is caulked to be connected to the upper body 48 and the electrically conductive portion (electrically conductive film) of the lower end 47a of the housing 47 is caulked to be connected to the lower body 49. This configuration can easily provide electrical conductivity between the housing 47 and the upper body 48 and between the housing 47 and the lower body 49, respectively.

In the tenth and eleventh embodiments, an electric filter may be provided between the pump controller 22 and the fuel pump 7. In this case, entrance of the electrical noise from the fuel pump 7 to the pump controller 22 can be restrained by the electric filter. Thus, the electrical noise reduction effect can be further enhanced by the addition of the electric filter.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A fuel supply apparatus comprising:
   a fuel pump which is driven by a motor;
   a case which surrounds an outer periphery of the fuel pump;
   a cup which houses the fuel pump and the case;
   a pump drive circuit that drivingly controls the fuel pump;
   a harness connecting the pump drive circuit and the fuel pump to each other; and
   a first shielding material configured to shield electrical noise,
   wherein the first shielding material is provided to cover only an outer periphery of the harness.

2. The fuel supply apparatus according to claim 1, wherein a second shielding material that is configured to shield electrical noise is provided with respect to the cup.

3. The fuel supply apparatus according to claim 1, wherein a second shielding material that is configured to shield electrical noise is provided with respect to the case.

4. The fuel supply apparatus according to claim 1, wherein a second shielding material that is configured to shield electrical noise is provided to cover the outer periphery of the fuel pump.

5. The fuel supply apparatus according to claim 1, wherein the first shielding material is connected to ground.

6. The fuel supply apparatus according to claim 1, wherein the first shielding material is a first electrically conductive mesh shielding material.

7. The fuel supply apparatus according to claim 6,
   wherein the mesh shielding material covers an outer periphery of the case together with the fuel pump.

8. The fuel supply apparatus according to claim 6,
   wherein the mesh shielding material covers an outer periphery of the cup together with the fuel pump and the case.

9. The fuel supply apparatus according to claim 6,
   wherein the mesh shielding material integrally covers the fuel pump and the harness.

10. The fuel supply apparatus according to claim 6,
    wherein the mesh shielding material integrally covers the fuel pump, the case, and the harness.

11. The fuel supply apparatus according to claim 6,
    wherein the mesh shielding material integrally covers the fuel pump, the case, the cup, and the harness.

12. The fuel supply apparatus according to claim 6 further comprising:
    a second electrically conductive mesh shielding material that covers an outer periphery of the fuel pump.

13. The fuel supply apparatus according to claim 12, wherein the first mesh shielding material is connected to the second mesh shielding material to connect the second mesh shielding material to ground.

14. The fuel supply apparatus according to claim 12, wherein an earth wire formed of a bare wire is placed in parallel with the harness, the first mesh shielding material covers the earth wire and the harness while the earth wire is held in contact with the first mesh shielding material, and one end of the earth wire is connected to the second mesh shielding material and the other end of the earth wire is connected to ground.

15. The fuel supply apparatus according to claim 12, wherein the harness includes a single lead wire having both ends placed extending out of both ends of the first mesh shielding material covering the harness, the ends of the lead wire serving as first connection ends, and parts of both ends of the first mesh shielding material are twisted respectively into second connection ends to provide a second lead wire that pair up with the lead wire.

16. A fuel supply apparatus comprising:
    a fuel pump which is driven by a motor;
    a case which surrounds an outer periphery of the fuel pump;

a cup which houses the fuel pump and the case;

a shielding material configured to shield electrical noise;

a pump drive circuit that drivingly controls the fuel pump; and an electric filter provided in the pump drive circuit, wherein the shielding material is provided to cover an outer periphery of one of the pump drive circuit and the electric filter.

17. A fuel supply apparatus comprising:

a fuel pump which is driven by a motor;

a pump drive circuit that drivingly controls the fuel pump;

an electrically conductive outer surface member provided on an outer surface of the fuel pump;

a harness that connects the fuel pump and the pump drive circuit to each other; and a shielding material that is provided to cover only an outer periphery of the harness and connects the electrically conductive outer surface member to ground.

18. The fuel supply apparatus according to claim 17, wherein the electrically conductive outer surface member includes a cylindrical housing and a lower body provided on a lower side of the cylindrical housing, the cylindrical housing and the lower body are electrically conducted to each other, and the lower body is connected to the shielding material for ground connection.

19. The fuel supply apparatus according to claim 18, wherein at least parts of the cylindrical housing and the lower body are made of an electrically conductive material, and the cylindrical housing and the lower body are connected through respective portions made of the electrically conductive material.

20. The fuel supply apparatus according to claim 17, wherein the electrically conductive outer surface member includes a cylindrical housing, an upper body provided on an upper side of the cylindrical housing and a lower body provided on a lower side of the cylindrical housing and, the cylindrical housing and the upper body and the lower body being electrically conducted to one another, and one of the upper body and the lower body being connected to the shielding material for ground connection.

21. The fuel supply apparatus according to claim 20, wherein at least parts of the cylindrical housing and the upper body and the lower body are made of an electrically conductive material, and the cylindrical housing and the upper body are connected to each other through respective portions made of the electrically conductive material and the cylindrical housing and the lower body are connected to each other through respective portions made of the electrically conductive material.

22. A fuel supply apparatus comprising:

a fuel pump which is driven by a motor;

a housing made of an electrically conductive material, forming an outer peripheral surface of the fuel pump;

a lower body provided on a lower side of the housing; and a lower cover made of an electrically conductive material and placed to cover the lower body to provide electric conductivity between the lower cover and the housing.

23. The fuel supply apparatus according to claim 22 further comprising:

a pump drive circuit that drivingly controls the fuel pump; and a circuit case made of an electrically conductive material and placed to cover the pump drive circuit;

wherein the lower cover is connected to the circuit case through an earth wire for ground connection.

* * * * *